US012505803B2

(12) United States Patent
Lee et al.

(10) Patent No.: US 12,505,803 B2
(45) Date of Patent: Dec. 23, 2025

(54) PIXEL CIRCUIT AND DISPLAY DEVICE INCLUDING THE SAME

(71) Applicant: LG Display Co., Ltd., Seoul (KR)

(72) Inventors: Yong Won Lee, Paju-si (KR); Jong Yoon Hwang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/768,798

(22) Filed: Jul. 10, 2024

(65) Prior Publication Data

US 2025/0148977 A1 May 8, 2025

(30) Foreign Application Priority Data

Nov. 2, 2023 (KR) ........................ 10-2023-0149633

(51) Int. Cl.
*G09G 3/3233* (2016.01)

(52) U.S. Cl.
CPC ... *G09G 3/3233* (2013.01); *G09G 2300/0426* (2013.01); *G09G 2320/0233* (2013.01); *G09G 2330/021* (2013.01)

(58) Field of Classification Search
CPC ......... G09G 3/3233; G09G 2300/0426; G09G 2320/0233; G09G 2330/021
See application file for complete search history.

(56) References Cited

U.S. PATENT DOCUMENTS 10,127,859 B2 * 11/2018 Chang .................. G09G 3/3233
2022/0101777 A1 * 3/2022 Kim ..................... G09G 3/3233
2022/0375408 A1 * 11/2022 Dong .................. G09G 3/3241
2023/0008511 A1 * 1/2023 Son ...................... G09G 3/3291
2023/0024280 A1 * 1/2023 Yanase ................... G09G 3/325
2024/0144880 A1 * 5/2024 Zhu ....................... G09G 3/3233
2024/0257755 A1 * 8/2024 Yuan .................... G09G 3/3233
2024/0321202 A1 * 9/2024 Park ..................... G09G 3/3233
2024/0324348 A1 * 9/2024 Min ...................... G09G 3/3266
2024/0365607 A1 * 10/2024 Park .................. H10K 59/1216
2025/0104622 A1 * 3/2025 Huang ..................... G09G 3/32

FOREIGN PATENT DOCUMENTS

KR 10-2014-0071727 A 6/2014
KR 10-2021-0073188 A 6/2021
KR 10-2021-0085540 A 7/2021
KR 10-2022-0057344 A 5/2022

* cited by examiner

*Primary Examiner* — Christopher E Leiby

(74) *Attorney, Agent, or Firm* — Birch, Stewart, Kolasch & Birch, LLP

(57) ABSTRACT

A pixel circuit and a display device including the same are discussed. The pixel circuit in one example includes a driving element having a first electrode connected to a first node, a gate electrode connected to a second node, and a second electrode connected to a third node, a first capacitor connected between the second node and a fourth node, a second capacitor connected between the third node and the fourth node, a light emitting element including an anode electrode connected to a fifth node and a cathode electrode to which a cathode voltage is applied, a first switch element configured to connect a data voltage to the second node, and a switch circuit configured to selectively apply a reference voltage to the second node and the fourth node.

28 Claims, 58 Drawing Sheets

PIXEL CIRCUIT AND DISPLAY DEVICE INCLUDING THE SAME

CROSS-REFERENCE TO RELATED APPLICATION

This application claims priority to Korean Patent Application No. 10-2023-0149633, filed in the Republic of Korea on Nov. 2, 2023, the entire contents of which is hereby expressly incorporated by reference into the present application.

BACKGROUND

Field

The present disclosure relates to a pixel circuit and a display device including the same capable of improving luminance uniformity.

Discussion of the Related Art

Electroluminescent display devices are generally classified into inorganic light emitting display devices and organic light emitting display devices according to the materials of light emitting layers. Active matrix type organic light emitting display devices include organic light-emitting diodes (hereinafter referred to as "OLEDs"), which emit light by themselves, and have fast response speeds and advantages in which light emission efficiencies, brightness, and viewing angles are high.

In the organic light-emitting display devices, the OLEDs are formed in pixels. Since the organic light-emitting display devices have fast response speeds and are excellent in light emission efficiency, brightness, and viewing angle as well as being able to exhibit a black gradation in a full black color, the organic light-emitting display devices are excellent in a contrast ratio and color reproducibility.

Pixels of an organic light emitting display device include a pixel circuit including a driving element for driving the OLED, and a capacitor connected to the driving element.

Due to process deviations and device characteristic deviations resulting from the manufacturing process of the display panel, there can be differences in the electrical characteristics of the driving element for each pixel. These differences can increase as the driving time of the pixels elapses. In order to compensate for the differences in the electrical characteristics of the driving element for each pixel, an internal compensation circuit can be added to the pixel circuit. The internal compensation circuit can sample a threshold voltage of the driving element and compensate a gate voltage of the driving element by the amount of the threshold voltage of the driving elements.

However, when the pixels driven by the internal compensation circuit are driven at low luminance, luminance unevenness can occur within the screen of the display panel.

BRIEF SUMMARY OF THE DISCLOSURE

The present disclosure has been made in an effort to address aforementioned limitations and/or drawbacks associated with the related art.

Examples of the present disclosure provide a pixel circuit that is capable of compensating for the threshold voltage of a driving element in real time using an internal compensation circuit and improving the luminance uniformity of the screen, and provide a display device including the pixel circuit.

The problems or limitations to be solved or addressed by the various aspects of the present disclosure are not limited to those mentioned above, and other problems or limitations not mentioned will be clearly understood by those skilled in the art from the following description.

A pixel circuit according to one embodiment of the present disclosure includes a driving element including a first electrode connected to a first node, a gate electrode connected to a second node, and a second electrode connected to a third node; a first capacitor connected between the second node and a fourth node; a second capacitor connected between the third node and the fourth node; a light emitting element including an anode electrode connected to a fifth node and a cathode electrode to which a cathode voltage is applied; a first switch element configured to apply a data voltage to the second node; and a switch circuit configured to selectively apply a reference voltage to the second node and the fourth node.

According to one or more aspects of the present disclosure, the switch circuit can include a second switch element configured to apply the reference voltage to a sixth node in response to a second gate signal; a third switch element configured to electrically connect the sixth node to the fourth node in response to the second gate signal; and a fourth switch element configured to electrically connect the sixth node to the second node in response to the third gate signal. The first switch element can be turned on/off in response to a first gate signal.

According to one or more aspects of the present disclosure, a driving period of the pixel circuit can include a first period, a second period, a third period, a fourth period, and a fifth period. A voltage of the first gate signal can be a gate-on voltage during the third period and a gate-off voltage during the first, second, fourth, and fifth periods. A voltage of the second gate signal can be the gate-on voltage during the first, second, and third periods and the gate-off voltage during the fourth and fifth periods. A voltage of the third gate signal can be the gate-on voltage during the first, second, and fourth periods and the gate-off voltage during the third and fifth periods. Each of the first switch element, the second switch element, the third switch element, and the fourth switch element can be turned on in response to the gate-on voltage and is turned off in response to the gate-off voltage.

According to one or more aspects of the present disclosure, the first switch element can include a first electrode connected to a data line to which the data voltage is applied, a gate electrode to which the first gate signal is applied, and a second electrode connected to the second node. The second switch element can include a first electrode to which the reference voltage is applied, a gate electrode to which the second gate signal is applied, and a second electrode connected to the sixth node. The third switch element can include a first electrode connected to the sixth node, a gate electrode to which the second gate signal is applied, and a second electrode connected to the fourth node. The fourth switch element can include a first electrode connected to the sixth node, a gate electrode to which the third gate signal is applied, and a second electrode connected to the second node.

According to one or more aspects of the present disclosure, the pixel circuit can further include a fifth switch element configured to apply an anode reset voltage to the fifth node in response to the third gate signal; a sixth switch element configured to apply a pixel driving voltage to the first node in response to a fourth gate signal; and a seventh switch element configured to electrically connect the third node to the fifth node in response to a fifth gate signal.

According to one or more aspects of the present disclosure, a driving period of the pixel circuit can include a first period, a second period, a third period, a fourth period, and a fifth period. A voltage of the fourth gate signal can be a gate-on voltage during the second and fifth periods and a gate-off voltage during the first, third, and fourth periods. A voltage of the fifth gate signal can be the gate-on voltage during the first, fourth, and fifth periods and the gate-off voltage during the second and third periods. Each of the first switch element, the second switch element, the third switch element, the fourth switch element, the fifth switch element, the sixth switch element, and the seventh switch element can be turned on in response to the gate-on voltage and is turned off in response to the gate-off voltage.

According to one or more aspects of the present disclosure, the fifth switch element can include a first electrode connected to the fifth node, a gate electrode to which the third gate signal is applied, and a second electrode to which the anode reset voltage is applied. The sixth switch element can include a first electrode to which the pixel driving voltage is applied, a gate electrode to which the fourth gate signal is applied, and a second electrode connected to the first node. The seventh switch element can include a first electrode connected to the third node, a gate electrode to which the fifth gate signal is applied, and a second electrode connected to the fifth node.

According to one or more embodiments of the present disclosure, a display device includes the pixel circuit.

According to one or more aspects of the present disclosure, sensing the threshold voltage of the driving element and writing the pixel data to the pixels are temporally separated to ensure sufficient threshold voltage sensing time, whereby the threshold voltage of the driving element can be accurately compensated and the luminance uniformity of the entire screen can be improved.

According to one or more aspects of the present disclosure, it is possible to reduce the error in voltage charged in the main node of the pixel circuit by separating the capacitor for storing the threshold voltage of the driving device and the capacitor for storing the data voltage.

According to one or more aspects of the present disclosure, the difference in luminance of the pixels can be minimized by setting the anode reset voltage separately from the reference voltage when the driving frequency of the pixels is changed due to the variation of the refresh rate.

According to one or more aspects of the present disclosure, the low power driving of the display device can be implemented by setting the anode reset voltage separately from the reference voltage so that the cathode voltage can be set to zero voltage 0[V].

According to one or more aspects of the present disclosure, the level shifter and the gate driver can be shared in the driving circuit of display panels in which different pixels are designed. For example, one shift register and four edge triggers can be used to output pulses of the first to fifth gate signals in the present disclosure, and can be shared with other pixel circuits.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION OF THE EMBODIMENTS

Figure 1:
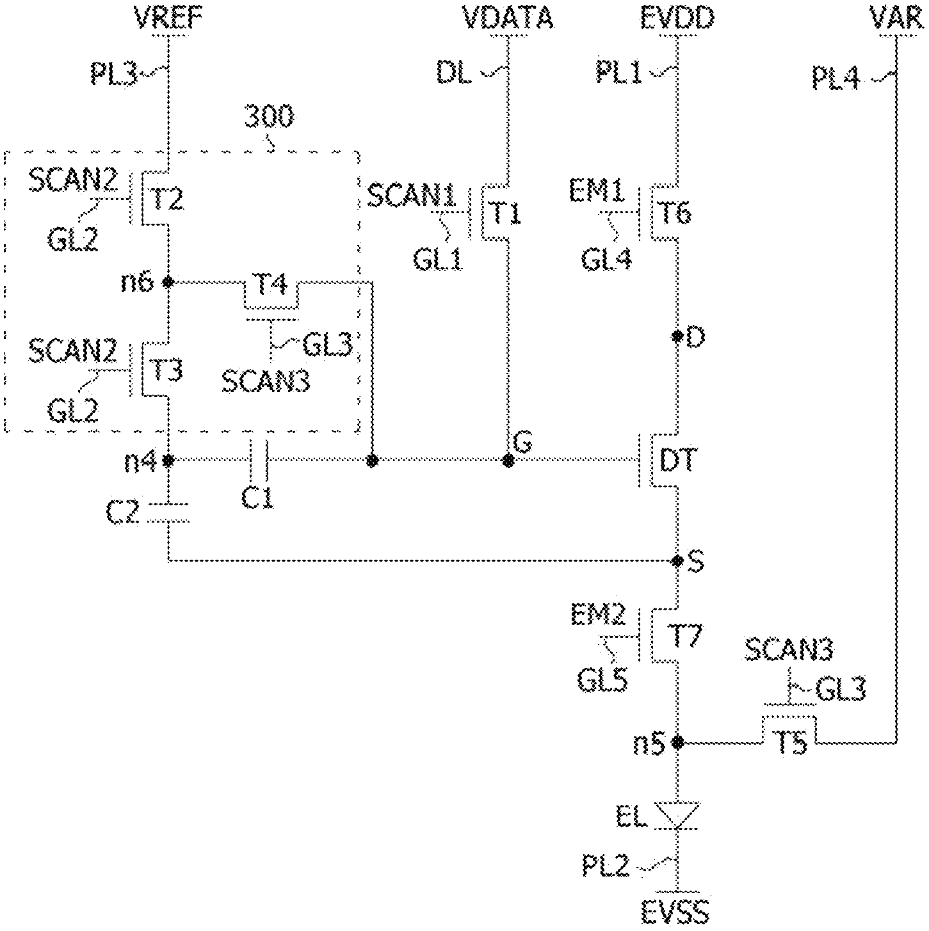
FIG. 1 is a circuit diagram illustrating a pixel circuit according to a first embodiment of the present disclosure.

The advantages and features of the present disclosure and methods for accomplishing the same will be more clearly understood from embodiments described below with reference to the accompanying drawings. However, the present disclosure is not limited to the following embodiments but can be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present disclosure. Further, in describing the present disclosure, detailed descriptions of known related technologies can be omitted to avoid unnecessarily obscuring the subject matter of the present disclosure.

The terms such as "comprising," "including," "having," and "consist of" used herein are generally intended to allow other components to be added unless the terms are used with the term "only." Any references to singular can include plural unless expressly stated otherwise.

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components can be interposed between them, unless "immediately" or "directly" is used.

When a temporal antecedent relationship is described, such as "after", "following", "next to", "before", or the like, it may not be continuous on a time base unless "immediately" or "directly" is used. Further, the term "can" encompasses all the meanings and coverages of the term "may."

The terms "first," "second," and the like can be used to distinguish components from each other and may not define order or sequence, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

According to one or more aspects of the present disclosure, the pixel circuit and the gate drive circuit of the display device can include a plurality of transistors. Each of the sub-pixels includes a pixel circuit. plurality of transistors used as switch elements or driving elements. The transistor can be implemented as a TFT (Thin Film Transistor). The transistors can be implemented as an oxide thin film transistor (TFT) including an oxide semiconductor, a low temperature poly silicon TFT (LTPS TFT) including a low temperature poly silicon, and the like. Hereinafter, transistors constituting the pixel circuit and the gate driving circuit will be described focusing on an example implemented with an n-channel oxide TFT, but the present disclosure is not limited thereto.

According to one or more aspects of the present disclosure, a transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons can flow from a source to a drain. The n-channel transistor has a direction of a current flowing from the drain to the source. In the case of a p-channel transistor (p-channel metal-oxide semiconductor (PMOS), since carriers are holes, a source voltage is higher than a drain voltage such that holes can flow from a source to a drain. In the p-channel transistor, since holes flow from the source to the drain, a current flows from the source to the drain. It should be noted that a source and a drain of a transistor are not fixed. For example, a source and a drain can be changed according to an applied voltage. Therefore, the disclosure is not limited due to a source and a drain of a transistor. In the following description, a source and a drain of a transistor will be referred to as a first electrode and a second electrode.

According to one or more aspects of the present disclosure, a gate signal swings between a gate-on voltage and a gate-off voltage. A transistor is turned on in response to a gate-on voltage and is turned off in response to a gate-off voltage. In the case of an n-channel transistor, the gate-on voltage can be a gate high voltage, and the gate-off voltage can be a gate low voltage. In the case of an p-channel transistor, the gate-on voltage can be a gate low voltage, and the gate-off voltage can be a gate high voltage.

Hereinafter, various embodiments of the present disclosure will be described in detail with reference to the accompanying drawings. All the components of each pixel circuit and each display apparatus according to all embodiments of the present disclosure are operatively coupled and configured.

Figure 2:
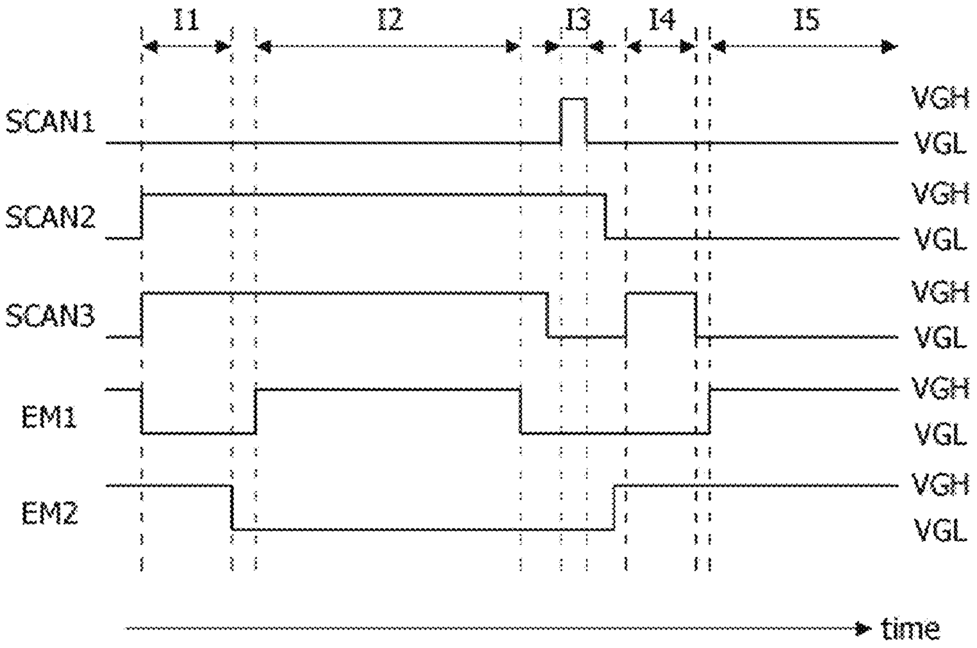
FIG. 2 is a waveform diagram illustrating waveforms of gate signals applied to the pixel circuit shown in FIG. 1.

FIG. 1 is a circuit diagram illustrating a pixel circuit according to a first embodiment of the present disclosure. FIG. 2 is a waveform diagram illustrating waveforms of gate signals applied to the pixel circuit shown in FIG. 1.

Referring to FIGS. 1 and 2, the pixel circuit includes an emitting element EL, a driving element DT for driving the emitting element EL, a plurality of switch elements T1 to T7, a first capacitor C1, and a second capacitor C2. The driving element DT and the switch elements T1 to T7 can be implemented as n-channel oxide thin film transistors (TFTs).

The pixel circuit is connected to a data line DL to which a data voltage VDATA is applied, and to gate lines GL1 to GL5 to which gate signals SCAN1, SCAN2, SCAN3, EM1, and EM2 are applied. The pixel circuit is connected to power nodes to which DC voltages (or constant voltages) are applied, such as a first constant voltage node PL1 which a pixel driving voltage EVDD is applied, a second constant voltage node PL2 to which a cathode voltage EVSS is applied, a third constant voltage node PL3 to which a reference voltage VREF is applied, and a fourth constant voltage node PL4 to which an anode reset voltage VAR is applied. On the display panel, the power lines to which the constant voltage nodes are connected can be commonly connected to all of pixels.

Pixel voltages, such as the pixel driving voltage EVDD, the reference voltage VREF, the cathode voltage EVSS, the anode reset voltage VAR, a gate-on voltage VGH, and a gate-off voltage VGL, can be set in the same way as in the embodiments of the present disclosure.

The pixel driving voltage EVDD is set to a voltage that is higher than the maximum voltage of the data VDATA and that enables the driving element DT to operate in a saturation region. The reference voltage VREF can be set to a voltage at which the driving element DT can be turned on within a voltage range between the maximum and minimum voltage of the data voltage VDATA. The cathode voltage EVSS is set to a voltage lower than the minimum voltage of the data voltage VDATA. The anode voltage VAR can be set to a voltage lower than the reference voltage VREF and higher than the cathode voltage EVSS.

The gate-on voltage VGH can be set to a voltage higher than the pixel driving voltage EVDD, and the gate-off voltages VGL can be set to a voltage lower than the cathode voltage EVSS. Further, EVDD=12[V], EVSS=−6[V], VGH=20[V], VGL=−14[V], VREF=1[V], VAR=−4[V] can be set, but are not limited to. Here, as an example, 12[V] means 12 volts or 12 V. Also, for example, the constant voltages can be a voltage selected within a voltage range of 8[V] to 20[V] for the EVDD, a voltage selected within a voltage range of −8[V] to −0.5[V] for the EVSS, a voltage selected within a voltage range of 0.5[V] to 24[V] for the VGH, a voltage selected within a voltage range of −20[V] to −0.5[V] for the VGL, a voltage selected within a voltage range of 0.5[V] to 3[V] for the VREF, and a voltage selected within a voltage range of −6[V] to −0.5[V] for the VAR, depending on the structure, driving characteristics, and use environment of the display panel.

The gate signals SCAN1, SCAN2, SCAN3, EM1, and EM2 include pulses that swing between the gate-on voltage VGH and the gate-off voltage VGL. The gate signals SCAN1, SCAN2, SCAN3, EM1, and EM2 include a first gate signal SCAN1, a second gate signal SCAN2, a third gate signal SCAN3, a fourth gate signal EM1, and a fifth gate signal EM2.

The driving period of the pixel circuit can include a first period I1, a second period I2 set after the first period I1, a third period I3 set after the second period I2, a fourth period I4 set after the third period I3, and a fifth period I5 set after the fourth period I4. Each of the periods I1 to I5 can be controlled by the waveforms of the gate signals SCAN1, SCAN2, SCAN3, EM1, and EM2.

The gate driver for driving gate lines in the display panel can include a shift register that sequentially outputs the first gate signal SCAN1, a first edge trigger that sequentially outputs the second gate signal SCAN2, a second edge trigger that sequentially outputs the third gate signal SCAN3, a third edge trigger that sequentially outputs the fourth gate signal EM1, and a fourth edge trigger that sequentially outputs the fifth gate signal EM2.

A voltage of the first gate signal SCAN1 is generated as a pulse of the gate-on voltage VGH during the third periods I3 and is the gate-off voltage VGL during the first period I1, the second period I2, the fourth period I4, and the fifth periods I5. A voltage of the second gate signal SCAN2 is generated as a pulse of the gate-on voltage VGH during the first to third periods I1, I2, and I3 and is the gate-off voltage VGL during the fourth and the fifth periods I4 and I5.

A voltage of the third gate signal SCAN3 is generated as a pulse of the gate-on voltage VGH during the first period I1, the second periods I2, and the fourth period I4 and is the gate-off voltage VGL during the third and the fifth periods I3 and I5. A voltage of the fourth gate signal EM1 is generated as a pulse of the gate-off voltage VGL during the first period I1, is generated as a pulse of the gate-on voltage VGH during the second period I2, and then is the gate-off voltage VGL during the third to the fifth periods I3 and I4. A voltage of the fourth gate signal EM1 is the gate-on voltage VGH during the fifth period I5. A voltage of the fifth gate signal EM2 is the gate-on voltage VGH during the first, fourth and fifth periods I1, I4, and I5 and is generated as a pulse of the gate-off voltage VGL during the second and third periods I2 and I3.

Between the second period I2 and the third period I3, after the voltage of the fourth gate signal EM1 is inverted to the gate-off voltage VGL, the voltage of the third gate signal SCAN3 can be inverted to the gate-off voltage VGL, and then the first scan signal SCAN1 can be inverted to the gate-on voltage VGH. Between the third period I3 and the fourth period I4, after the voltage of the first gate signal SCAN1 is inverted to the gate-off voltage VGL, the voltage of the second gate signal SCAN2 can be inverted to the gate-off voltage VGL, and then the voltage of the fifth gate signal SCAN2 can be inverted to the gate-on voltage VGH. The voltage of the fifth gate signal EM2 is inverted to the gate-on voltage VGH, and then the voltage of the third gate signal SCAN3 can be inverted to the gate-on voltage VGH.

The driving element DT includes a first electrode connected to a first node D, a gate electrode connected to a second node G, and a second electrode connected to a third node S.

The light-emitting element EL can be implemented as an OLED. The light emitting element EL includes an anode electrode, a cathode electrode, and an organic compound layer formed between the electrodes. The anode electrode of the light-emitting element EL is connected to a fifth node n5, and the cathode electrode thereof is connected to the second constant voltage node PL2 to which the cathode voltage EVSS is applied. The organic compound layer can include, but is not limited to, a hole injection layer (HIL), a hole transport layer (HTL), a light emission layer (EML), an electron transport layer (ETL), and an electron injection layer (EIL). When a voltage is applied to the anode and cathode electrodes of the light-emitting element EL, holes passing through the hole transport layer (HTL) and electrons passing through the electron transport layer (ETL) move to the light emission layer (EML) to form excitons. In this case, visible light is emitted from the light emission layer EML. The light emitting element EL can be implemented as a tandem structure with a plurality of light emitting layers stacked on top of each other. The light emitting element EL having the tandem structure can improve the luminance and lifetime of the pixels.

A threshold voltage Vth of the driving element DT is stored in the second capacitor C2, and then the data voltage VDATA of the pixel data is stored in the first capacitor C1. The first capacitor C1 is connected between the second node G and a fourth node n4 to store the data voltage VDATA during the third period I3. The second capacitor C2 is connected between the third node S and the fourth node n4 to store the threshold voltage Vth of the driving element DT sensed during the second period I2.

The switch elements T1 to T7 of the pixel circuit include a first switch element T1 that supplies a data voltage VDATA of pixel data to a second node G in response to the first gate signal SCAN1, a second switch element T2 that supplies the reference voltage VREF to a sixth node n6 in response to the second gate signal SCAN2, a third switch element T3 that electrically connects the sixth node n6 to the fourth node n4 in response to the second gate signal SCAN2, a fourth switch element T4 that electrically connects the sixth node n6 to the second node G in response to the third gate signal SCAN3, a fifth switch element T5 that supplies the anode reset voltage VAR to the fifth node n5 in response to the third gate signal SCAN3, a sixth switch element T6 that supplies the pixel driving voltage EVDD to the first node D in response to the fourth gate signal EM1, and a seventh switch element T7 that electrically connects the third node S to the fifth node n5 in response to the fifth gate signal EM2.

The second to fourth switch elements T2, T3, and T4 are a reference voltage switch circuit 300 that selectively applies the reference voltage VREF to the second node G and the fourth node n4.

The first switch element T1 is turned on in response to the pulse of the first gate signal SCAN1 synchronized with the data voltage VDATA of the pixel data during the third period I3. The first switch element T1 is turned off during the first period I1, the second period I2, the fourth period I4, and the fifth period I5. When the first switch element T1 is turned on, the data line DL is electrically connected to the second node G, and the data voltage VDATA is applied to the second node G. The first switch element T1 includes a first electrode connected to a data line DL to which the data voltage VDATA is applied, a gate electrode connected to a first gate line GL1 to which the first gate signal SCAN1 is applied, and a second electrode connected to the second node G.

The second switch element T2 is turned on in response to the pulse of the second gate signal SCAN2 generated as the gate-on voltage VGH during the first to third periods I1 to I3. When the second switch element T2 is turned on, the reference voltage VREF is applied to the sixth node n6. The second switch element T2 is turned off during the fourth and fifth periods I4 and I5. The second switch element T2 includes a first electrode connected to the third constant voltage node PL3 to which the reference voltage VREF is applied, a gate electrode connected to a second gate line GL2 to which the second gate signal SCAN2 is applied, and a second electrode connected to the sixth node n6.

The third switch element T3 is turned on in response to the gate-on voltage VGH of the second gate signal SCAN2 during the first to third periods I1 to I3. When the third switch element T3 is turned on, the sixth node n6 is electrically connected to the fourth node n4. The third switch element T3 is turned off during the fourth and fifth periods I4 and I5. The third switch element T3 includes a first electrode connected to the sixth node n6, a gate electrode connected to the second gate line GL2 to which the second gate signal SCAN2 is applied, and a second electrode connected to the fourth node n4.

The fourth switch element T4 is turned on in response to the pulse of the third gate signal SCAN3 generated as the gate-on voltage VGH during the first period I1, the second period I2, and the fourth period I4. When the fourth switch element T4 is turned on, the sixth node n6 is electrically connected to the second node G. The fourth switch element T4 is turned off during the third period I3 and the fifth period I5. The fourth switch element T4 includes a first electrode connected to the sixth node n6, a gate electrode connected to the third gate line GL3 to which the third gate signal SCAN3 is applied, and a second electrode connected to the second node G.

The fifth switch element T5 is turned on in response to the gate-on voltage VGH of the third gate signal SCAN3 during the first period I1, the second period I2, and the fourth period I4. When the fifth switch element T5 is turned on, the anode reset voltage VAR is applied to the fifth node n5. The fifth switch element T5 is turned off during the third period I3 and the fifth period I5. The fifth switch element T5 includes a first electrode connected to the fifth node n5, a gate electrode connected to the third gate line GL3 to which the third gate signal SCAN3 is applied, and a second electrode connected to the fourth constant voltage node PL4 to which the anode reset voltage VAR is applied.

The sixth switch element T6 is turned on in response to the pulse of the fourth gate signal EM1 generated as the gate-on voltage VGH during the second period and the fifth period I5 to supply the pixel driving voltage EVDD to the first node D. The sixth switch element T6 is turned off during the first period I1, the third period I3, and the fourth period I4. The sixth switch element T6 includes a first electrode connected to the first constant voltage node PL1 to which the pixel driving voltage EVDD is applied, a gate electrode connected to a fourth gate line GL4 to which the fourth gate signal EM1 is applied, and a second electrode connected to the first node D.

The seventh switch element T7 is turned on in response to the gate-on voltage VGH of the fifth gate signal EM2 during the first period I1, the fourth period I4, and the fifth period I5. When the seventh switch element T7 is turned on, the third node S is electrically connected to the fourth node n5. The seventh switch element T7 is turned off during the second and third periods I2 and I3. The seventh switch element T7 includes a first electrode connected to the third node S, a gate electrode connected to a fifth gate line GL5 to which the fifth gate signal EM2 is applied, and a second electrode connected to the fifth node n5.

Figure 3A:
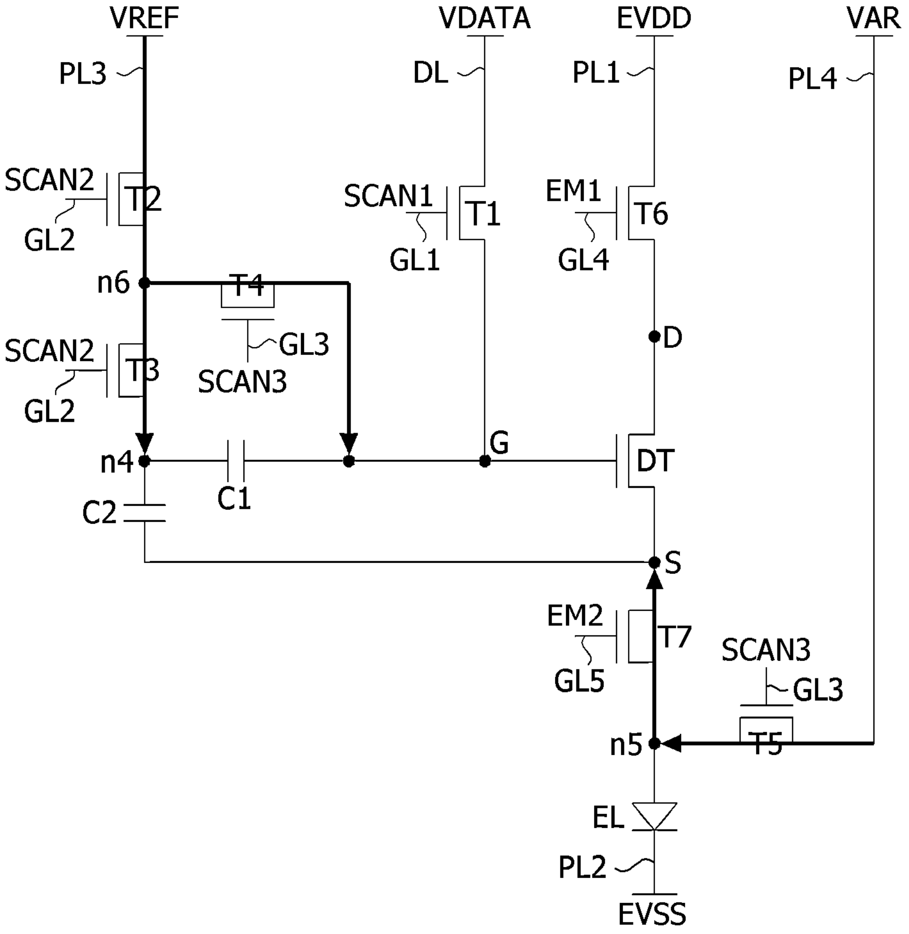
FIGS. 3A to 7B are diagrams illustrating a driving period of the pixel circuit shown in FIG. 1 in stages.

FIGS. 3A to 6B are diagrams illustrating driving periods of the pixel circuit shown in FIG. 1 in stages. Particularly, FIG. 3A is a circuit diagram illustrating a current flowing to the pixel circuit shown in FIG. 1 during the first period I1.

Figure 3B:
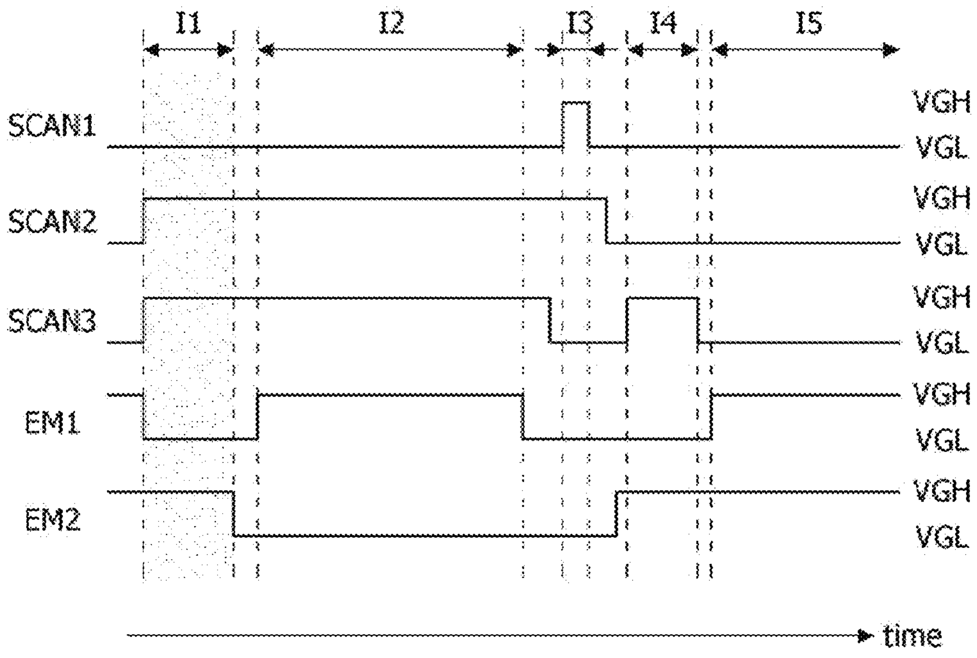

Referring to FIGS. 3A and 3B, during the first period I1, the main nodes of the pixel circuit are initialized. During the first period I1, the voltage of the second gate signal SCAN2, the third gate signal SCAN3, and the fifth gate signal EM2 is the gate-on voltage VGH. During the first period I1, the voltage of the first gate signal SCAN1 and the fourth gate signal EM1 is the gate-off voltage VGL. Therefore, during the first period I1, the second, third, fourth, fifth, and seventh switch elements T2, T3, T4, T5, and T7 are turned on, and the first and sixth switch elements T1 and T6 are turned off. As a result, during the first period I1, the voltage of the second node G is initialized to the reference voltage VREF and the voltage of the third node S is initialized to the anode reset voltage VAR. During the first period I1, the voltage of the first capacitor C1 is 0 [V] because the second node G and the fourth node n4 are short-circuited by means of the fourth switch element T4. The voltage of the second capacitor C2 and the first period C2 the gate-source voltage Vgs of the driving element DT are a voltage of (VREF-VAR) in the first period I1.

Figure 4A:
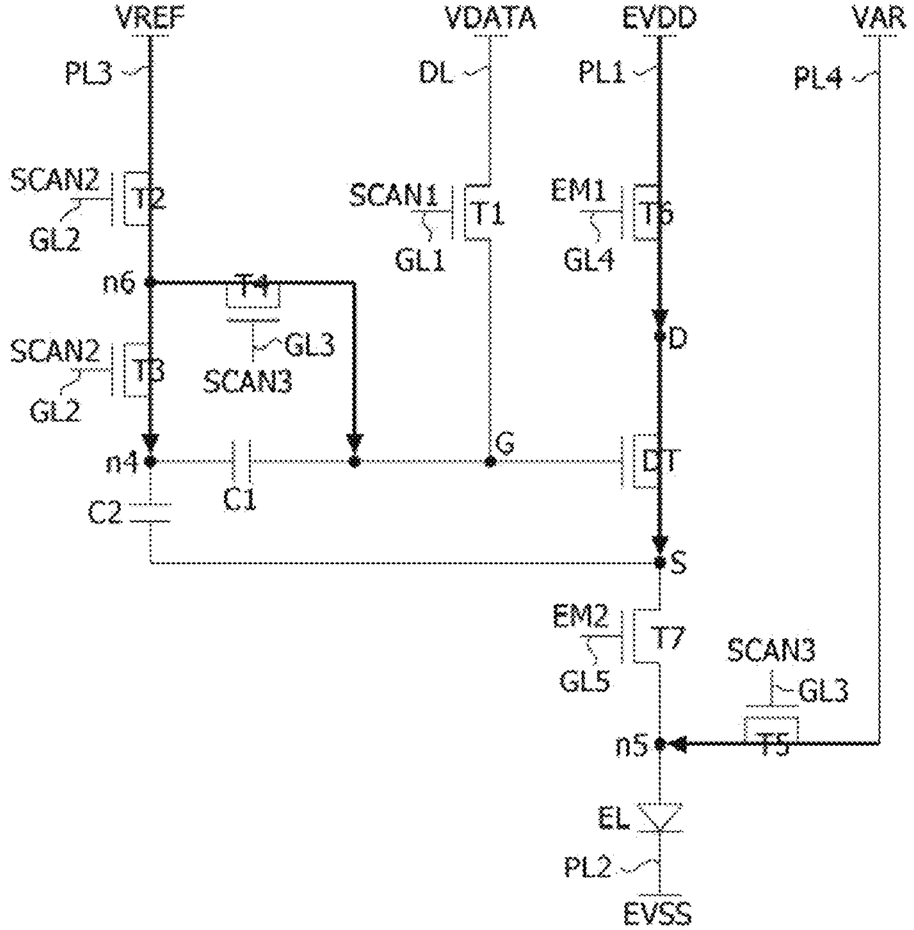

FIG. 4A is a circuit diagram illustrating a current flowing to the pixel circuit shown in FIG. 1 during the second period I2.

Figure 4B:
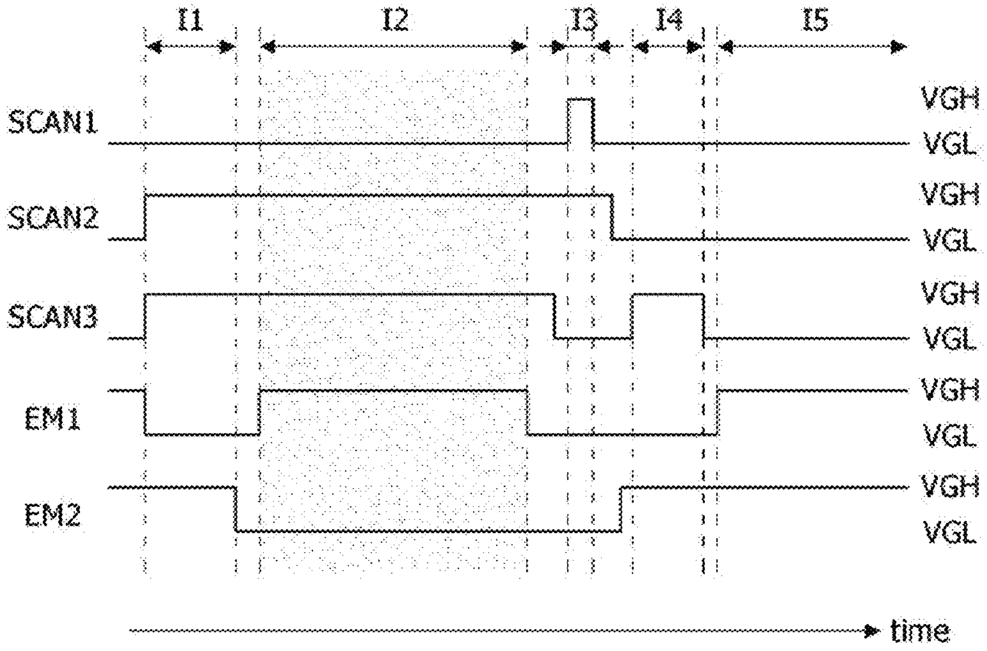

Referring to FIGS. 4A and 4B, during the second period I2, the threshold voltage Vth of the driving element DT is sensed and stored in the second capacitor C2. During the second period I2, the voltage of the second gate signal SCAN2, the third gate signal SCAN3, and the fourth gate signal EM1 is the gate-on voltage VGH. During the second period I2, the voltage of the first gate signal SCAN1 and the fifth gate signal EM2 is the gate-off voltage VGL. During the second period I2, the second, third, fourth, fifth, and sixth switch elements T2, T3, T4, T5, and T6 are turned on, and the driving element DT is turned on. During the second period I2, the first and seventh switch elements T1 and T7 are turned off. During the second period I2, the driving element DT is turned off when the voltage of the second capacitor C2 reaches the threshold voltage Vth of the driving element DT.

At the end of the second period I2, the voltage of the second node G is the reference voltage VREF, and the voltage of the third node S is a voltage of VREF-Vth. Here, 'Vth' is the threshold voltage of the driving element DT. Therefore, at the end of the second period I2, the voltage of the second capacitor C2 and the gate-source voltage Vgs of the driving element DT are the threshold voltage Vth of the driving element DT. At the end of the second period I2, the voltage of the fifth node n5 is the anode reset voltage VAR, and therefore the light-emitting element EL does not emit light during the second period I2. During the second period I2, the voltage of the first capacitor C1 is 0[V].

Figure 5A:
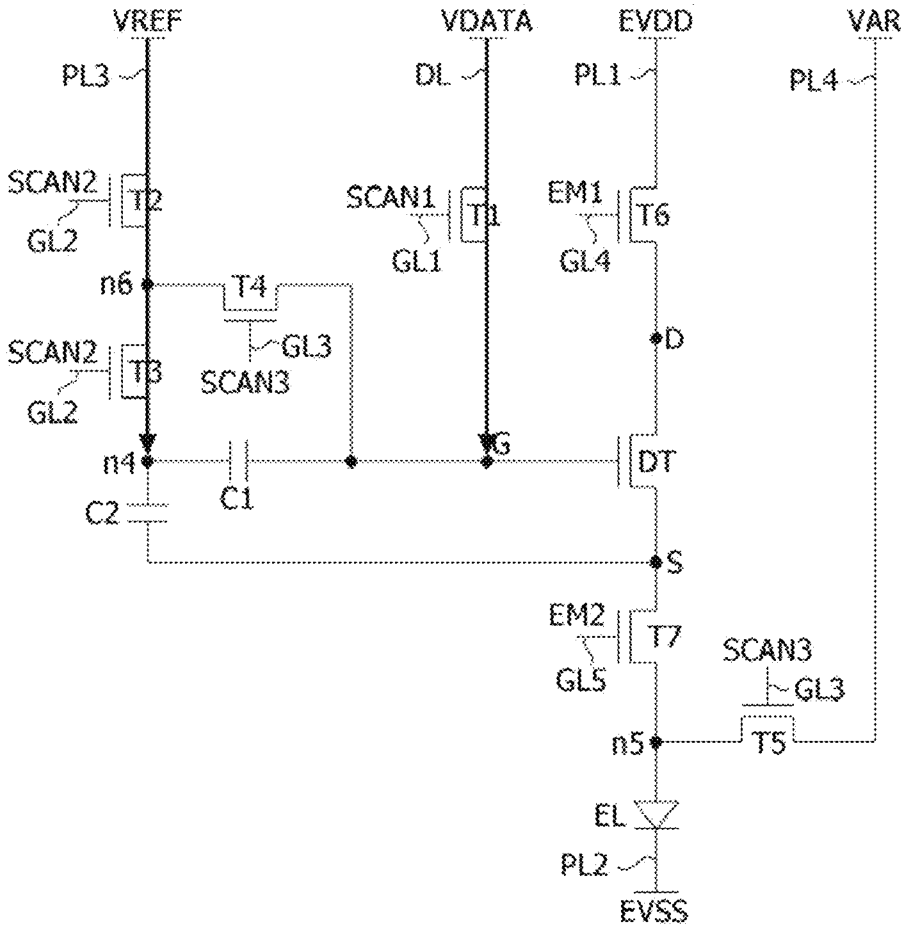

FIG. 5A is a circuit diagram illustrating a current flowing to the pixel circuit shown in FIG. 1 during the third period I3.

Figure 5B:
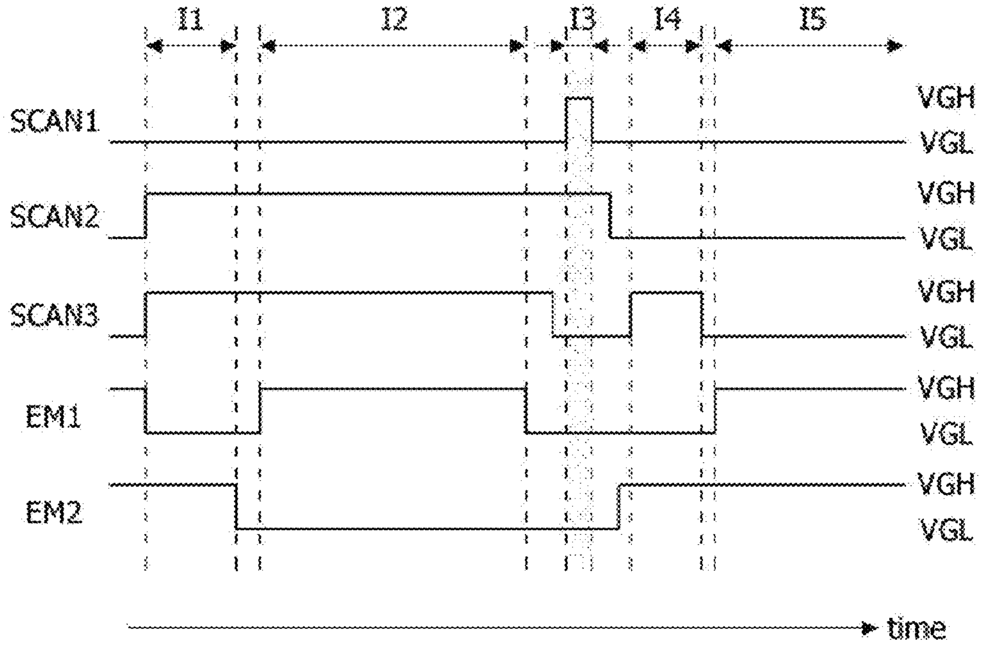

Referring to FIG. 5A and FIG. 5B, during the third period I3, the data voltage VDATA of the pixel data is stored in the first capacitor C1. During the third period I3, the voltage of the first gate signal SCAN1 and the second gate signal SCAN2 is the gate-on voltage VGH. During the third period I3, the voltage of the third gate signal SCAN3, the fourth gate signal EM1, and the fifth gate signal EM2 is the gate-off voltage VGL. During the third period I3, the first, second, and third switch elements T1, T2, and T3 are turned on, and the fourth, fifth, sixth, and seventh switch elements T4, T5, T6, and T7 are turned off. During the third period I3, the data voltage VDATA is applied to the second node G through the first switch element T1, and the reference voltage VREF is applied to the fourth node n4 through the second and third switch elements T2 and T3.

At the end of the third period I3, the voltage of the second node G is the data voltage VDATA, and the voltage of the first node C1 is a voltage of VDATA−VREF. At the end of the third period I3, the voltage of the third node S is a voltage of VREF-Vth and the voltage of the second capacitor C2 is the threshold voltage Vth of the driving element DT. At the end of the third period I3, the gate-source voltage Vgs of the driving element DT is a voltage of VDATA−VREF+Vth.

Figure 6A:
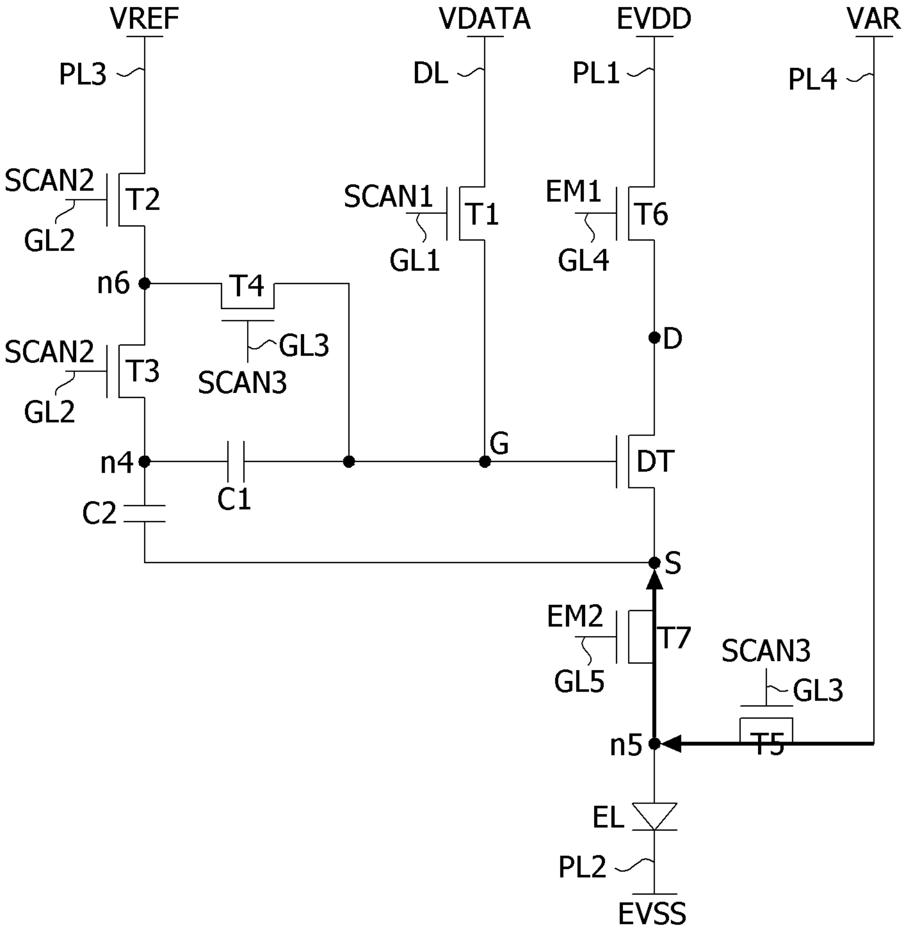

FIG. 6A is a circuit diagram illustrating a current flowing to the pixel circuit shown in FIG. 1 during the fourth period I4.

Figure 6B:
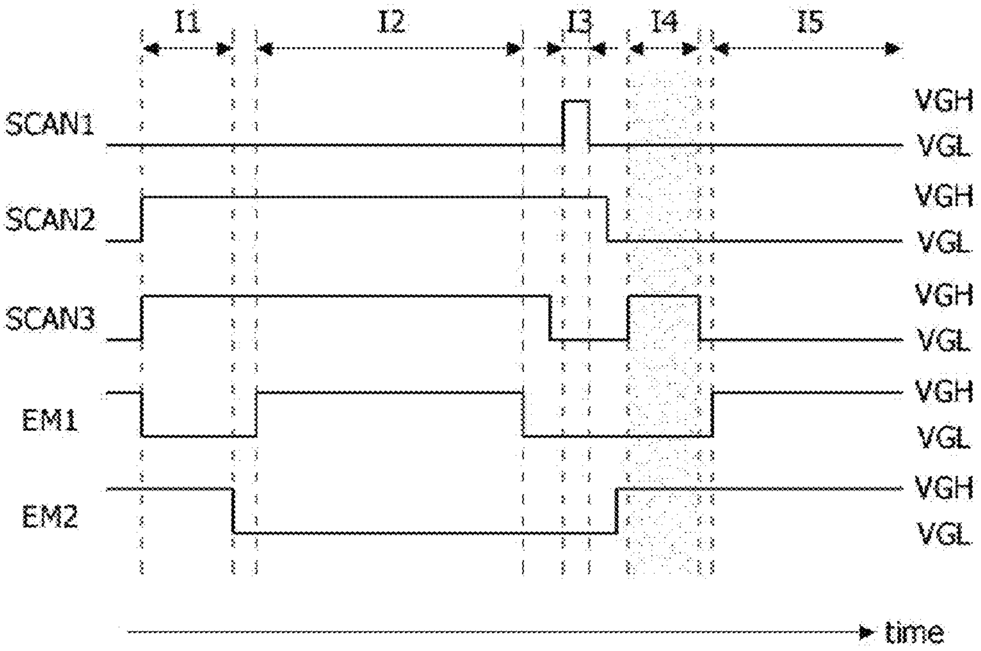

Referring to FIGS. 6A and 6B, in the fourth period I4, an anode voltage of the light-emitting element EL can be reset to the anode reset voltage VAR. During the fourth period I4, the voltage of the third gate signal SCAN3 and the fifth gate signal EM2 is the gate-on voltage VGH. During the fourth period I4, the voltage of the first gate signal SCAN1, the second gate signal SCAN2, and the fourth gate signal EM1 is the gate-off voltage VGL. Therefore, during the fourth period I4, the fourth, fifth, and seventh switch elements T4, T5, and T7 are turned on, and the first, second, third, and sixth switch elements T1, T2, T3, and T6 are turned off. During the fourth period I4, although the fourth switch element T4 is turned on, no reference voltage VREF is applied to the second node G because the second switch element T2 is in the off-state.

At the end of the fourth period I4, the voltage of the third node S and the fifth node n5 is the anode reset voltage VAR. The anode reset voltage VAR applied to the third node S through capacitor coupling is transferred to the second node G, and therefore the voltage of the second node G at the end of the fourth period I4 is a voltage of (VDATA−VREF+Vth)+VAR. At the end of the fourth period I4, the voltage of the first capacitor C1 is a voltage of VDATA−VREF and the voltage of the second capacitor C2 is the threshold voltage Vth of the driving element DT. At the end of the fourth period I4, the gate-source voltage Vgs of the driving element DT is a voltage of VDATA−VREF+Vth.

Figure 7A:
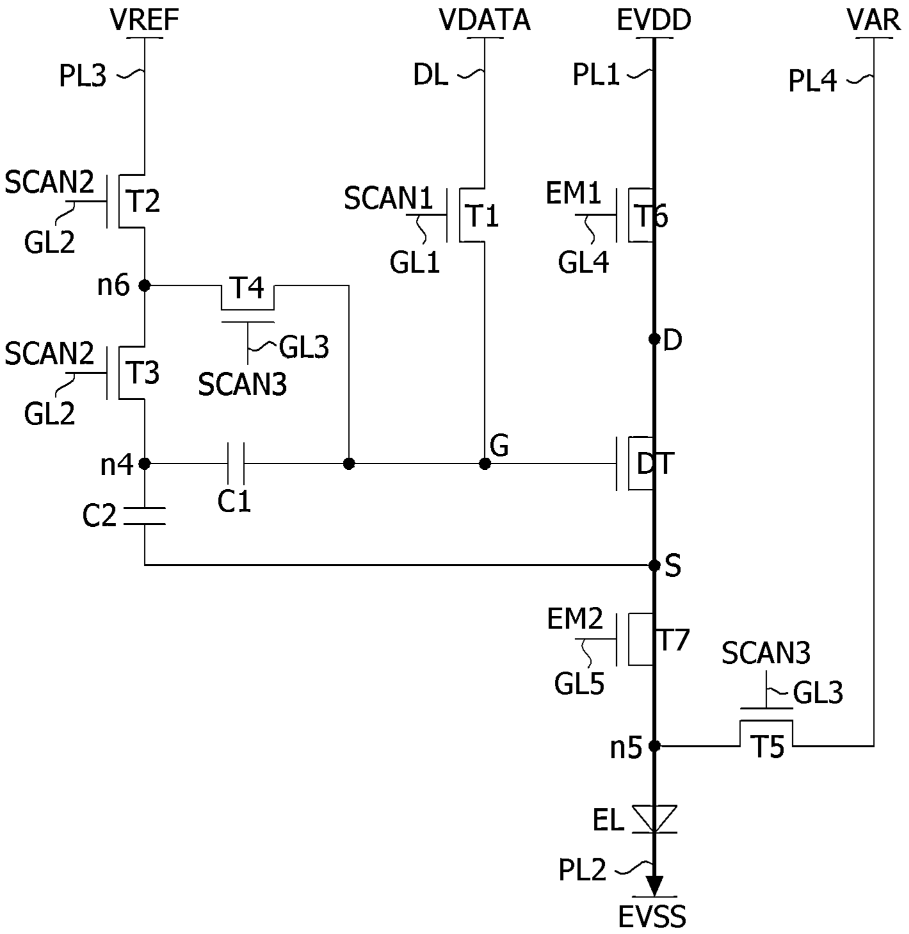

FIG. 7A is a circuit diagram illustrating a current flowing to the pixel circuit shown in FIG. 1 during the fifth period I5.

Figure 7B:
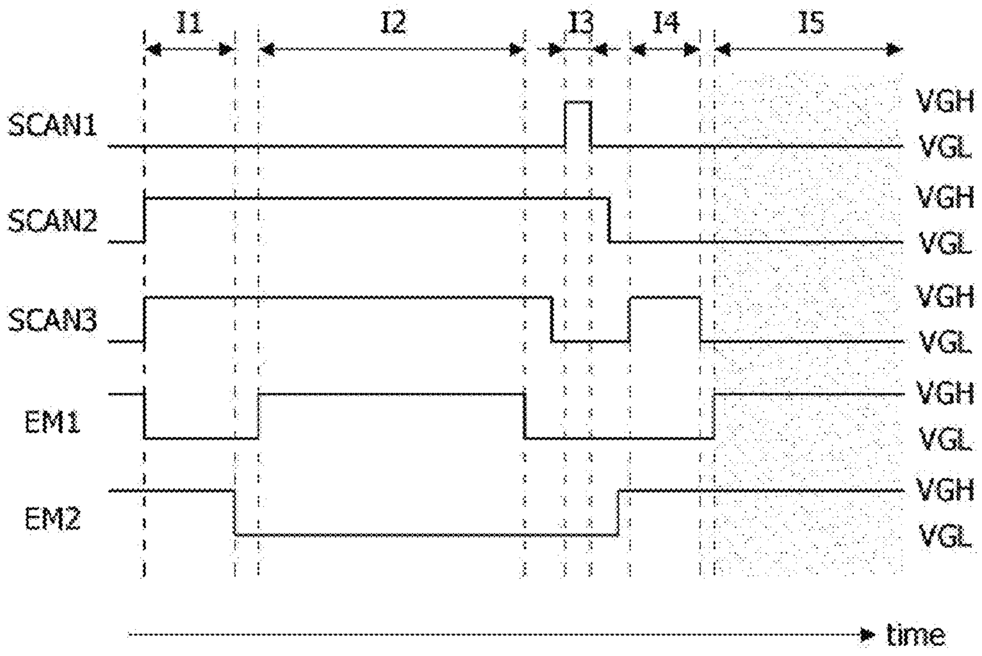

Referring to FIGS. 7A and 7B, during the fifth period I5, the driving element DT generates a current according to the gate-source voltage Vgs to drive the light-emitting element EL. The light-emitting element EL can be emitted at a luminance corresponding to a grayscale value of the pixel data by the current flowing through the driving element DT.

During the fifth period I5, the voltage of the fourth and fifth gate signals EM1 and EM2 is the gate-on voltage VGH, and the voltage of the first, second, and third gate signals SCAN1, SCAN2, and SCAN3 is the gate-off voltage VGL. During the fifth period I5, the sixth and seventh switch elements T6 and T7 are turned on, and the first to fifth switch elements T1 to T5 are turned off. During the fifth period I5, the voltage of the second node G is a voltage equal to VDATA−VREF+Vth+Voled, and the voltage of the third node S is a voltage equal to Voled. Here, the voltage of Voled is the anode voltage at the time when the light-emitting element EL is emitted. Therefore, during the fifth period I5, the gate-source voltage Vgs of the driving element DT is a voltage of VDATA−VREF+Vth. During the fifth period I5, the voltage of the first capacitor C1 is VDATA−VREF, and the voltage of the second capacitor C2 is the threshold voltage Vth of the driving element DT.

Figure 8:
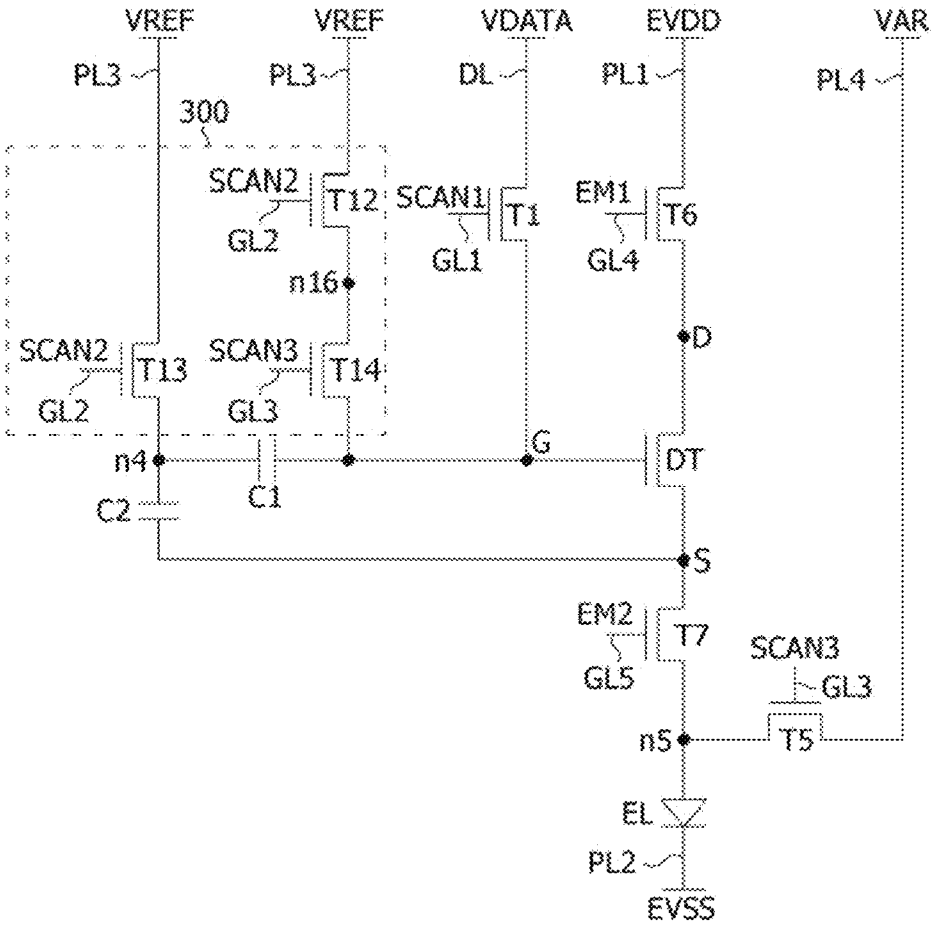
FIG. 8 is a circuit diagram illustrating a pixel circuit according to a second embodiment of the present disclosure.
Figure 9:
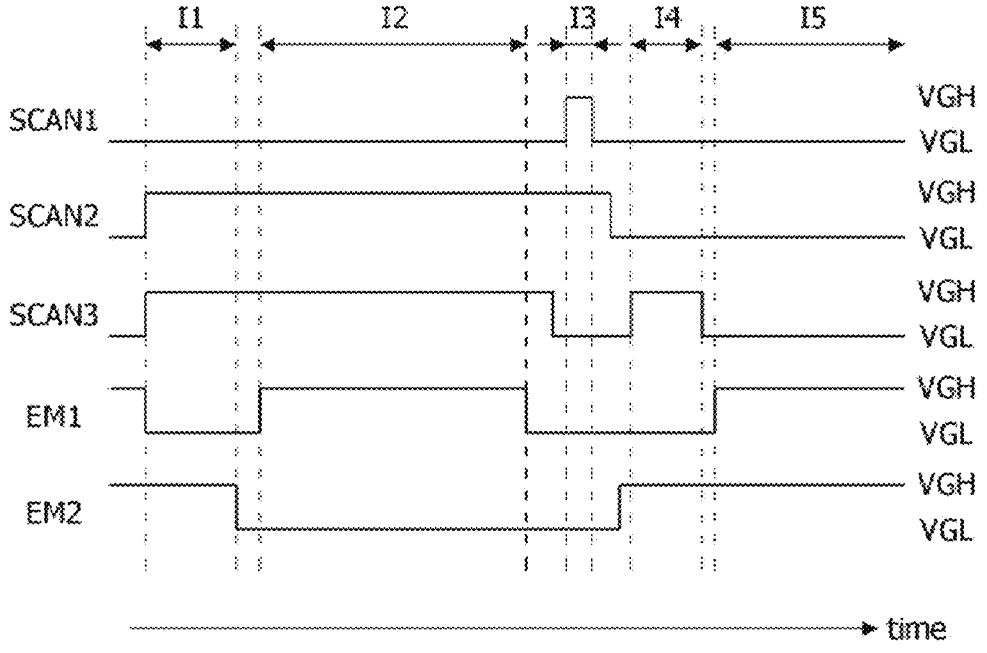
FIG. 9 is a waveform diagram illustrating waveforms of gate signals applied to the pixel circuit shown in FIG. 8.

FIG. 8 is a circuit diagram illustrating a pixel circuit according to a second embodiment of the present disclosure. FIG. 9 is a waveform diagram illustrating waveforms of gate signals applied to the pixel circuit shown in FIG. 8. In the second embodiment, the components that are substantially the same as those of the first embodiment described above are designated by the same reference numerals, and a detailed description thereof is omitted or may be briefly provided.

Referring to FIGS. 8 and 9, a pixel circuit includes an emitting element EL, a driving element DT driving the emitting element EL, a plurality of switch elements T1, T12 to T14, and T5 to T7, a first capacitor C1, and a second capacitor C2. The driving element DT and the switch elements T1, T12 to T14, and T5 to T7 can be implemented as n-channel oxide TFTs.

A voltage of the first gate signal SCAN1 is generated as a pulse of the gate-on voltage VGH during the third periods I3 and is the gate-off voltage VGL during the first period I1, the second period I2, the fourth period I4, and the fifth periods I5. A voltage of the second gate signal SCAN2 is generated as a pulse of the gate-on voltage VGH during the first to third periods I1, I2, and I3 and is the gate-off voltage VGL during the fourth and the fifth periods I4 and I5.

A voltage of the third gate signal SCAN3 is generated as a pulse of the gate-on voltage VGH during the first period I1, the second periods I2, and the fourth period I4 and is the gate-off voltage VGL during the third and the fifth periods I3 and I5. A voltage of the fourth gate signal EM1 is generated as a pulse of the gate-off voltage VGL during the first period I1, is generated as a pulse of the gate-on voltage VGH during the second period I2, and then is the gate-off voltage VGL during the third to the fifth periods I3 and I4. A voltage of the fourth gate signal EM1 is the gate-on voltage VGH during the fifth period I5. A voltage of the fifth gate signal EM2 is the gate-on voltage VGH during the first, fourth and fifth periods I1, I4, and I5 and is generated as a pulse of the gate-off voltage VGL during the second and third periods I2 and I3.

Between the second period I2 and the third period I3, after the voltage of the fourth gate signal EM1 is inverted to the gate-off voltage VGL, the voltage of the third gate signal SCAN3 can be inverted to the gate-off voltage VGL, and then the first scan signal SCAN1 can be inverted to the gate-on voltage VGH. Between the third period I3 and the fourth period I4, after the voltage of the first gate signal SCAN1 is inverted to the gate-off voltage VGL, the voltage of the second gate signal SCAN2 can be inverted to the gate-off voltage VGL, and then the voltage of the fifth gate signal SCAN2 can be inverted to the gate-on voltage VGH. The voltage of the fifth gate signal EM2 is inverted to the gate-on voltage VGH, and then the voltage of the third gate signal SCAN3 can be inverted to the gate-on voltage VGH.

The driving element DT includes a first electrode connected to a first node D, a gate electrode connected to a second node G, and a second electrode connected to a third node S.

The light-emitting element EL can be implemented as an OLED. The light-emitting element EL includes an anode electrode, a cathode electrode, and an organic compound layer formed between the electrodes. The anode electrode of the light-emitting element EL is connected to a fifth node n5, and the cathode electrode thereof is connected to the second constant voltage node PL2 to which the cathode voltage EVSS is applied.

The first capacitor C1 is connected between the second node G and a fourth node n4. The second capacitor C2 is connected between the third node S and the fourth node n4.

The switch elements T1, T12 to T14, and T5 to T7 of the pixel circuit include a first switch element T1 that supplies a data voltage VDATA of pixel data to the second node G in response to the first gate signal SCAN1, a second switch element T12 that supplies the reference voltage VREF to a sixth node n16 in response to the second gate signal SCAN2, a third switch element T13 that supplies the reference voltage VREF to the fourth node n4 in response to the second gate signal SCAN2, a fourth switch element T14 that electrically connects the sixth node n16 to the second node G in response to the third gate signal SCAN3, a fifth switch element T5 that supplies the anode reset voltage VAR to the fifth node n5 in response to the third gate signal SCAN3, a sixth switch element T6 that supplies the pixel driving voltage EVDD to the first node D in response to the fourth gate signal EM1, and a seventh switch element T7 that electrically connects the third node S to the fifth node n5 in response to the fifth gate signal EM2.

The first switch element T1 includes a first electrode connected to the data line DL to which the data voltage VDATA is applied, a gate electrode connected to a first gate line GL1 to which the first gate signal SCAN1 is applied, and a second electrode connected to the second node G.

The second to fourth switch elements T12, T13, and T14 are a reference voltage switch circuit 300 that selectively applies the reference voltage VREF to the second node G and the fourth node n4.

The second switch element T12 is turned on in response to the pulse of the second gate signal SCAN2 generated as the gate-on voltage VGH during the first to third periods I1 to I3. When the second switch element T12 is turned on, the reference voltage VREF is applied to the sixth node n16. The second switch element T12 is turned off during the fourth and fifth periods I4 and I5. The second switch element T12 includes a first electrode connected to the third constant voltage node PL3 to which the reference voltage VREF is applied, a gate electrode connected to a second gate line GL2 to which the second gate signal SCAN2 is applied, and a second electrode connected to the sixth node n16.

The third switch element T13 is turned on in response to the gate-on voltage VGH of the second gate signal SCAN2 during the first to third periods I1 to I3. When the third switch element T13 is turned on, the reference voltage VREF is applied to the fourth node n4. The third switch element T13 is turned off during the fourth and fifth periods I4 and I5. The third switch element T13 includes a first electrode connected to the third constant voltage node PL3 to which the reference voltage VREF is applied, a gate electrode connected to a second gate line GL2 to which the second gate signal SCAN2 is applied, and a second electrode connected to the fourth node n4.

The fourth switch element T14 is turned on in response to the pulse of the third gate signal SCAN3 generated as the gate-on voltage VGH during the first period I1, the second period I2, and the fourth period I4. When the fourth switch element T14 is turned on, the sixth node n16 is electrically connected to the second node G. The fourth switch element T14 is turned off during the third period I3 and the fifth period I5. The fourth switch element T14 includes a first electrode connected to the sixth node n16, a gate electrode connected to the third gate line GL3 to which the third gate signal SCAN3 is applied, and a second electrode connected to the second node G.

The fifth switch element T5 includes a first electrode connected to the fifth node n5, a gate electrode connected to the third gate line GL3, and a second electrode connected to the fourth constant voltage node PL4 to which the anode reset voltage VAR is applied. The sixth switch element T6 includes a first electrode connected to the first constant voltage node PL1 to which the pixel driving voltage EVDD is applied, a gate electrode connected to the fourth gate line GL4 to which the fourth gate signal EM1 is applied, and a second electrode connected to the first node D. The seventh switch element T7 includes a first electrode connected to the third node S, a gate electrode connected to the fifth gate line GL5 to which the fifth gate signal EM2 is applied, and a second electrode connected to the fifth node n5.

Figure 10A:
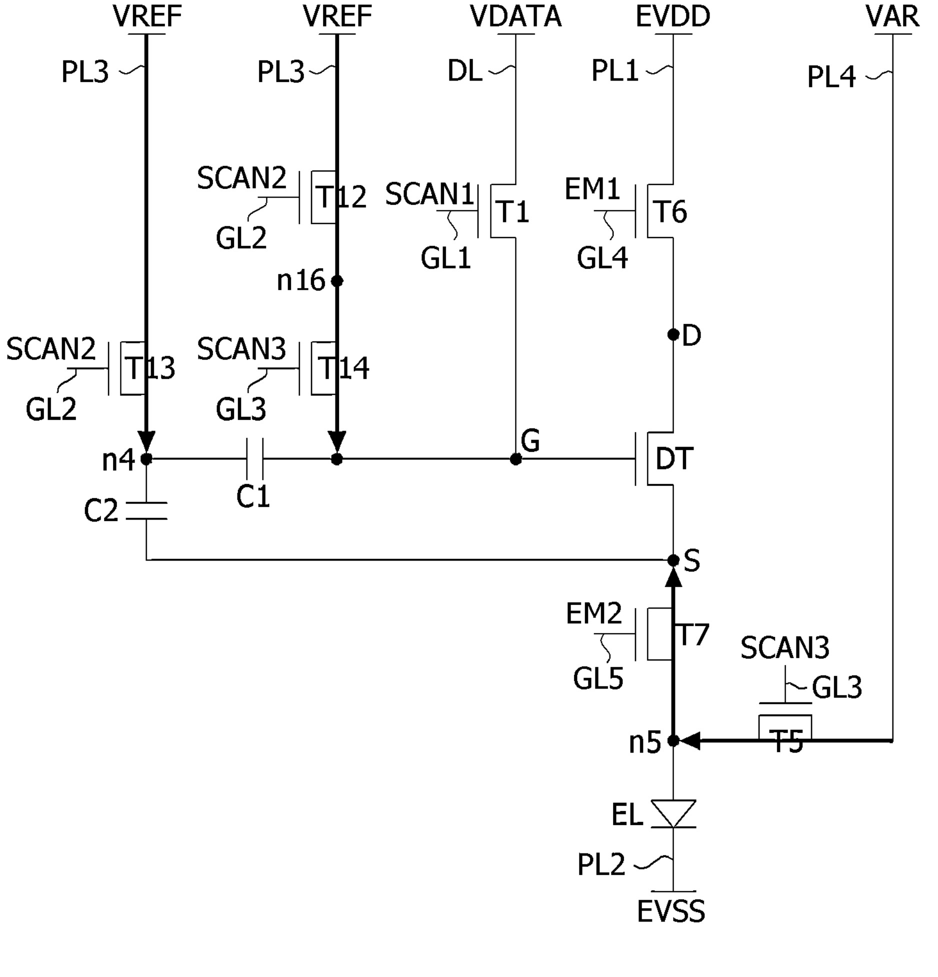
FIGS. 10A to 14B are circuit diagrams illustrating the operation of the pixel circuit shown in FIG. 8 in stages.

FIGS. 10A to 14B are diagrams illustrating driving periods of the pixel circuit shown in FIG. 8 in stages. Particularly, FIG. 10A is a circuit diagram illustrating a current flowing to the pixel circuit shown in FIG. 8 during the first period I1.

Figure 10B:
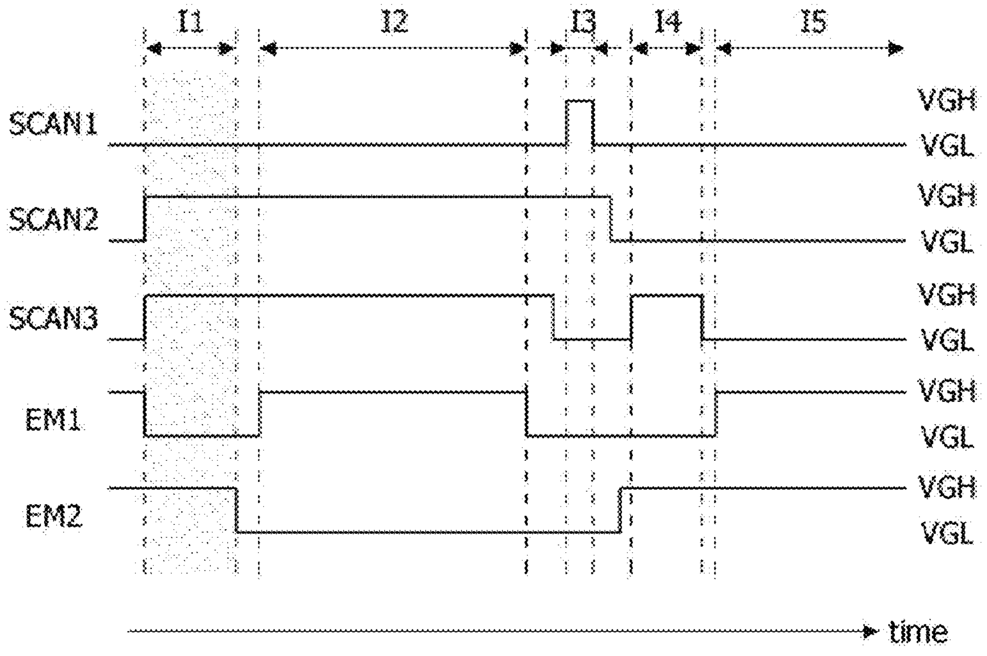

Referring to FIGS. 10A and 10B, during the first period I1, the main nodes of the pixel circuit are initialized. During the first period I1, the voltage of the second gate signal SCAN2, the third gate signal SCAN3, and the fifth gate signal EM2 is the gate-on voltage VGH. During the first period I1, the voltage of the first gate signal SCAN1 and the fourth gate signal EM1 is the gate-off voltage VGL. Therefore, during the first period I1, the second, third, fourth, fifth, and seventh switch elements T12, T13, T14, T5, and T7 are turned on, and the first and sixth switch elements T1 and T6 are turned off. As a result, during the first period I1, the voltage of the second node G is initialized to the reference voltage VREF and the voltage of the third node S is initialized to the anode reset voltage VAR. During the first period I1, the voltage of the first capacitor C1 is 0[V] because the second node G and the fourth node n4 have the same voltage. The voltage of the second capacitor C2 and the voltage of the gate-source voltage Vgs of the driving element DT are equal to a voltage of (VREF-VAR) in the first period I1.

Figure 11A:
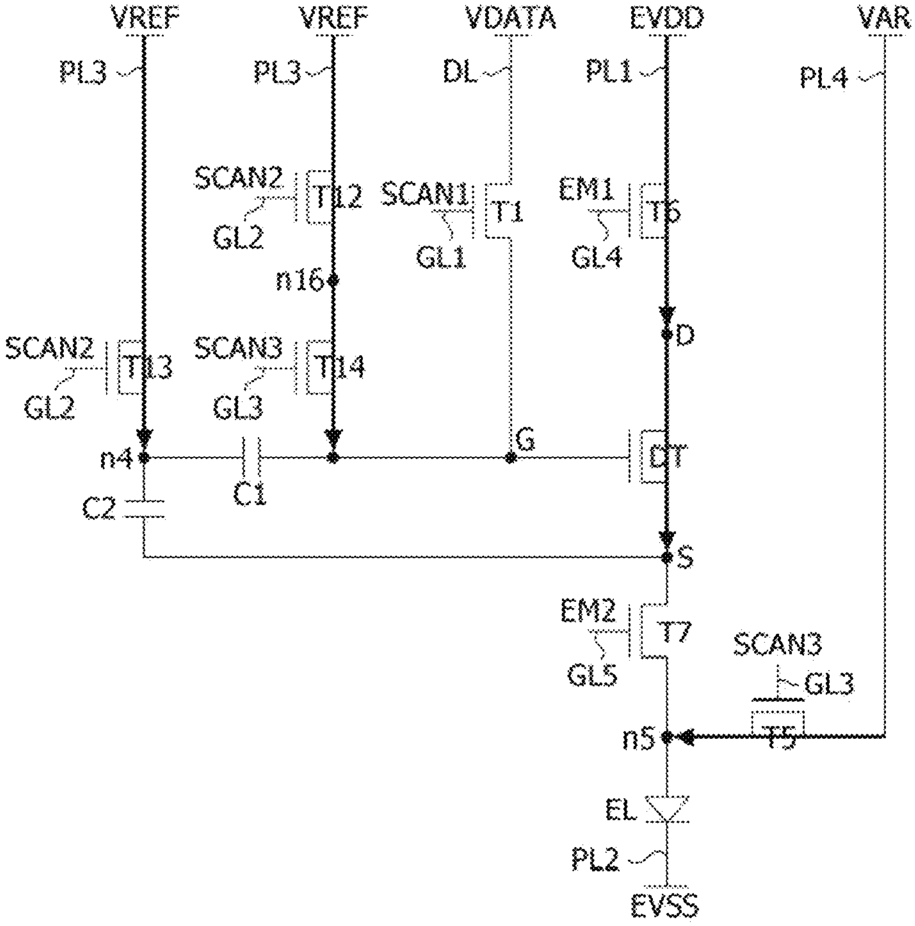

FIG. 11A is a circuit diagram illustrating a current flowing to the pixel circuit shown in FIG. 8 during the second period I2.

Figure 11B:
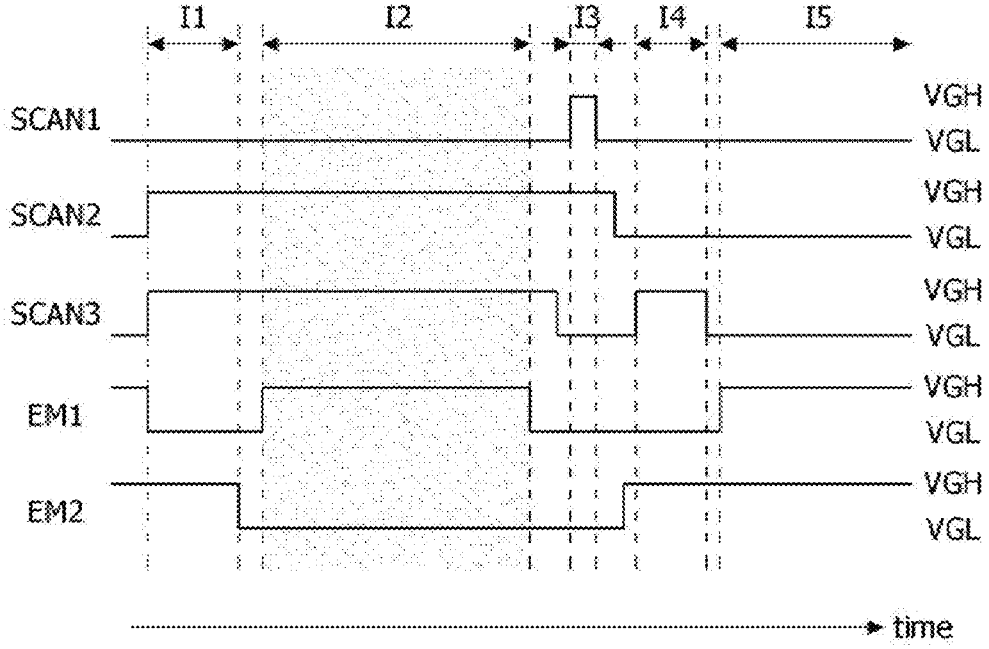

Referring to FIGS. 11A and 11B, during the second period I2, the threshold voltage Vth of the driving element DT is sensed and stored in the second capacitor C2. During the second period I2, the voltage of the second gate signal SCAN2, the third gate signal SCAN3, and the fourth gate signal EM1 is the gate-on voltage VGH. During the second period I2, the voltage of the first gate signal SCAN1 and the fifth gate signal EM2 is the gate-off voltage VGL. During the second period I2, the second, third, fourth, fifth, and sixth switch elements T12, T13, T14, T5, and T6 are turned on, and the driving element DT is turned on. During the second period I2, the first and seventh switch elements T1 and T7 are turned off. During the second period I2, the driving element DT is turned off when the voltage of the second capacitor C2 reaches the threshold voltage Vth of the driving element DT.

At the end of the second period I2, the voltage of the second node G and the fourth node n4 is the reference voltage VREF, and the voltage of the third node S is a voltage of VREF-Vth. Here, a voltage of 'Vth' is the threshold voltage of the driving element DT. During the second period I2, the voltage of the first capacitor C1 is 0 [V]. At the end of the second period I2, the voltage of the second capacitor C2 and the gate-source voltage Vgs of the driving element DT are the threshold voltage Vth of the driving element DT. At the end of the second period I2, the voltage of the fifth node n5 is the anode reset voltage VAR, and therefore the light-emitting element EL does not emit light during the second period I2.

Figure 12A:
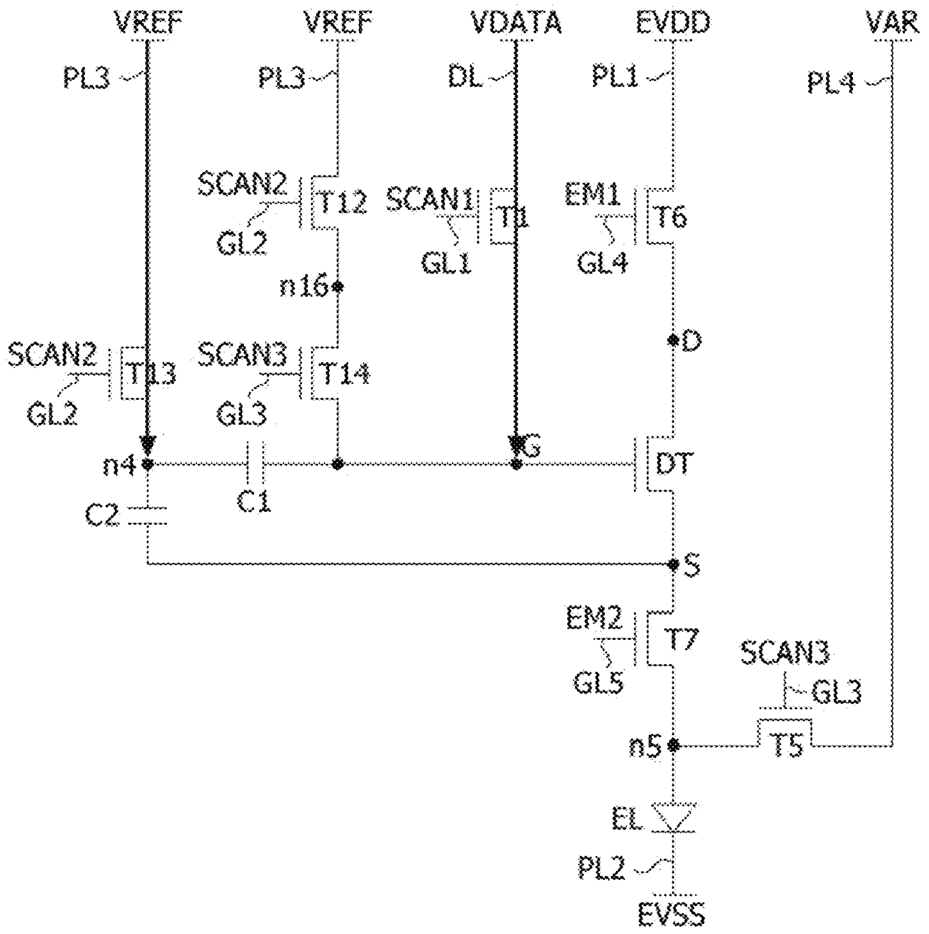
Figure 12B:
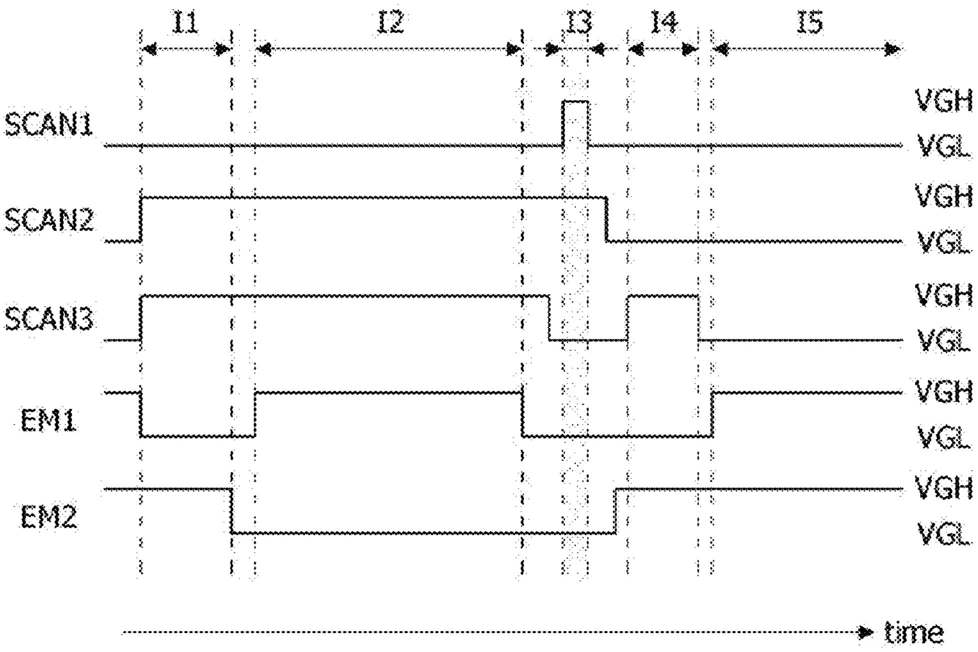

FIG. 12A is a circuit diagram illustrating a current flowing to the pixel circuit shown in FIG. 8 during the third period I3.

Referring to FIGS. 12A and I2B, during the third period I3, the data voltage VDATA of pixel data is stored in the first capacitor C1. During the third period I3, the voltage of the first gate signal SCAN1 and the second gate signal SCAN2 is the gate-on voltage VGH. During the third period I3, the voltage of the third gate signal SCAN3, the fourth gate signal EM1, and the fifth gate signal EM2 is the gate-off voltage VGL. During the third period I3, the first, second, and third switch elements T1, T12, and T13 are turned on, and the fourth, fifth, sixth, and seventh switch elements T14, T5, T6, and T7 are turned off. During the third period I3, the data voltage VDATA is applied to the second node G through the first switch element T1, and the reference voltage VREF is applied to the fourth node n4 through the third switch element T3. In the third period I3, although the second switch element T12 is turned on, no reference voltage VREF is applied to the second node G because the fourth switch element T14 is in the off-state.

At the end of the third period I3, the voltage of the second node G is the data voltage VDATA, and the voltage of the first capacitor C1 is a voltage of VDATA−VREF. At the end of the third period I3, the voltage of the third node S is a voltage of VREF-Vth and the voltage of the second capacitor C2 is the threshold voltage Vth of the driving element DT. At the end of the third period I3, the gate-source voltage Vgs of the driving element DT is a voltage of VDATA−VREF+Vth.

Figure 13A:
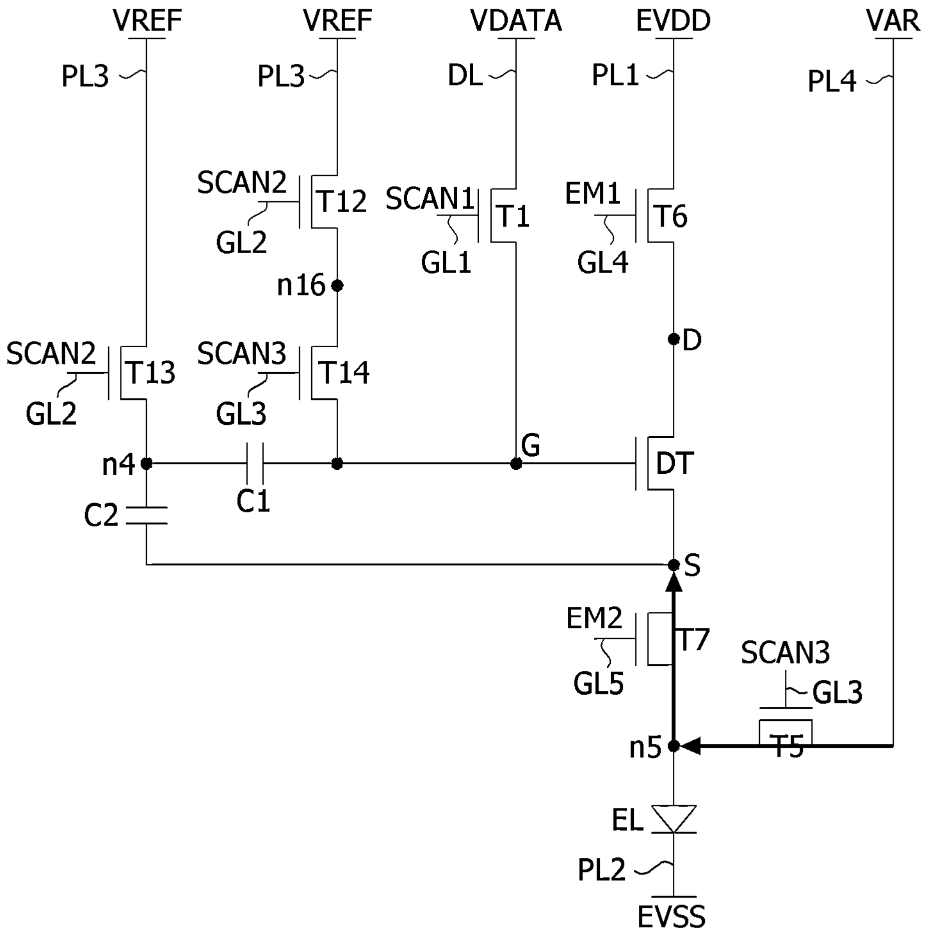
Figure 13B:
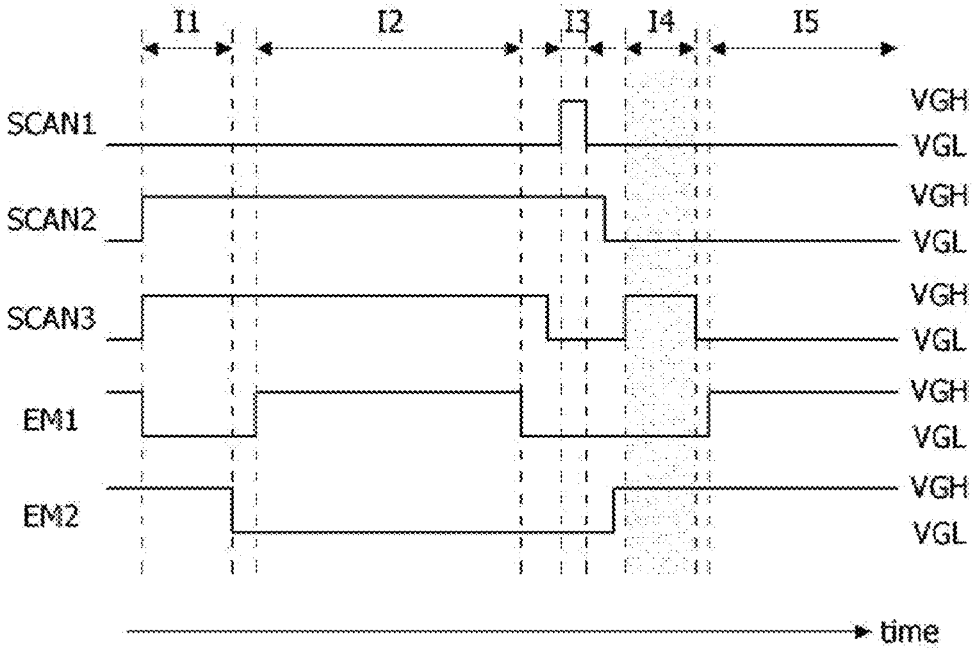

FIG. 13A is a circuit diagram illustrating a current flowing to the pixel circuit shown in FIG. 8 during the fourth period I4.

Referring to FIGS. 13A and I3B, in the fourth period I4, an anode voltage of the light-emitting element EL can be reset to the anode reset voltage VAR. During the fourth period I4, the voltage of the third gate signal SCAN3 and the fifth gate signal EM2 is the gate-on voltage VGH. During the fourth period I4, the voltage of the first gate signal SCAN1, the second gate signal SCAN2, and the fourth gate signal EM1 is the gate-off voltage VGL. Therefore, during the fourth period I4, the fourth, fifth, and seventh switch elements T14, T5, and T7 are turned on, and the first, second, third, and sixth switch elements T1, T12, T13, and T6 are turned off. During the fourth period I4, although the fourth switch element T14 is turned on, no reference voltage VREF is applied to the second node G because the second switch element T12 is in the off-state.

At the end of the fourth period I4, the voltage of the third node S and the fifth node n5 is the anode reset voltage VAR. The anode reset voltage VAR applied to the third node S through capacitor coupling is transferred to the second node G, and therefore the voltage of the second node G at the end of the fourth period I4 is a voltage of (VDATA−VREF+Vth)+VAR. At the end of the fourth period I4, the voltage of the first capacitor C1 is a voltage of VDATA−VREF and the voltage of the second capacitor C2 is the threshold voltage Vth of the driving element DT. At the end of the fourth period I4, the gate-source voltage Vgs of the driving element DT is a voltage of VDATA−VREF+Vth.

Figure 14A:
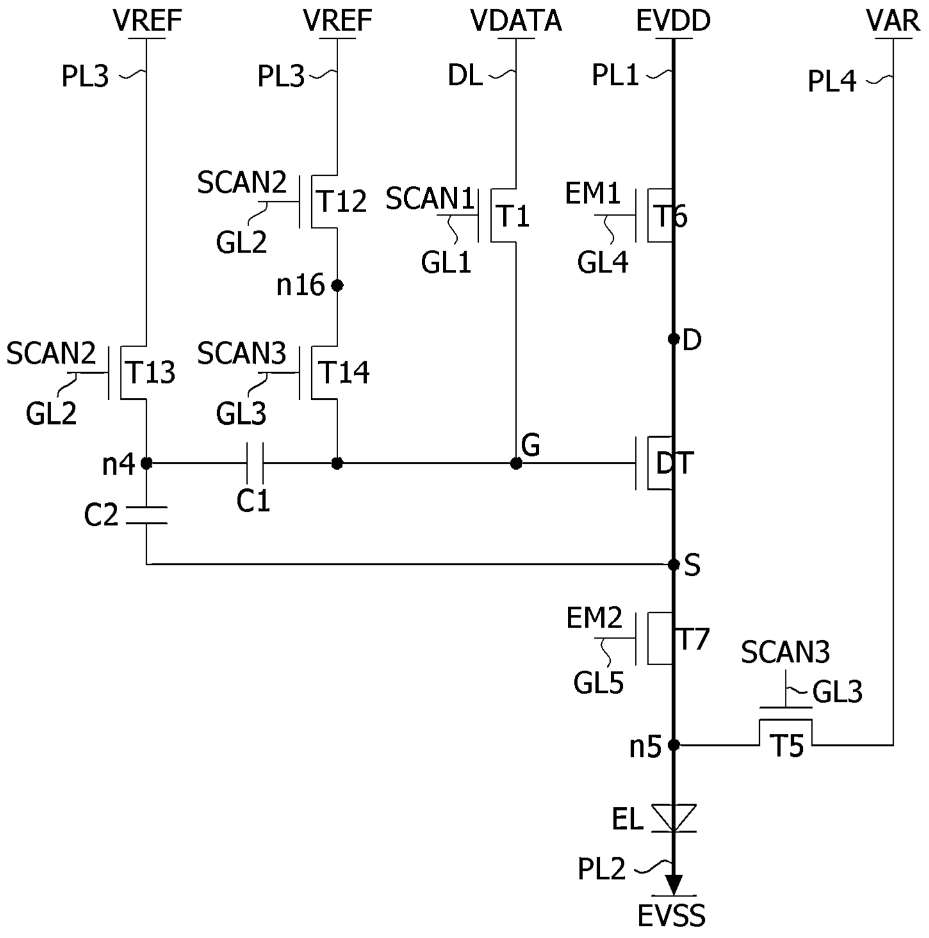
Figure 14B:
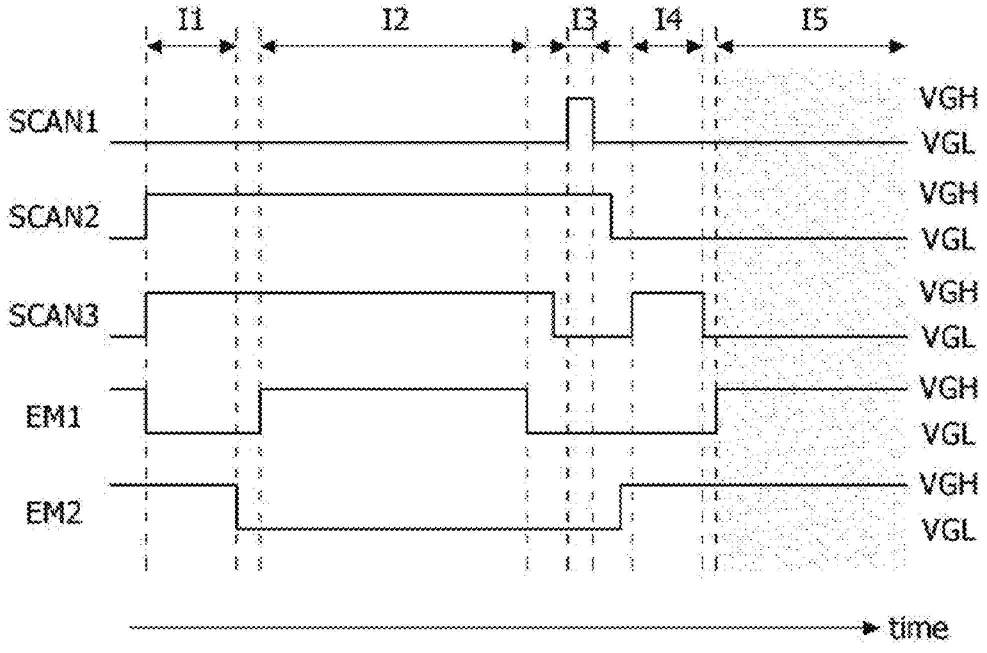

FIG. 14A is a circuit diagram illustrating a current flowing to the pixel circuit shown in FIG. 8 during the fifth period I5.

Referring to FIGS. 14A and I4B, during the fifth period I5, the driving element DT generates a current according to the gate-source voltage Vgs to drive the light-emitting element EL. The light-emitting element EL can be emitted at a luminance corresponding to a grayscale value of the pixel data by the current flowing through the driving element DT.

During the fifth period I5, the voltage of the fourth and fifth gate signals EM1 and EM2 is the gate-on voltage VGH, and the voltage of the first, second, and third gate signals SCAN1, SCAN2, and SCAN3 is the gate-off voltage VGL. During the fifth period I5, the sixth and seventh switch elements T6 and T7 are turned on, while the first to fifth switch elements T1, T12, T13, and T1 to T5 are turned off. During the fifth period I5, the voltage of the second node G is a voltage equal to VDATA−VREF+Vth+Voled, and the voltage of the third node S is a voltage equal to Voled. Therefore, during the fifth period I5, the gate-source voltage Vgs of the driving element DT is a voltage of VDATA−VREF+Vth. During the fifth period I5, the voltage of the first capacitor C1 is VDATA−VREF, and the voltage of the second capacitor C2 is the threshold voltage Vth of the driving element DT.

Figure 15:
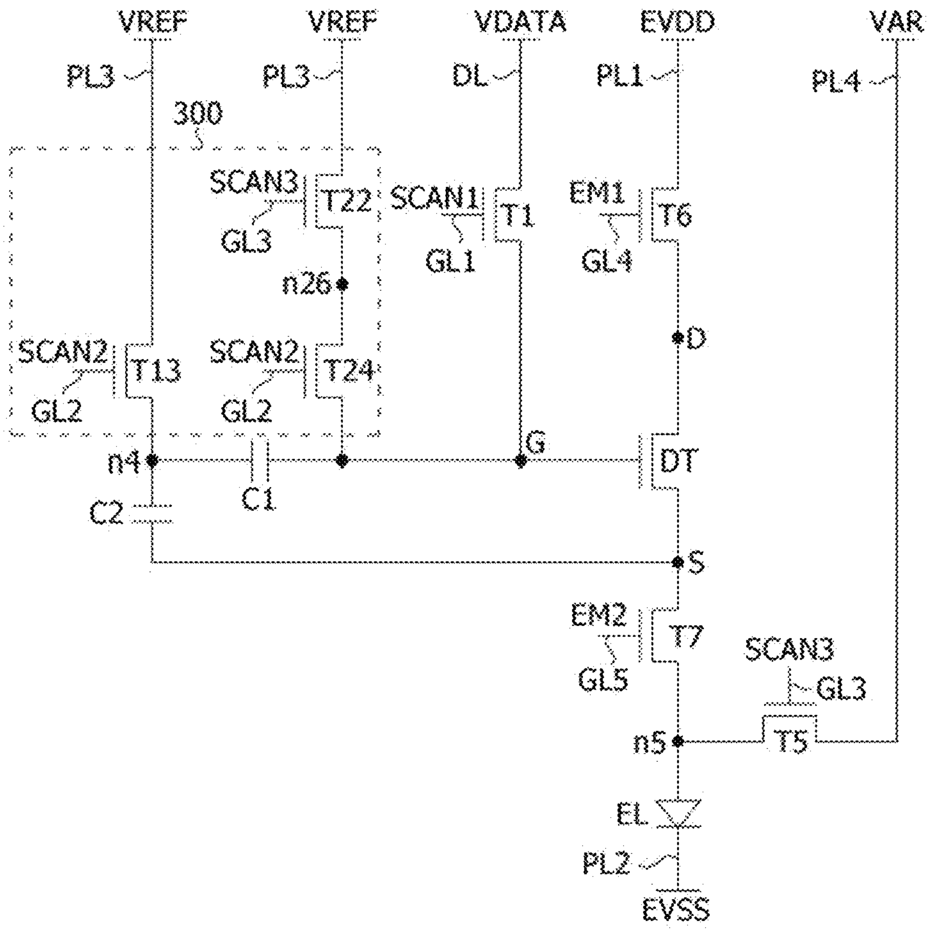
FIG. 15 is a circuit diagram illustrating a pixel circuit according to a third embodiment of the present disclosure.
Figure 16:
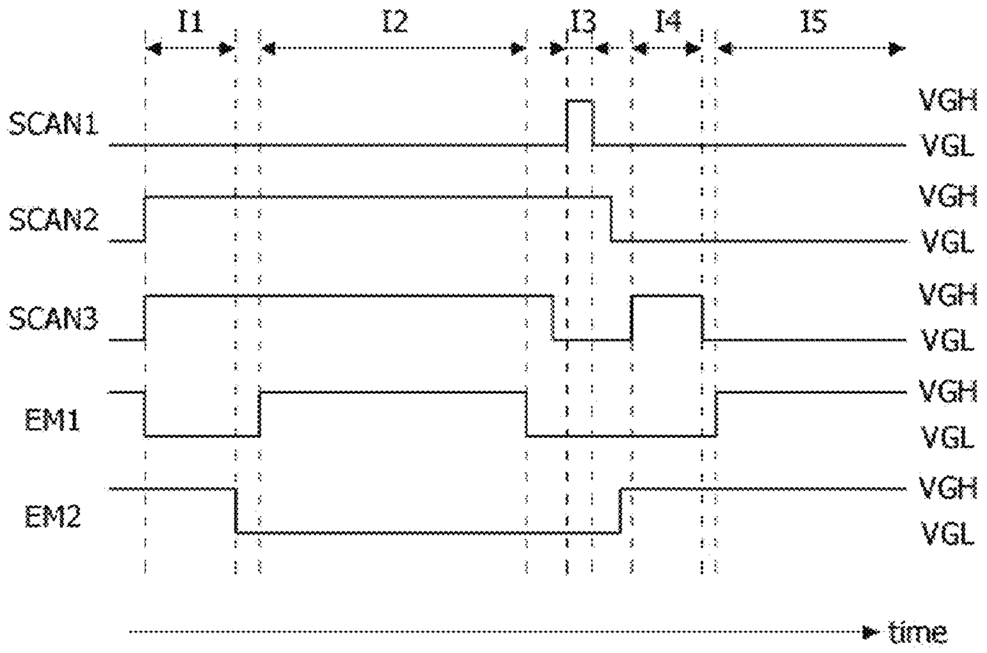
FIG. 16 is a waveform diagram illustrating waveforms of gate signals applied to the pixel circuit shown in FIG. 15.

FIG. 15 is a circuit diagram illustrating a pixel circuit according to a third embodiment of the present disclosure. FIG. 16 is a waveform diagram illustrating waveforms of gate signals applied to the pixel circuit shown in FIG. 15. In the third embodiment, the components that are substantially the same as those of the embodiments described above are designated by the same reference numerals, and a detailed description thereof is omitted or may be briefly provided.

Referring to FIGS. 15 and 16, a pixel circuit includes an emitting element EL, a driving element DT driving the emitting element EL, a plurality of switch elements T1, T22, T13, T24, T5, T6, and T7, a first capacitor C1, and a second capacitor C2. The driving element DT and the switch elements T1, T22, T13, T24, T5, T6, and T7 can be implemented as n-channel oxide TFTs.

A voltage of the first gate signal SCAN1 is generated as a pulse of the gate-on voltage VGH during the third periods I3 and is the gate-off voltage VGL during the first period I1, the second period I2, the fourth period I4, and the fifth periods I5. A voltage of the second gate signal SCAN2 is generated as a pulse of the gate-on voltage VGH during the first to third periods I1, I2, and I3 and is the gate-off voltage VGL during the fourth and the fifth periods I4 and I5.

A voltage of the third gate signal SCAN3 is generated as a pulse of the gate-on voltage VGH during the first period I1, the second periods I2, and the fourth period I4 and is the gate-off voltage VGL during the third and the fifth periods I3 and I5. A voltage of the fourth gate signal EM1 is generated as a pulse of the gate-off voltage VGL during the first period I1, is generated as a pulse of the gate-on voltage VGH during the second period I2, and then is the gate-off voltage VGL during the third to the fifth periods I3 and I4. A voltage of the fourth gate signal EM1 is the gate-on voltage VGH during the fifth period I5. A voltage of the fifth gate signal EM2 is the gate-on voltage VGH during the first, fourth and fifth periods I1, I4, and I5 and is generated as a pulse of the gate-off voltage VGL during the second and third periods I2 and I3.

Between the second period I2 and the third period I3, after the voltage of the fourth gate signal EM1 is inverted to the gate-off voltage VGL, the voltage of the third gate signal SCAN3 can be inverted to the gate-off voltage VGL, and then the first scan signal SCAN1 can be inverted to the gate-on voltage VGH. Between the third period I3 and the fourth period I4, after the voltage of the first gate signal SCAN1 is inverted to the gate-off voltage VGL, the voltage of the second gate signal SCAN2 can be inverted to the gate-off voltage VGL, and then the voltage of the fifth gate signal SCAN2 can be inverted to the gate-on voltage VGH. The voltage of the fifth gate signal EM2 is inverted to the gate-on voltage VGH, and then the voltage of the third gate signal SCAN3 can be inverted to the gate-on voltage VGH.

The driving element DT includes a first electrode connected to a first node D, a gate electrode connected to a second node G, and a second electrode connected to a third node S.

The light-emitting element EL can be implemented as an OLED. The light-emitting element EL includes an anode electrode, a cathode electrode, and an organic compound layer formed between the electrodes. The anode electrode of the light-emitting element EL is connected to a fifth node n5, and the cathode electrode thereof is connected to the second constant voltage node PL2 to which the cathode voltage EVSS is applied.

The first capacitor C1 is connected between the second node G and a fourth node n4. The second capacitor C2 is connected between the third node S and the fourth node n4.

The switch elements T1, T22, T13, T24, T5, T6, and T7 of the pixel circuit include a first switch element T1 that supplies a data voltage VDATA of pixel data to the second node G in response to the first gate signal SCAN1, a second switch element T22 that supplies the reference voltage VREF to a sixth node n26 in response to the second gate signal SCAN3, a third switch element T13 that supplies the reference voltage VREF to the fourth node n4 in response to the second gate signal SCAN2, a fourth switch element T24 that electrically connects the sixth node n26 to the second node G in response to the third gate signal SCAN3, a fifth switch element T5 that supplies the anode reset voltage VAR to the fifth node n5 in response to the third gate signal SCAN3, a sixth switch element T6 that supplies the pixel driving voltage EVDD to the first node D in response to the fourth gate signal EM1, and a seventh switch element T7 that electrically connects the third node S to the fifth node n5 in response to the fifth gate signal EM2.

The first switch element T1 includes a first electrode connected to the data line DL to which the data voltage VDATA is applied, a gate electrode connected to a first gate line GL1 to which the first gate signal SCAN1 is applied, and a second electrode connected to the second node G.

The second to fourth switch elements T22, T13, and T24 are a reference voltage switch circuit 300 that selectively applies the reference voltage VREF to the second node G and the fourth node n4.

The second switch element T22 is turned on in response to the gate-on voltage VGH of the third gate signal SCAN3 during the first period I1, the second period I2, and the fourth period I4. When the second switch element T22 is turned on, the reference voltage VREF is applied to the sixth node n26. The second switch element T22 is turned off during the third and fifth periods I3 and I5. The second switch element T22 includes a first electrode connected to the third constant voltage node PL3 to which the reference voltage VREF is applied, a gate electrode connected to a third gate line GL3 to which the third gate signal SCAN3 is applied, and a second electrode connected to the sixth node n36.

The third switch element T13 is turned on in response to the gate-on voltage VGH of the second gate signal SCAN2 during the first to third periods I1 to I3. When the third switch element T13 is turned on, the reference voltage VREF is applied to the fourth node n4. The third switch element T13 is turned off during the fourth and fifth periods I4 and I5. The third switch element T13 includes a first electrode connected to the third constant voltage node PL3 to which the reference voltage VREF is applied, a gate electrode connected to a second gate line GL2 to which the second gate signal SCAN2 is applied, and a second electrode connected to the fourth node n4.

The fourth switch element T24 is turned on in response to the gate-on voltage VGH of the second gate signal SCAN2 during the first to third periods I1 to I3. When the fourth switch element T24 is turned on, the sixth node n26 is electrically connected to the second node G. The fourth switch element T24 is turned off during the fourth and fifth periods I4 and I5. The fourth switch element T24 includes a first electrode connected to the sixth node n26, a gate electrode connected to the second gate line GL2 to which the second gate signal SCAN2 is applied, and a second electrode connected to the second node G.

The fifth switch element T5 includes a first electrode connected to the fifth node n5, a gate electrode connected to the third gate line GL3, and a second electrode connected to the fourth constant voltage node PL4 to which the anode reset voltage VAR is applied. The sixth switch element T6 includes a first electrode connected to the first constant voltage node PL1 to which the pixel driving voltage EVDD is applied, a gate electrode connected to the fourth gate line GL4 to which the fourth gate signal EM1 is applied, and a second electrode connected to the first node D. The seventh switch element T7 includes a first electrode connected to the third node S, a gate electrode connected to the fifth gate line GL5 to which the fifth gate signal EM2 is applied, and a second electrode connected to the fifth node n5.

Figure 17A:
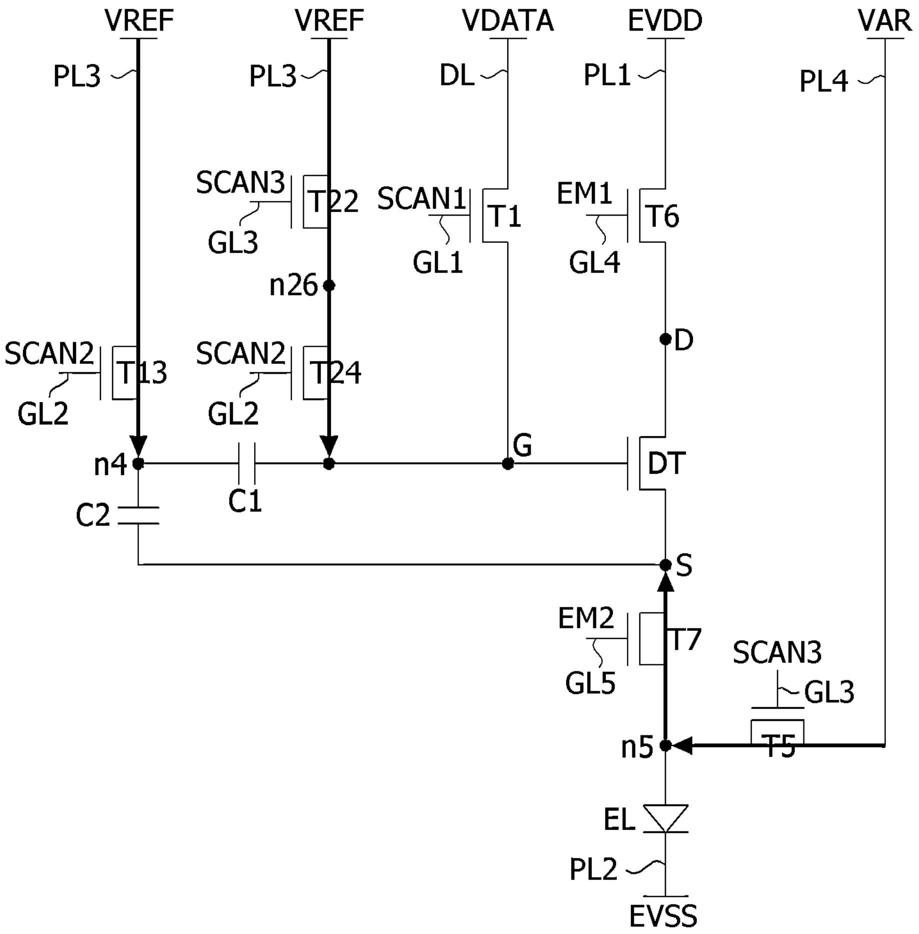
FIGS. 17A to 21B are circuit diagrams illustrating the operation of the pixel circuit shown in FIG. 15 in stages.

FIGS. 17A to 21B are circuit diagrams illustrating the operation of the pixel circuit shown in FIG. 15 in stages. Particularly, FIG. 17A is a circuit diagram illustrating a current flowing to the pixel circuit shown in FIG. 15 during the first period I1.

Figure 17B:
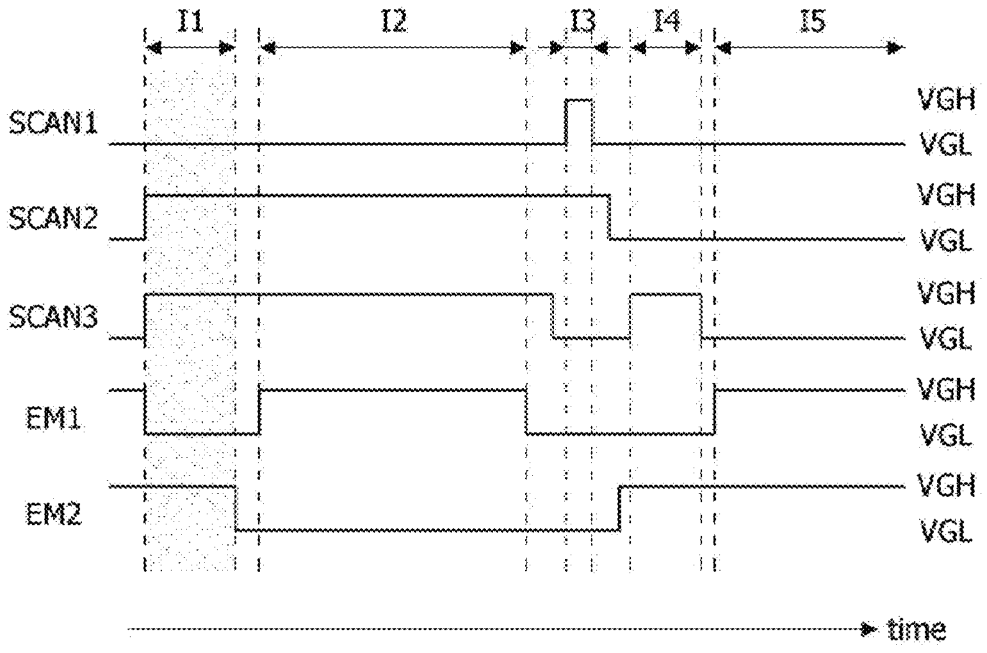

Referring to FIGS. 17A and 17B, during the first period I1, the main nodes of the pixel circuit are initialized. During the first period I1, the voltage of the second gate signal SCAN2, the third gate signal SCAN3, and the fifth gate signal EM2 is the gate-on voltage VGH. During the first period I1, the voltage of the first gate signal SCAN1 and the fourth gate signal EM1 is the gate-off voltage VGL. Therefore, during the first period I1, the second, third, fourth, fifth, and seventh switch elements T22, T13, T24, T5, and T7 are turned on, and the first and sixth switch elements T1 and T6 are turned off. As a result, during the first period I1, the voltage of the second node G and the fourth node n4 is initialized to the reference voltage VREF and the voltage of the third node S and the fifth node n5 is initialized to the anode reset voltage VAR. During the first period I1, the voltage of the first capacitor C1 is 0[V] because the second node G and the fourth node n4 have the same voltage. The voltage of the second capacitor C2 and the voltage of the gate-source voltage Vgs of the driving element DT are equal to a voltage of (VREF-VAR) in the first period I1.

Figure 18A:
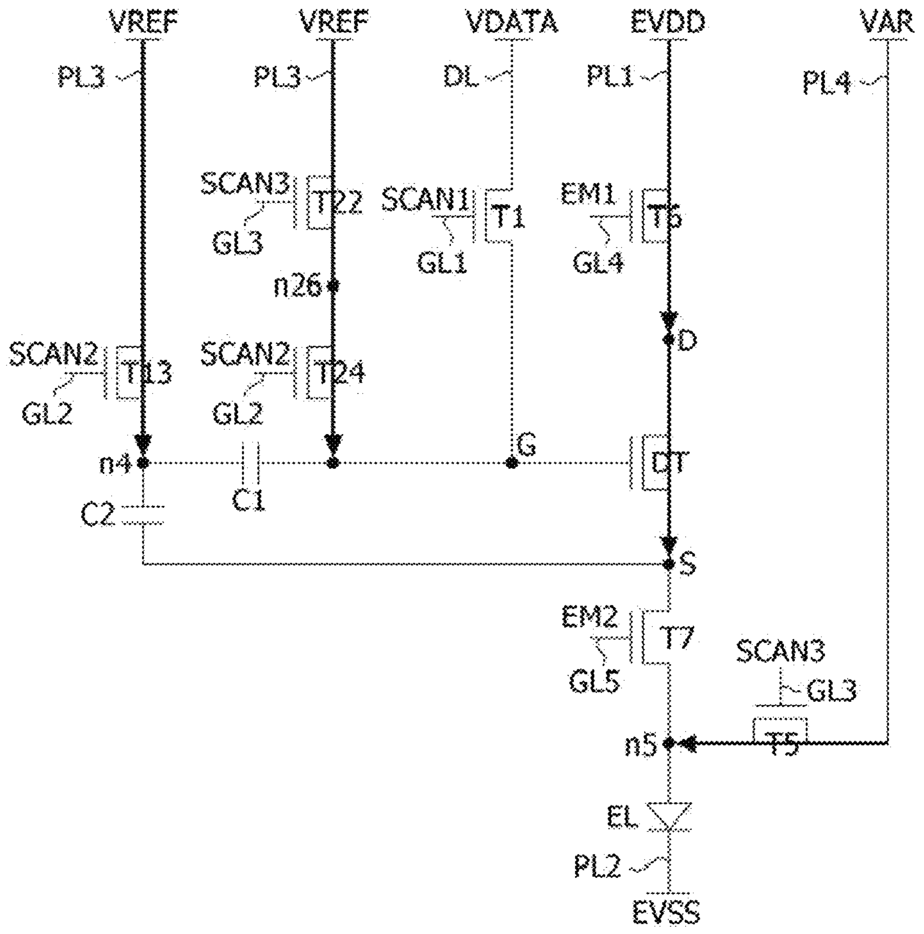

FIG. 18A is a circuit diagram illustrating a current flowing to the pixel circuit shown in FIG. 15 during the second period I2.

Figure 18B:
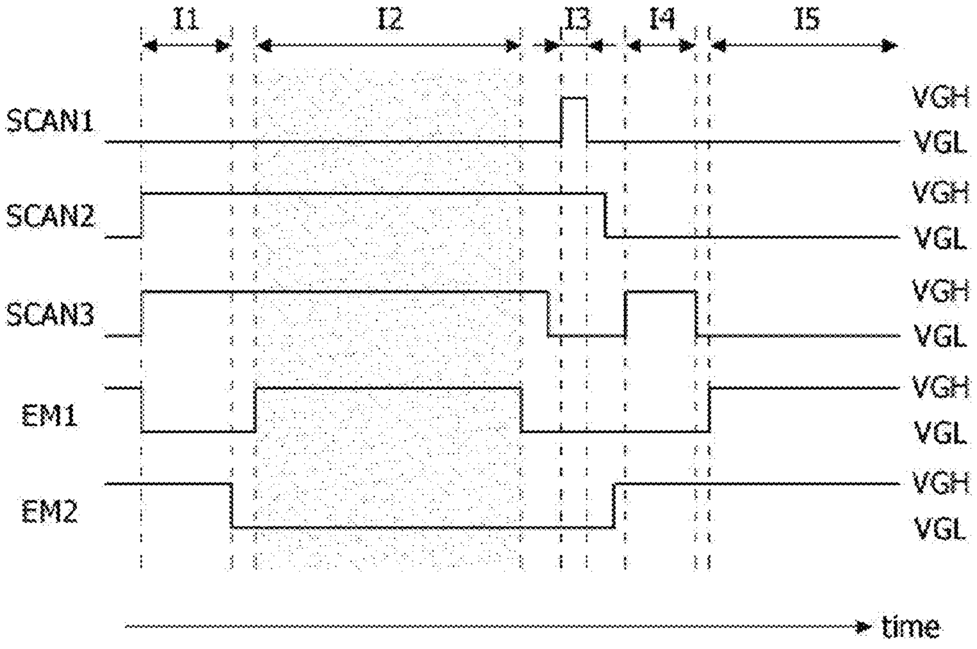

Referring to FIGS. 18A and 18B, during the second period I2, the threshold voltage Vth of the driving element DT is sensed and stored in the second capacitor C2. During the second period I2, the voltage of the second gate signal SCAN2, the third gate signal SCAN3, and the fourth gate signal EM1 is the gate-on voltage VGH. During the second period I2, the voltage of the first gate signal SCAN1 and the fifth gate signal EM2 is the gate-off voltage VGL. During the second period I2, the second, third, fourth, fifth, and sixth switch elements T22, T13, T24, T5, and T6 are turned on, and the driving element DT is turned on. During the second period I2, the first and seventh switch elements T1 and T7 are turned off. During the second period I2, the driving element DT is turned off when the voltage of the second capacitor C2 reaches the threshold voltage Vth of the driving element DT.

At the end of the second period I2, the voltage of the second node G and the fourth node n4 is the reference voltage VREF, and the voltage of the third node S is a voltage of VREF-Vth. Here, a voltage of 'Vth' is the threshold voltage of the driving element DT. During the second period I2, the voltage of the first capacitor C1 is 0 [V]. At the end of the second period I2, the voltage of the second capacitor C2 and the gate-source voltage Vgs of the driving element DT are the threshold voltage Vth of the driving element DT. At the end of the second period I2, the voltage of the fifth node n5 is the anode reset voltage VAR, and therefore the light-emitting element EL does not emit light during the second period I2.

Figure 19A:
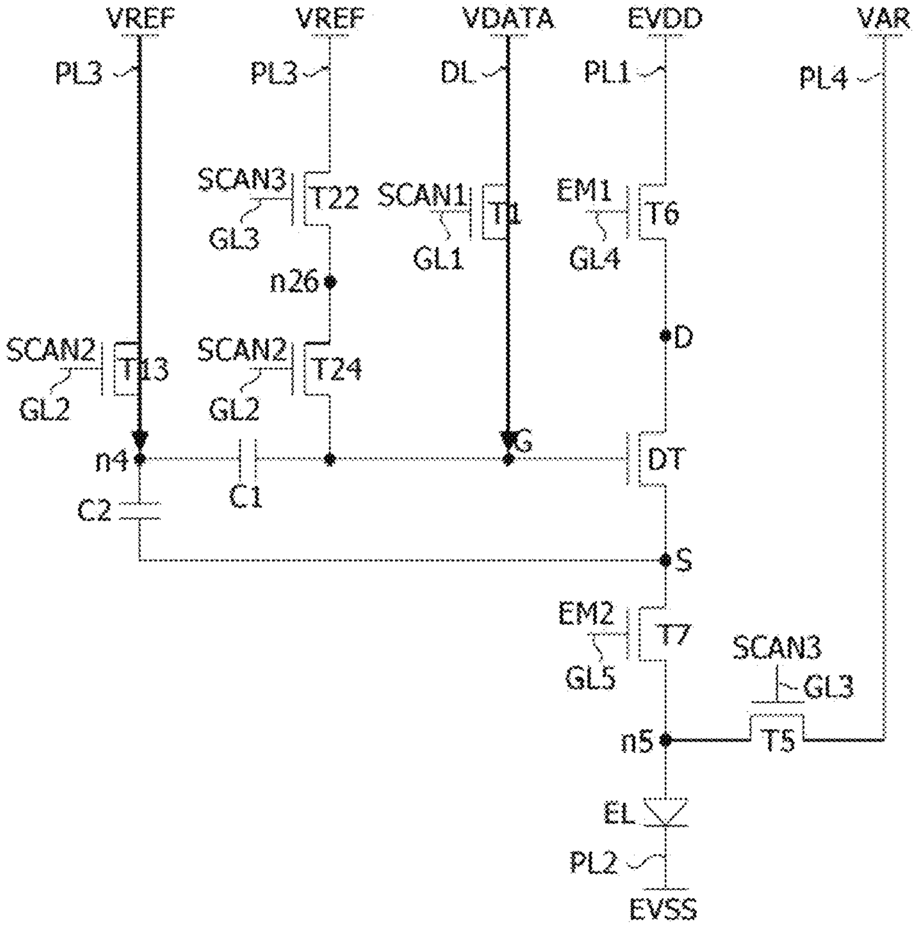

FIG. 19A is a circuit diagram illustrating a current flowing to the pixel circuit shown in FIG. 15 during a third period I3.

Figure 19B:
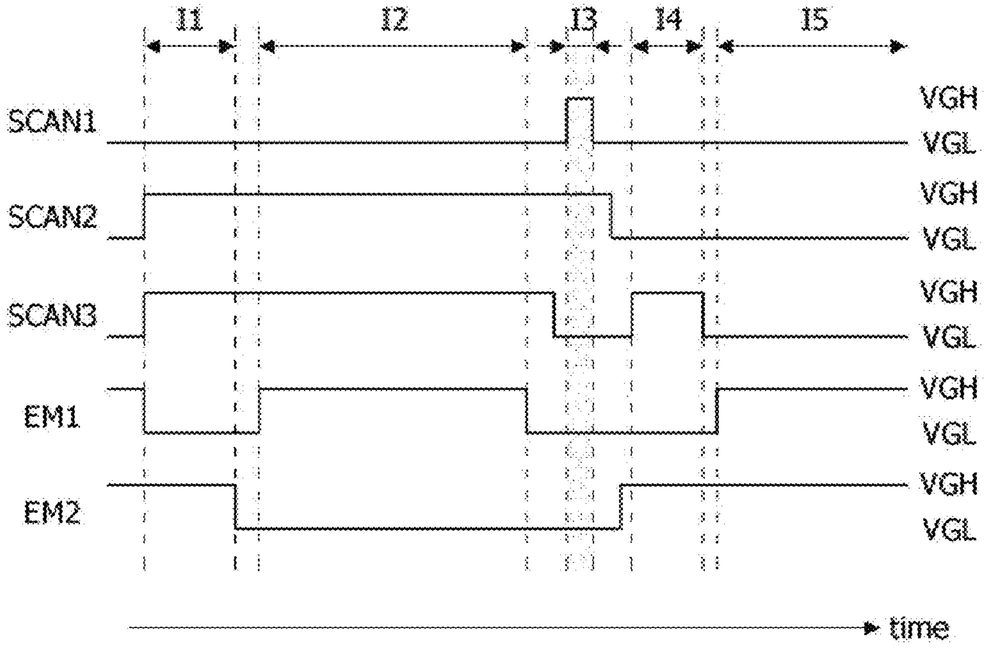

Referring to FIGS. 19A and 19B, during the third period I3, the data voltage VDATA of pixel data is stored in the first capacitor C1. During the third period I3, the voltage of the first gate signal SCAN1 and the second gate signal SCAN2 is the gate-on voltage VGH. During the third period I3, the voltage of the third gate signal SCAN3, the fourth gate signal EM1, and the fifth gate signal EM2 is the gate-off voltage VGL. During the third period I3, the first, third, and fourth switch elements T1, T13, and T24 are turned on, and the second, fifth, sixth, and seventh switch elements T22, T5, T6, and T7 are turned off. During the third period I3, the data voltage VDATA is applied to the second node G through the first switch element T1, and the reference voltage VREF is applied to the fourth node n4 through the third switch element T3. In the third period I3, although fourth switch element T24 is turned on, no reference voltage VREF is applied to the second node G because the second switch element T22 is in the off-state.

At the end of the third period I3, the voltage of the second node G is the data voltage VDATA, and the voltage of the first capacitor C1 is a voltage of VDATA−VREF. At the end of the third period I3, the voltage of the third node S is a voltage of VREF-Vth and the voltage of the second capacitor C2 is the threshold voltage Vth of the driving element DT. At the end of the third period I3, the gate-source voltage Vgs of the driving element DT is a voltage of VDATA−VREF+Vth.

Figure 20A:
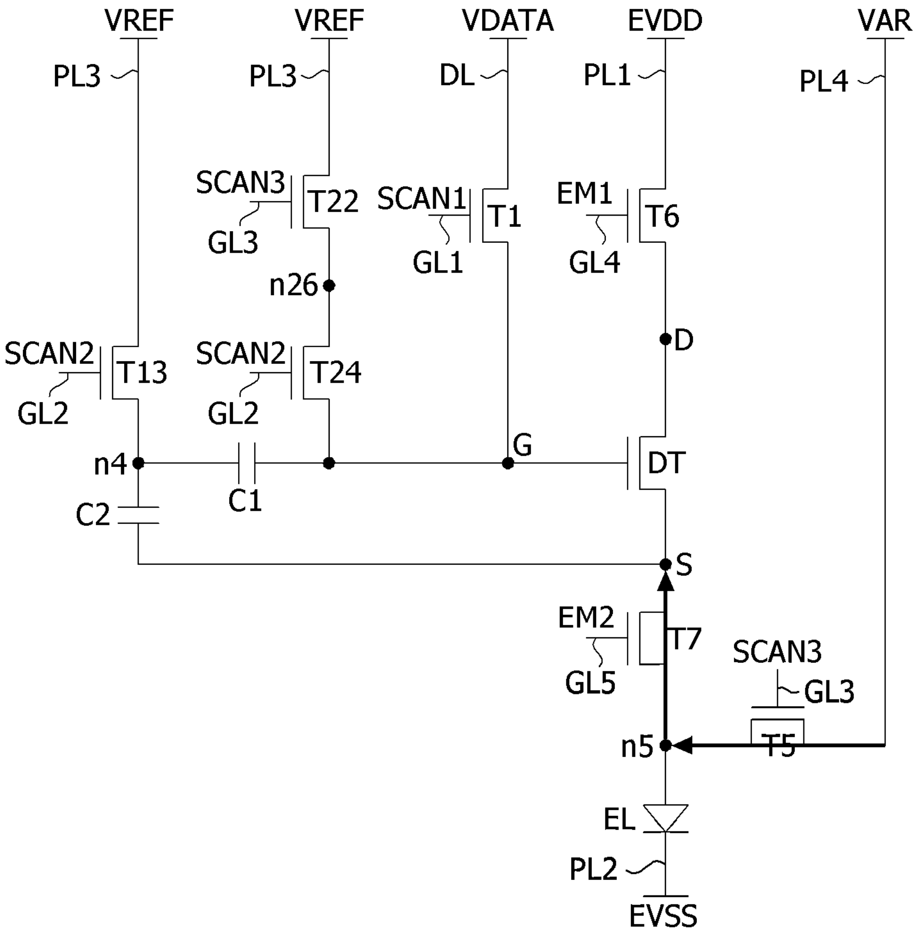

FIG. 20A is a circuit diagram illustrating a current flowing to the pixel circuit shown in FIG. 15 during the fourth period I4.

Figure 20B:
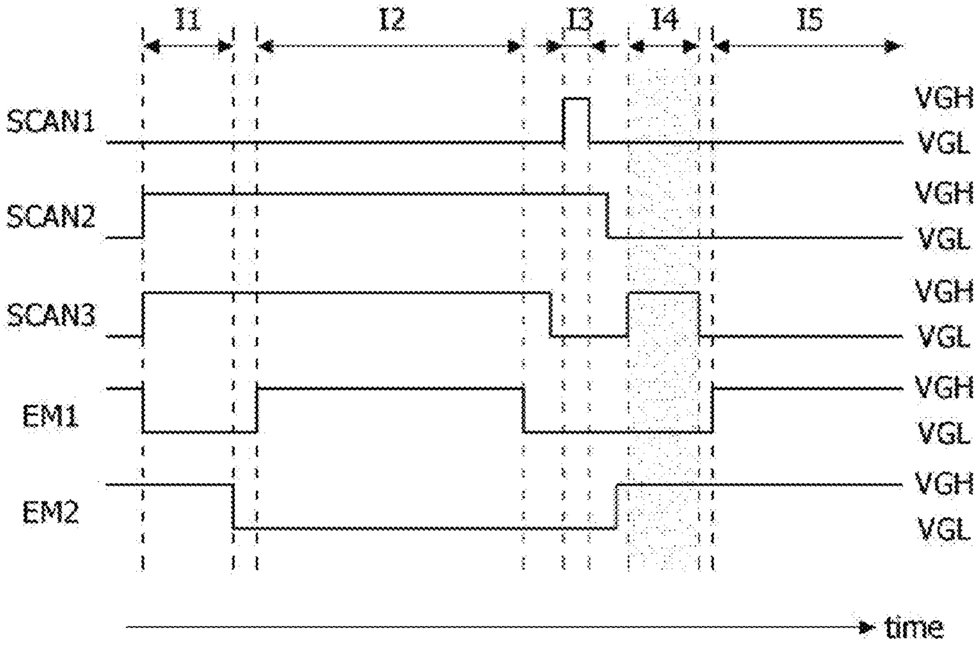

Referring to FIGS. 20A and 20B, in the fourth period I4, an anode voltage of the light-emitting element EL can be reset to the anode reset voltage VAR. During the fourth period I4, the voltage of the third gate signal SCAN3 and the fifth gate signal EM2 is the gate-on voltage VGH. During the fourth period I4, the voltage of the first gate signal SCAN1, the second gate signal SCAN2, and the fourth gate signal EM1 is the gate-off voltage VGL. Therefore, during the fourth period I4, the second, fifth, and seventh switch elements T22, T5, and T7 are turned on, and the first, third, fourth, and sixth switch elements T1, T13, T24, and T6 are turned off. During the fourth period I4, although second switch element T22 is turned on, no reference voltage VREF is applied to the second node G because the second switch element T24 is in the off-state.

At the end of the fourth period I4, the voltage of the third node S and the fifth node n5 is the anode reset voltage VAR. The anode reset voltage VAR applied to the third node S through capacitor coupling is transferred to the second node G, and therefore the voltage of the second node G at the end of the fourth period I4 is a voltage of (VDATA−VREF+Vth)+VAR. At the end of the fourth period I4, the voltage of the first capacitor C1 is a voltage of VDATA−VREF and the voltage of the second capacitor C2 is the threshold voltage Vth of the driving element DT. At the end of the fourth period I4, the gate-source voltage Vgs of the driving element DT is a voltage of VDATA−VREF+Vth.

Figure 21A:
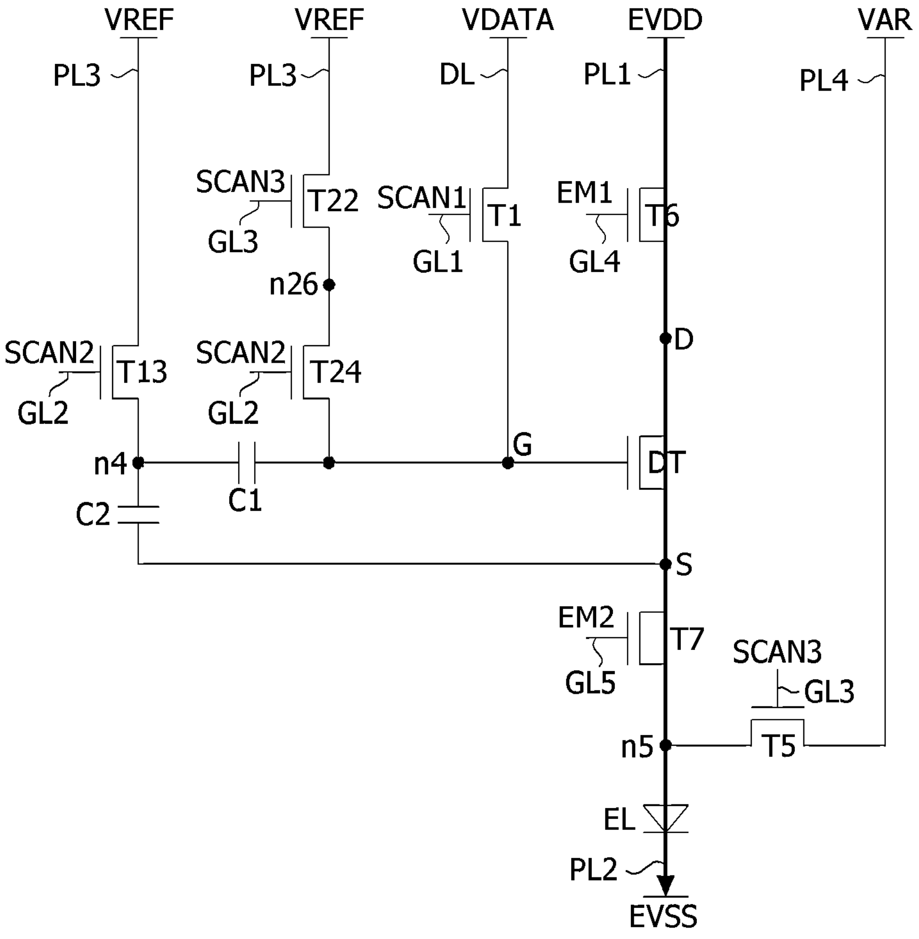

FIG. 21A is a circuit diagram illustrating a current flowing to the pixel circuit shown in FIG. 15 during the fifth period I5.

Figure 21B:
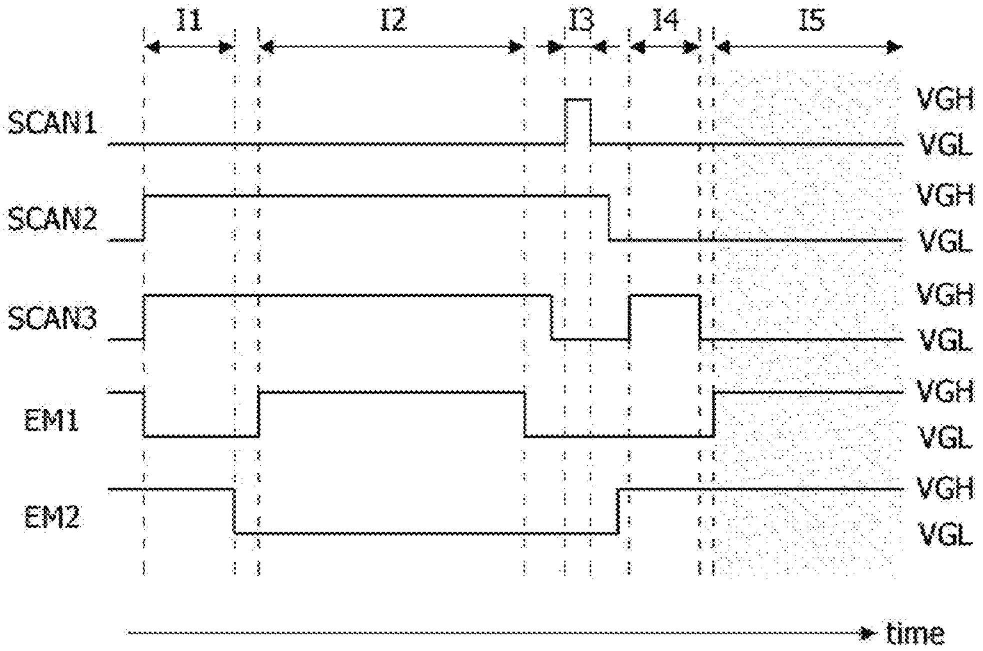

Referring to FIGS. 21A and 21B, during the fifth period I5, the driving element DT generates a current according to the gate-source voltage Vgs to drive the light-emitting element EL. The light-emitting element EL can be emitted at a luminance corresponding to a grayscale value of the pixel data by the current flowing through the driving element DT.

During the fifth period I5, the voltage of the fourth and fifth gate signals EM1 and EM2 is the gate-on voltage VGH, and the voltage of the first, second, and third gate signals SCAN1, SCAN2, and SCAN3 is the gate-off voltage VGL. During the fifth period I5, the sixth and seventh switch elements T6 and T7 are turned on, while the first to fifth switch elements T1, T22, T13, and T24 to T5 are turned off. During the fifth period I5, the voltage of the second node G is a voltage equal to VDATA−VREF+Vth+Voled, and the voltage of the third node S is a voltage equal to Voled. Therefore, during the fifth period I5, the gate-source voltage Vgs of the driving element DT is a voltage of VDATA−VREF+Vth. During the fifth period I5, the voltage of the first capacitor C1 is VDATA−VREF, and the voltage of the second capacitor C2 is the threshold voltage Vth of the driving element DT.

Figure 22:
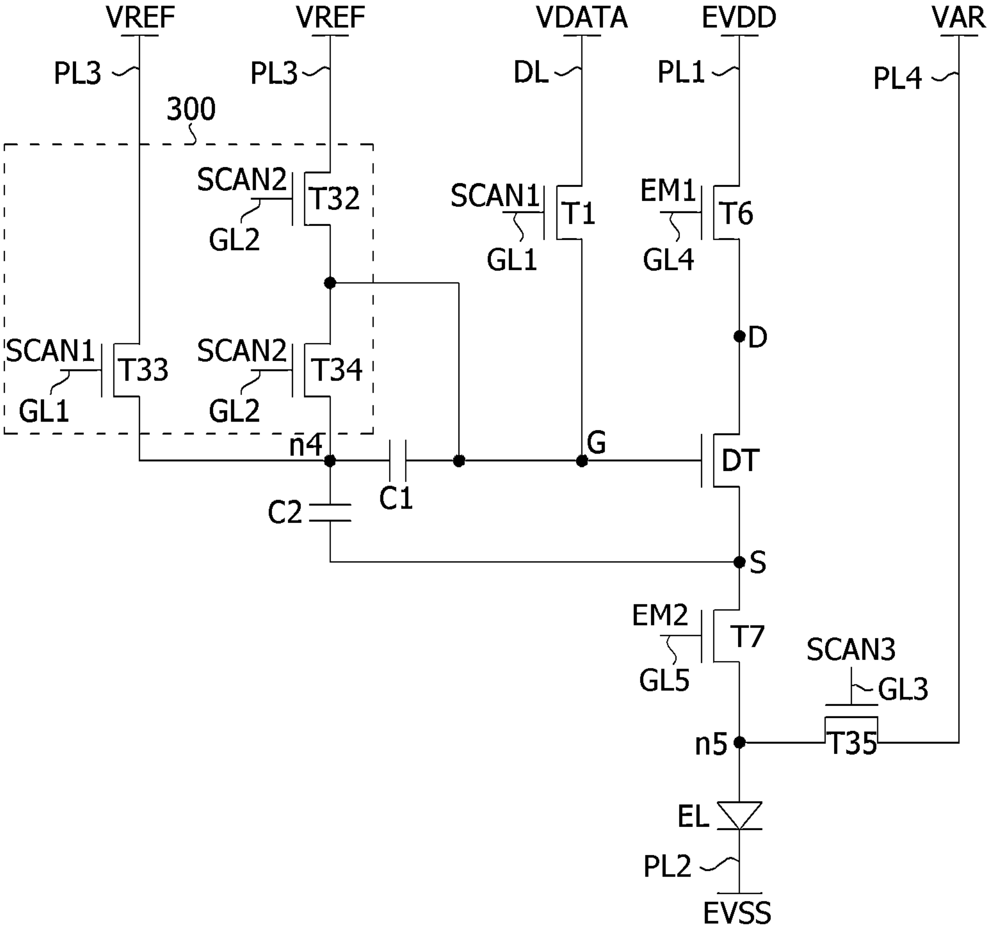
FIG. 22 is a circuit diagram illustrating a pixel circuit according to a fourth embodiment of the present disclosure.
Figure 23:
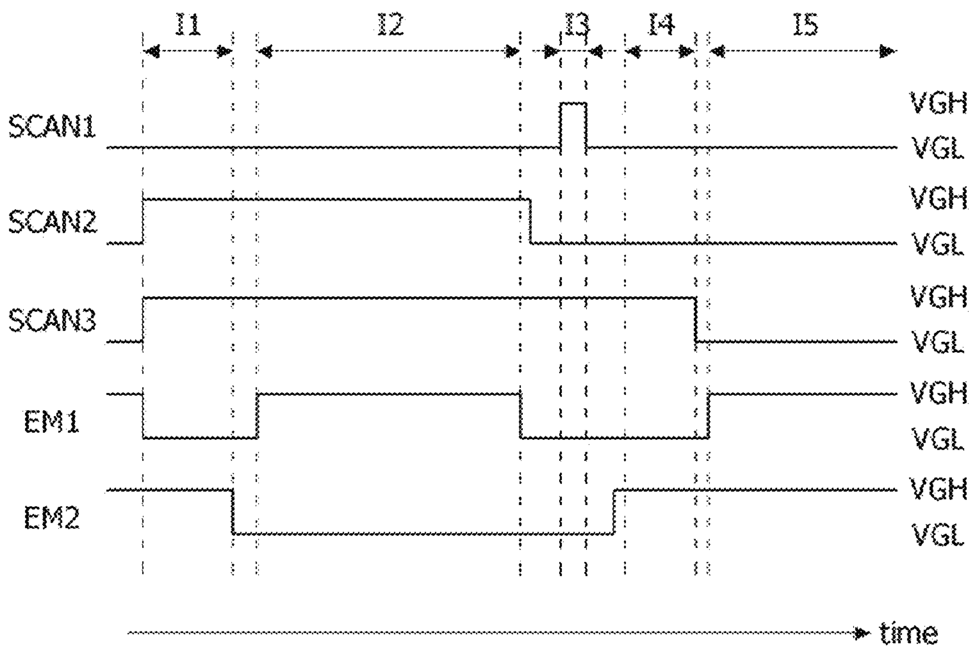
FIG. 23 is a waveform diagram illustrating waveforms of gate signals applied to the pixel circuit shown in FIG. 22.

FIG. 22 is a circuit diagram illustrating a pixel circuit according to a fourth embodiment of the present disclosure. FIG. 23 is a waveform diagram illustrating waveforms of gate signals applied to the pixel circuit shown in FIG. 22. In the four embodiment, the components that are substantially the same as those of the embodiments described above are designated by the same reference numerals, and a detailed description thereof is omitted or may be briefly provided.

Referring to FIGS. 22 and 23, a pixel circuit includes an emitting element EL, a driving element DT driving the emitting element EL, a plurality of switch elements T1, T32, T33, T34, T35, T6, and T7, a first capacitor C1, and a second capacitor C2. The driving element DT and the switch elements T1, T32, T33, T34, T35, T6, and T7 can be implemented as n-channel oxide TFTs.

A voltage of the first gate signal SCAN1 is generated as a pulse of the gate-on voltage VGH during the third periods I3 and is the gate-off voltage VGL during the first period I1, the second period I2, the fourth period I4, and the fifth periods I5. A voltage of the second gate signal SCAN2 is generated as a pulse of the gate-on voltage VGH during the first and second periods I1 and I2 and is the gate-off voltage VGL during the third to fifth periods I3, I4 to I5.

A voltage of the third gate signal SCAN3 is generated as a pulse of the gate-on voltage VGH during the first to fourth periods I1, I2, I3, and I4 and is the gate-off voltage VGL during the fifth periods I5. A voltage of the fourth gate signal EM1 is generated as a pulse of the gate-off voltage VGL during the first period I1, is generated as a pulse of the gate-on voltage VGH during the second period I2, and then is the gate-off voltage VGL during the third to the fifth periods I3 and I4. A voltage of the fourth gate signal EM1 is the gate-on voltage VGH during the fifth period I5. A voltage of the fifth gate signal EM2 is the gate-on voltage VGH during the first, fourth and fifth periods I1, I4, and I5 and is generated as a pulse of the gate-off voltage VGL during the second and third periods I2 and I3.

Between the second period I2 and the third period I3, after the voltage of the fourth gate signal EM1 is inverted to the gate-off voltage VGL, the voltage of the second gate signal SCAN2 can be inverted to the gate-off voltage VGL, and then the first scan signal SCAN1 can be inverted to the gate-on voltage VGH. Between the third period I3 and the fourth period I4, after the voltage of the first gate signal SCAN1 is inverted to the gate-off voltage VGL, the voltage of the fifth gate signal SCAN5 can be inverted to the gate-on voltage VGH.

The driving element DT includes a first electrode connected to a first node D, a gate electrode connected to a second node G, and a second electrode connected to a third node S.

The light-emitting element EL can be implemented as an OLED. The light-emitting element EL includes an anode electrode, a cathode electrode, and an organic compound layer formed between the electrodes. The anode electrode of the light-emitting element EL is connected to a fifth node n5, and the cathode electrode thereof is connected to the second constant voltage node PL2 to which the cathode voltage EVSS is applied.

The first capacitor C1 is connected between the second node G and a fourth node n4. The second capacitor C2 is connected between the third node S and the fourth node n4.

The switch elements T1, T32, T33, T34, T35, T6, and T7 of the pixel circuit include a first switch element T1 that supplies the data voltage VDATA of pixel data to the second node G in response to the first gate signal SCAN1, a second switch element T32 that supplies the reference voltage VREF to the second node G in response to the second gate signal SCAN2, a third switch element T33 that applies the reference voltage VREF to the fourth node n4 in response to the first gate signal SCAN1, a fourth switch element T34 that electrically connects the second node G to the fourth node n4 in response to the second gate signal SCAN2, a fifth switch element T35 that supplies the anode reset voltage VAR to the fifth node n5 in response to the third gate signal SCAN3, a sixth switch element T6 that supplies the pixel driving voltage EVDD to the first node D in response to the fourth gate signal EM1, and a seventh switch element T7 that electrically connects the third node S to the fifth node n5 in response to the fifth gate signal EM2.

The first switch element T1 includes a first electrode connected to the data line DL to which the data voltage VDATA is applied, a gate electrode connected to the first gate line GL1 to which the first gate signal SCAN1 is applied, and a second electrode connected to the second node G.

The second to fourth switch elements T32, T33, and T34 are a reference voltage switch circuit 300 that selectively applies the reference voltage VREF to the second node G and the fourth node n4.

The second switch element T32 is turned on in response to the gate-on voltage VGH of the second gate signal SCAN2 during the first and second periods I1 and I2. When the second switch element T32 is turned on, the reference voltage VREF is applied to the second node G. The second switch element T32 is turned off during the third to fifth periods I3, I4, and I5. The second switch element T32 includes a first electrode connected to the third constant voltage node PL3 to which the reference voltage VREF is applied, a gate electrode connected to the second gate line GL2 to which the second gate signal SCAN2 is applied, and a second electrode connected to the second node G.

The third switch element T33 is turned on in response to the gate-on voltage VGH of the first gate signal SCAN1 during the third periods I3. When the third switch element T33 is turned on, the reference voltage VREF is applied to the fourth node n4. The third switch element T33 is turned off during the first, second, fourth and fifth periods I1, I2, I4 and I5. The third switch element T33 includes a first electrode connected to the third constant voltage node PL3 to which the reference voltage VREF is applied, a gate electrode connected to the first gate line GL1 to which the first gate signal SCAN1 is applied, and a second electrode connected to the fourth node n4.

The fourth switch element T34 is turned on in response to the gate-on voltage VGH of the second gate signal SCAN2 during the first and second periods I1 and I2. When the fourth switch element T34 is turned on, the second node G is electrically connected to the fourth node n4. The fourth switch element T34 is turned off during the third to fifth periods I3, I4, and I5. The fourth switch element T34 includes a first electrode connected to the second node G, a gate electrode connected to the second gate line GL2 to which the second gate signal SCAN2 is applied, and a second electrode connected to the fourth node n4.

The fifth switch element T35 is turned on in response to the gate-on voltage VGH of the third gate signal SCAN3 during the first to fourth periods I1, I2, I3, and I4. When the fifth switch element T35 is turned on, the anode reset voltage VAR is applied to the fifth node n5. The fifth switch element T35 is turned off during the fifth period I5. The fifth switch element T35 includes a first electrode connected to the fifth node n5, a gate electrode connected to the third gate line GL3 to which the third gate signal SCAN3 is applied, and a second electrode connected to the fourth constant voltage node PL4 to which the anode reset voltage VAR is applied.

The sixth switch element T6 includes a first electrode connected to the first constant voltage node PL1 to which the pixel driving voltage EVDD is applied, a gate electrode connected to the fourth gate line GL4 to which the fourth gate signal EM1 is applied, and a second electrode connected to the first node D. The seventh switch element T7 includes a first electrode connected to the third node S, a gate electrode connected to the fifth gate line GL5 to which the fifth gate signal EM2 is applied, and a second electrode connected to the fifth node n5.

FIGS. 24A to 28B are circuit diagrams illustrating the operation of the pixel circuit shown in FIG. 22 in stages.

Figure 24A:
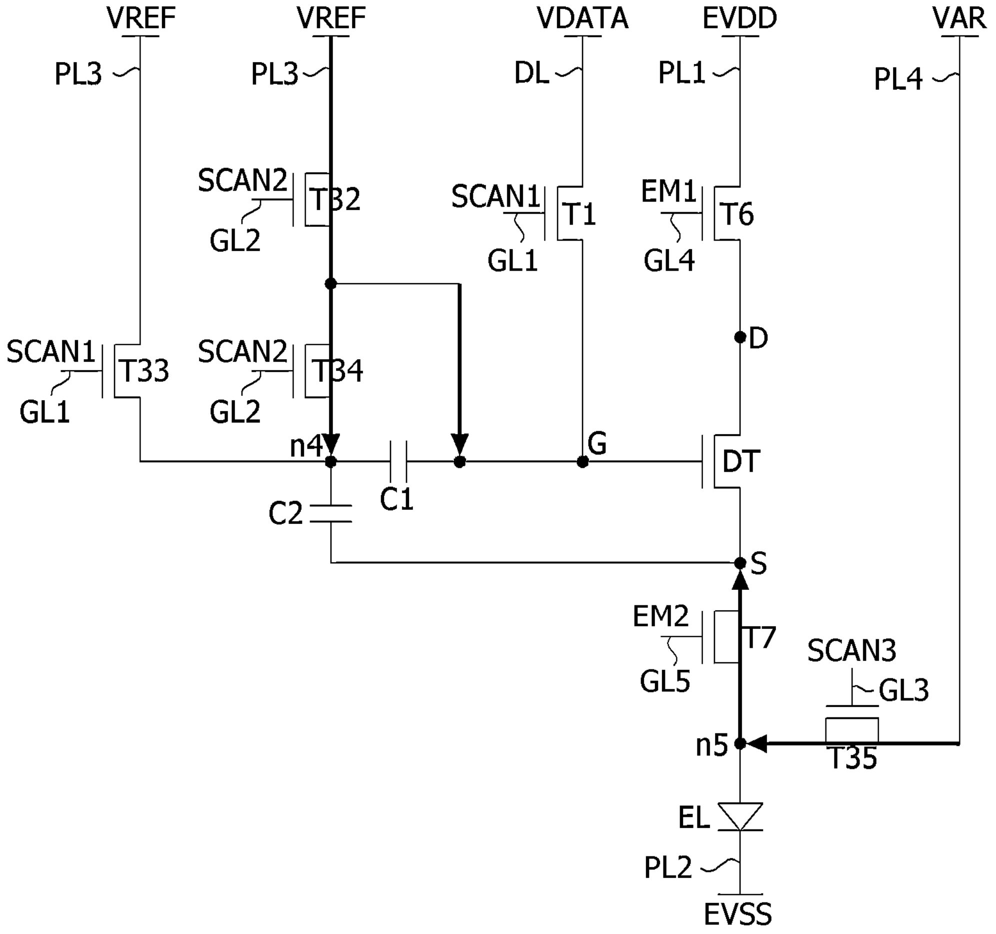
FIGS. 24A to 28B are circuit diagrams illustrating the operation of the pixel circuit shown in FIG. 22 in stages.

Particularly, FIG. 24A is a circuit diagram illustrating a current flowing to the pixel circuit shown in FIG. 22 during the first period I1.

Figure 24B:
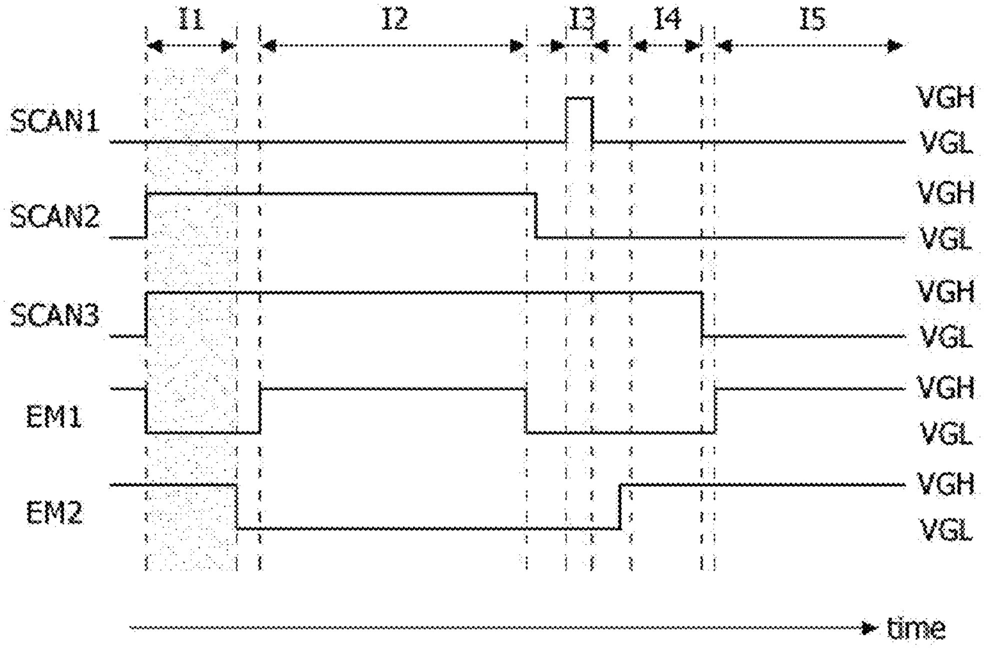

Referring to FIGS. 24A and 24B, during the first period I1, the main nodes of the pixel circuit are initialized. During the first period I1, the voltage of the second gate signal SCAN2, the third gate signal SCAN3, and the fifth gate signal EM2 is the gate-on voltage VGH. During the first period I1, the voltage of the first gate signal SCAN1 and the fourth gate signal EM1 is the gate-off voltage VGL. Therefore, during the first period I1, the second, fourth, fifth, and seventh switch elements T32, T34, T35, and T7 are turned on, and the first, third, and sixth switch elements T1, T33, and T6 are turned off. As a result, during the first period I1, the voltage of the second node G and the fourth node n4 is initialized to the reference voltage VREF and the voltage of the third node S and the fifth node n5 is initialized to the anode reset voltage VAR. During the first period I1, the voltage of the first capacitor C1 is 0[V] because the second node G and the fourth node n4 have the same voltage. The voltage of the second capacitor C2 and the voltage of the gate-source voltage Vgs of the driving element DT are equal to a voltage of (VREF-VAR) in the first period I1.

Figure 25A:
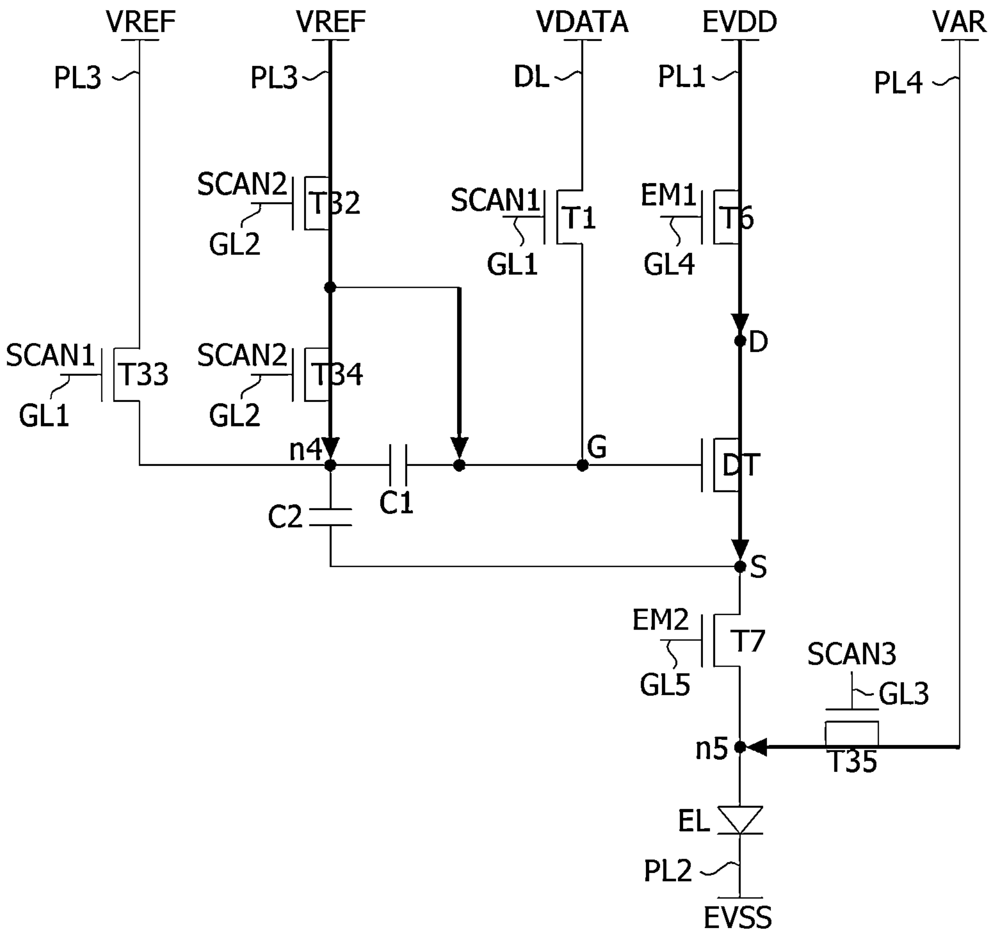

FIG. 25A is a circuit diagram illustrating a current flowing to the pixel circuit shown in FIG. 22 during the second period I2.

Figure 25B:
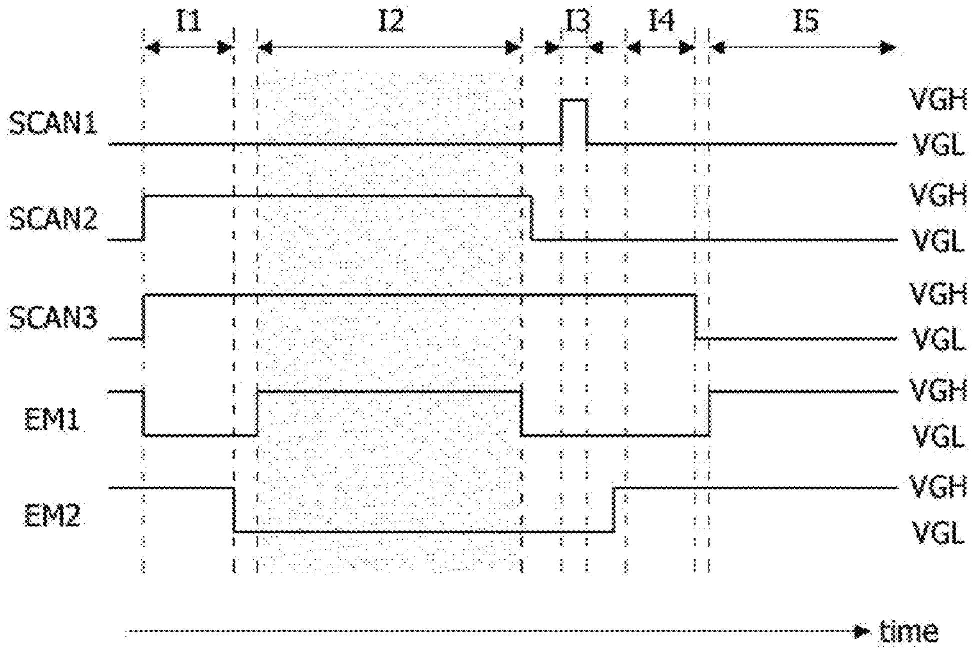

Referring to FIGS. 25A and 25B, during the second period I2, the threshold voltage Vth of the driving element DT is sensed and stored in the second capacitor C2. During the second period I2, the voltage of the second gate signal SCAN2, the third gate signal SCAN3, and the fourth gate signal EM1 is the gate-on voltage VGH. During the second period I2, the voltage of the first gate signal SCAN1 and the fifth gate signal EM2 is the gate-off voltage VGL. During the second period I2, the second, fourth, fifth, and sixth switch elements T32, T34, T35, and T6 are turned on, and the driving element DT is turned on. During the second period I2, the first, third, and seventh switch elements T1, T1 and T7 are turned off. During the second period I2, the driving element DT is turned off when the voltage of the second capacitor C2 reaches the threshold voltage Vth of the driving element DT.

At the end of the second period I2, the voltage of the second node G and the fourth node n4 is the reference voltage VREF, and the voltage of the third node S is a voltage of VREF-Vth. Here, a voltage of 'Vth' is the threshold voltage of the driving element DT. During the second period I2, the voltage of the first capacitor C1 is 0 [V]. At the end of the second period I2, the voltage of the second capacitor C2 and the gate-source voltage Vgs of the driving element DT are the threshold voltage Vth of the driving element DT. At the end of the second period I2, the voltage of the fifth node n5 is the anode reset voltage VAR, and therefore the light-emitting element EL does not emit light during the second period I2.

Figure 26A:
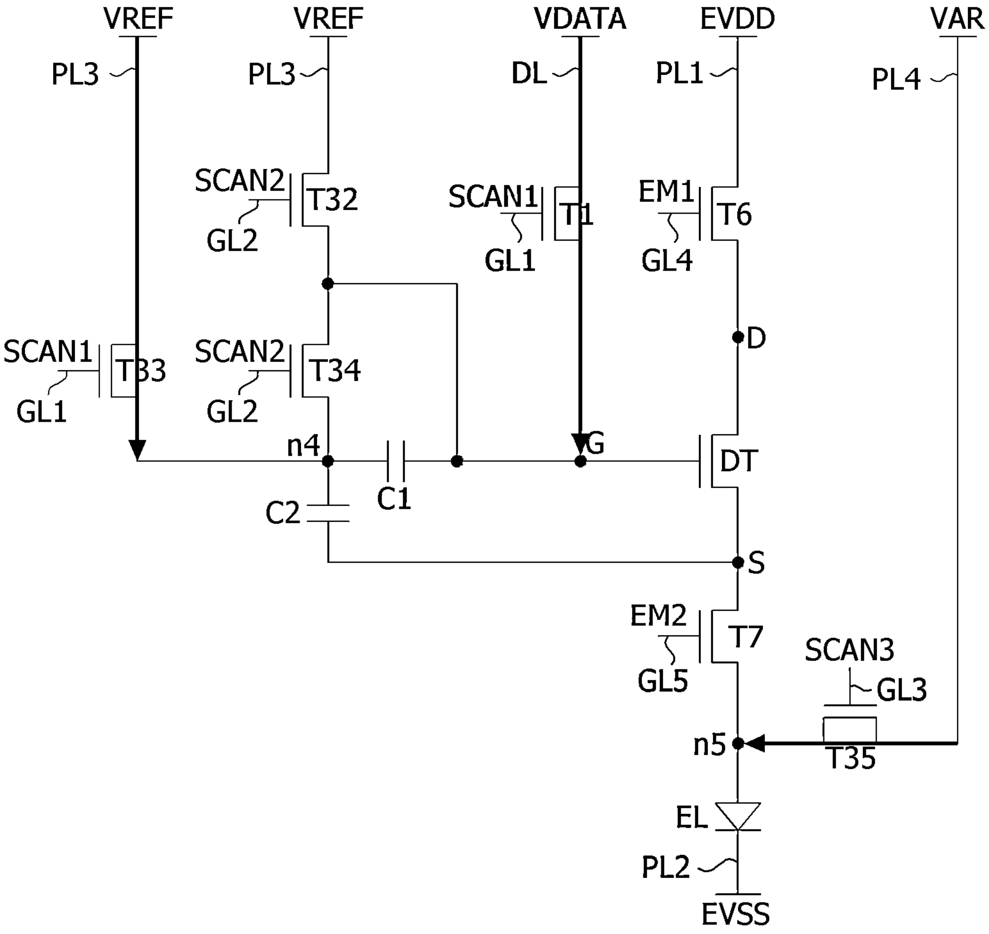

FIG. 26A is a circuit diagram illustrating a current flowing to the pixel circuit shown in FIG. 22 during a third period I3.

Figure 26B:
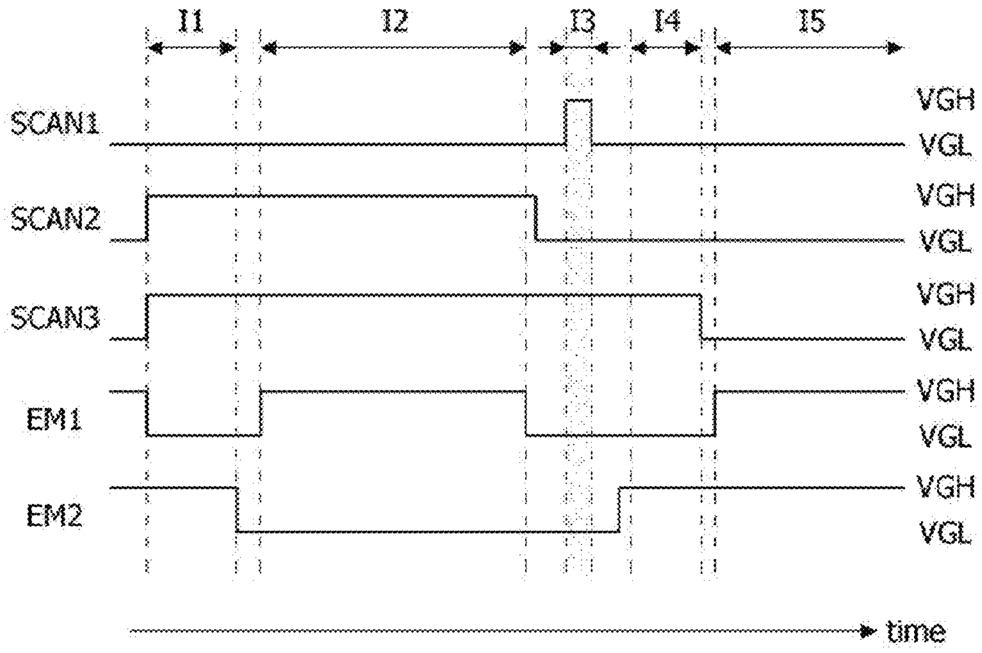

Referring to FIGS. 26A and 26B, during the third period I3, the data voltage VDATA of pixel data is stored in the first capacitor C1. During the third period I3, the voltage of the first gate signal SCAN1 and the third gate signal SCAN3 is the gate-on voltage VGH. During the third period I3, the voltage of the second gate signal SCAN2, the fourth gate signal EM1, and the fifth gate signal EM2 is the gate-off voltage VGL. During the third period I3, the first, third, and fifth switch elements T1, T33, and T35 are turned on, and the second, fourth, sixth, and seventh switch elements T32, T34, T6, and T7 are turned off. During the third period I3, the data voltage VDATA is applied to the second node G through the first switch element T1, and the reference voltage VREF is applied to the fourth node n4 through the third switch element T33. In the third period I3, the reference voltage VREF is not applied to the second node G because the second and fourth switch elements T32 and T34 are in the off-state.

At the end of the third period I3, the voltage of the second node G is the data voltage VDATA, and the voltage of the first capacitor C1 is a voltage of VDATA−VREF. At the end of the third period I3, the voltage of the third node S is a voltage of VREF-Vth and the voltage of the second capacitor C2 is the threshold voltage Vth of the driving element DT. At the end of the third period I3, the gate-source voltage Vgs of the driving element DT is a voltage of VDATA−VREF+Vth.

Figure 27A:
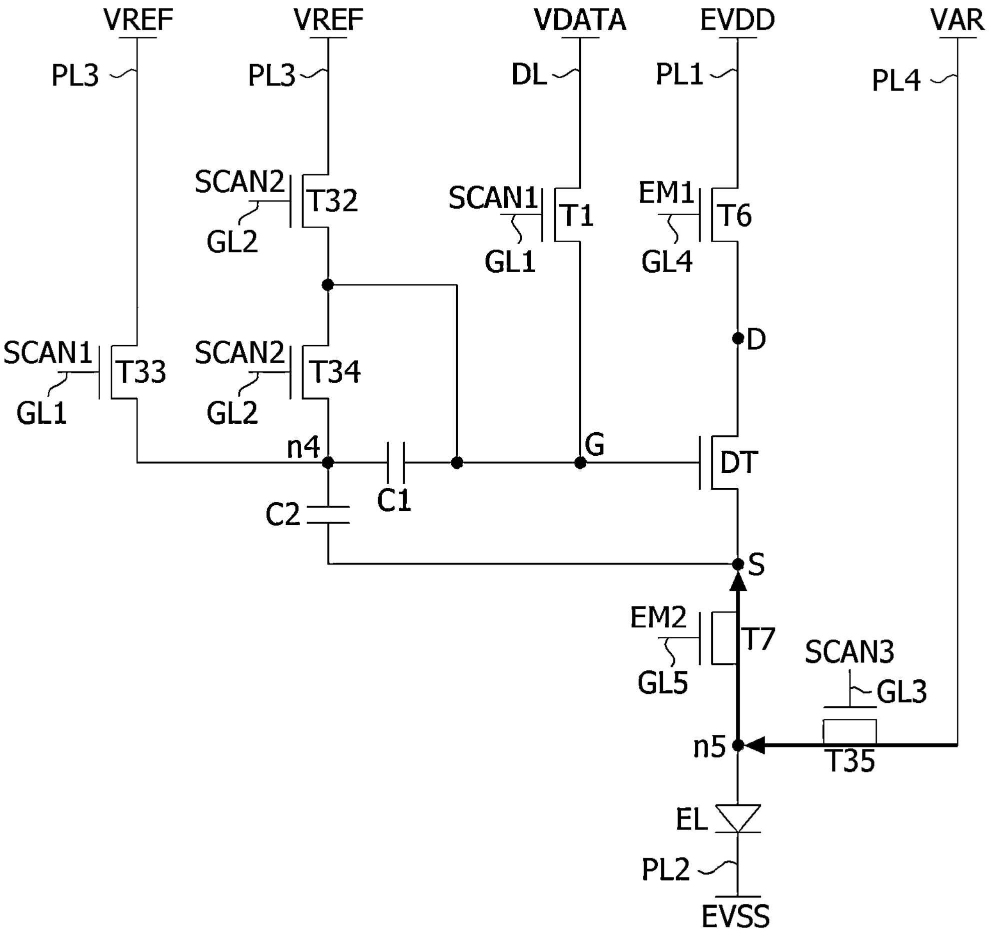

FIG. 27A is a circuit diagram illustrating a current flowing to the pixel circuit shown in FIG. 22 during the fourth period I4.

Figure 27B:
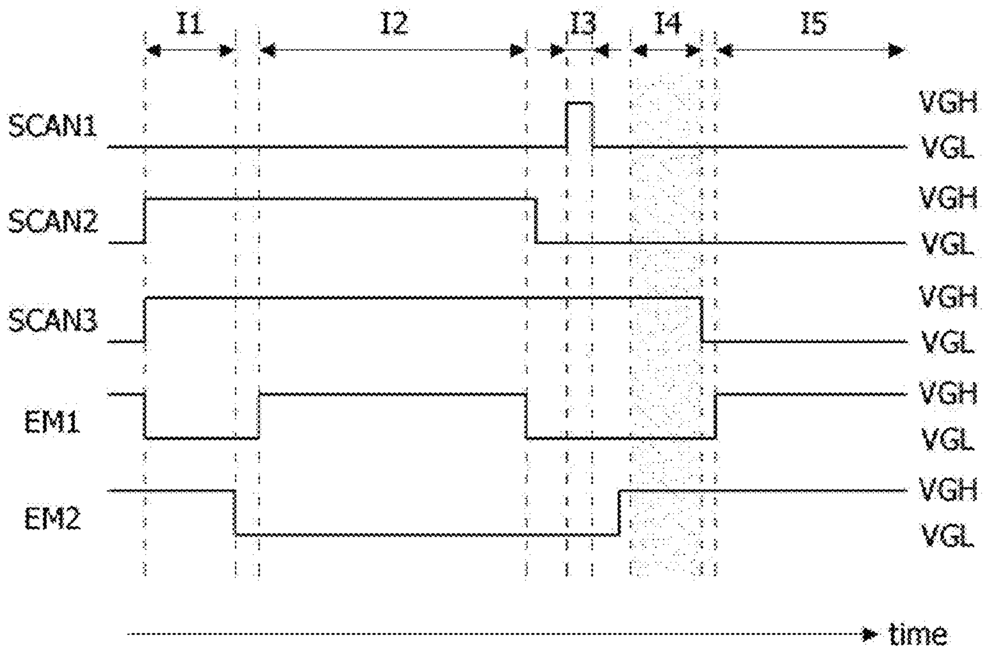

Referring to FIGS. 27A and 27B, in the fourth period I4, an anode voltage of the light-emitting element EL can be reset to the anode reset voltage VAR. During the fourth period I4, the voltage of the third gate signal SCAN3 and the fifth gate signal EM2 is the gate-on voltage VGH. During the fourth period I4, the voltage of the first gate signal SCAN1, the second gate signal SCAN2, and the fourth gate signal EM1 is the gate-off voltage VGL. Therefore, during the fourth period I4, the fifth and seventh switch elements T35 and T7 are turned on, and the first, third, fourth, and sixth switch elements T1, T32, T33, T34, and T6 are turned off. During the fourth period I4, the reference voltage VREF is not applied to the second node G because the second and fourth switch elements T32 and T34 are in the off-state.

At the end of the fourth period I4, the voltage of the third node S and the fifth node n5 is the anode reset voltage VAR. The anode reset voltage VAR applied to the third node S through capacitor coupling is transferred to the second node G, and therefore the voltage of the second node G at the end of the fourth period I4 is a voltage of (VDATA−VREF+Vth)+VAR. At the end of the fourth period I4, the voltage of the first capacitor C1 is a voltage of VDATA−VREF and the voltage of the second capacitor C2 is the threshold voltage Vth of the driving element DT. At the end of the fourth period I4, the gate-source voltage Vgs of the driving element DT is a voltage of VDATA−VREF+Vth.

Figure 28A:
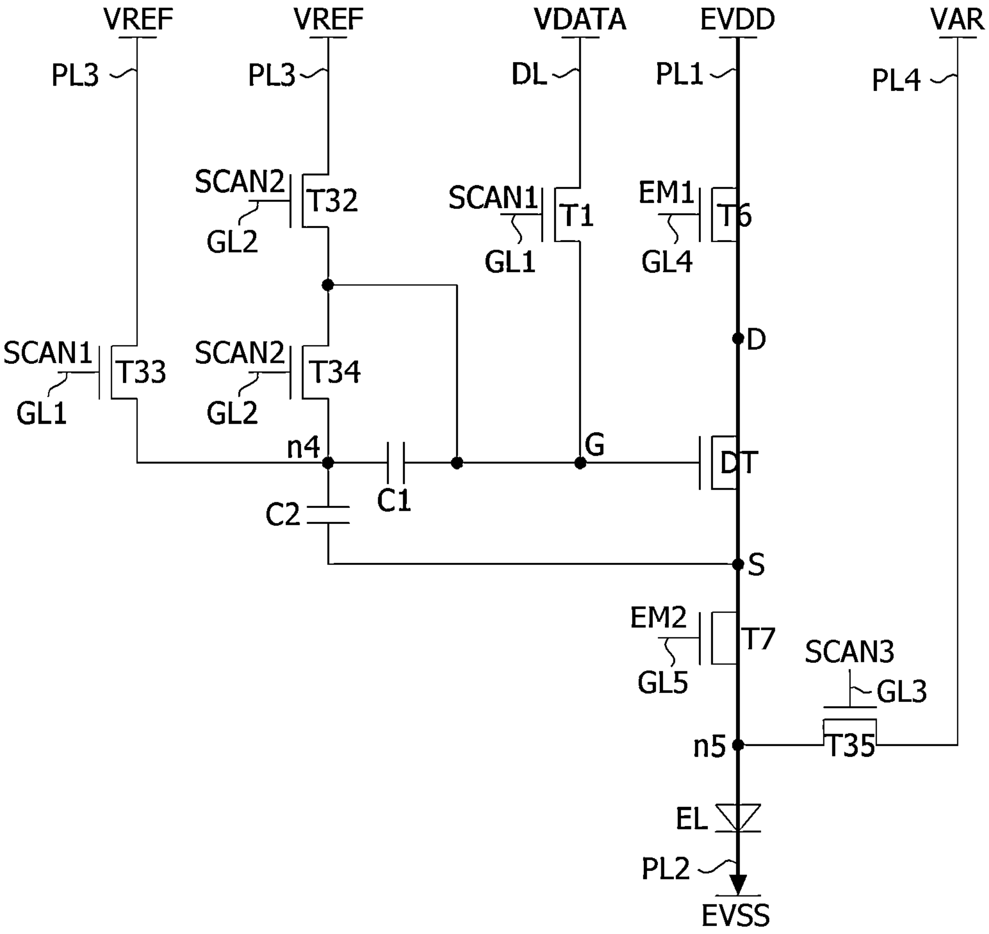

FIG. 28A is a circuit diagram illustrating a current flowing to the pixel circuit shown in FIG. 22 during the fifth period I5.

Figure 28B:
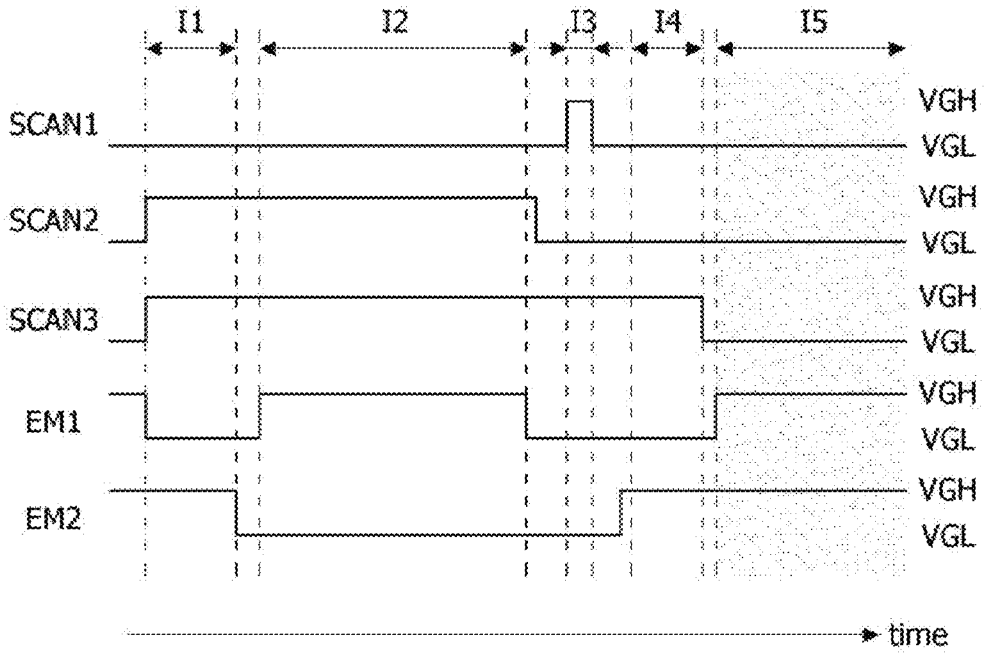

Referring to FIGS. 28A and 28B, during the fifth period I5, the driving element DT generates a current according to the gate-source voltage Vgs to drive the light-emitting element EL. The light-emitting element EL can be emitted at a luminance corresponding to a grayscale value of the pixel data by the current flowing through the driving element DT.

During the fifth period I5, the voltage of the fourth and fifth gate signals EM1 and EM2 is the gate-on voltage VGH, and the voltage of the first, second, and third gate signals SCAN1, SCAN2, and SCAN3 is the gate-off voltage VGL. During the fifth period I5, the sixth and seventh switch elements T6 and T7 are turned on, while the first to fifth switch elements T1, T32, T33, and T34 to T35 are turned off. During the fifth period I5, the voltage of the second node G is a voltage equal to VDATA−VREF+Vth+Voled, and the voltage of the third node S is a voltage equal to Voled. Therefore, during the fifth period I5, the gate-source voltage Vgs of the driving element DT is a voltage of VDATA−VREF+Vth. During the fifth period I5, the voltage of the first capacitor C1 is VDATA−VREF, and the voltage of the second capacitor C2 is the threshold voltage Vth of the driving element DT.

The gate signals of the pixel circuit according to the embodiments of the present disclosure can be output from the gate driver that drives the gate lines of the display panel. The gate driver can output the gate signals that are applied to the pixel circuit according to the aforementioned embodiments as well as other pixel circuits, for example, the pixel circuit shown in FIG. 29. In this case, the gate drivers and the level shifters can be shared because the gate drivers of the same structure can output the gate signals necessary for driving the pixel circuits of different structures.

Figure 29:
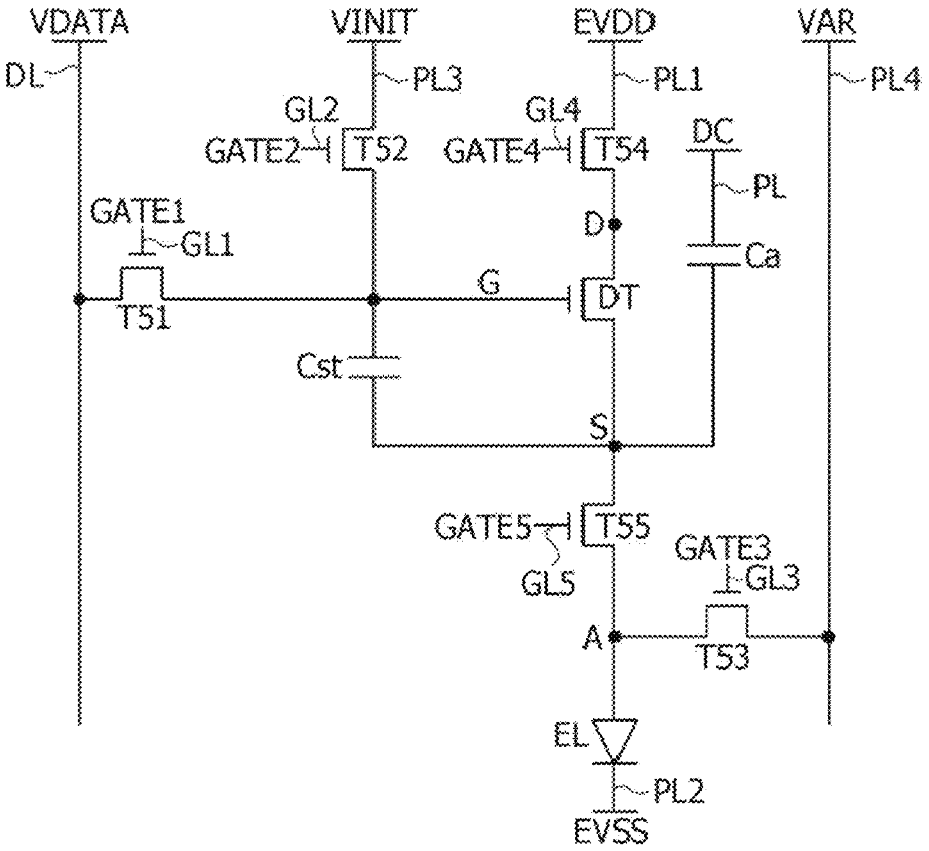
FIG. 29 is a circuit diagram illustrating another pixel circuit to which first to fifth gate signals are applied.

FIG. 29 is a circuit diagram illustrating another pixel circuit to which the first to the fifth gate signals are applied.

Referring to FIG. 29, the pixel circuit includes a light-emitting element EL, a driving element DT for driving the light-emitting element EL, first to fifth switch elements T51 to T55, a first capacitor Cst, and a second capacitor Ca.

The driving element DT includes a first electrode connected to a first node D, a gate electrode connected to a second node G, and a second electrode connected to a third node S. The light-emitting element EL includes an anode electrode connected to a fourth node A and a cathode electrode connected to a second constant voltage node PL2 to which the cathode voltage EVSS is applied. The first capacitor Cst is connected between the second node G and the third node S. The second capacitor Ca is connected between a constant voltage node PL to which a constant voltage DC is applied and the third node S.

A first switch element T51 includes a first electrode connected to the data line DL to which the data voltage VDATA is applied, a gate electrode connected to the first gate line GL1 to which the first gate signal GATE1 is applied, and a second electrode connected to the second node G. A second switch element T52 includes a first electrode connected to the third constant voltage node PL3 to which an initialization voltage VINIT is applied, a gate electrode connected to the second gate line GL2 to which the second gate signal GATE2 is applied, and a second electrode connected to the second node G. A third switch element T53 includes a first electrode connected to the fourth constant voltage node PL4 to which the anode reset voltage VAR is applied, a gate electrode connected to the third gate line GL3 to which the third gate signal GATE3 is applied, and a second electrode connected to the fourth node A. A fourth switch element T54 includes a first electrode connected to the first constant voltage node PL1 to which the pixel driving voltage EVDD is applied, a gate electrode connected to the fourth gate line GL4 to which the fourth gate signal GATE4 is applied, and a second electrode connected to the first node D. A fifth switch element T55 includes a first electrode connected to the third node S, a gate electrode connected to the fifth gate line GL5 to which the fifth gate signal GATE5 is applied, and a second electrode connected to the fourth A.

Figure 30:
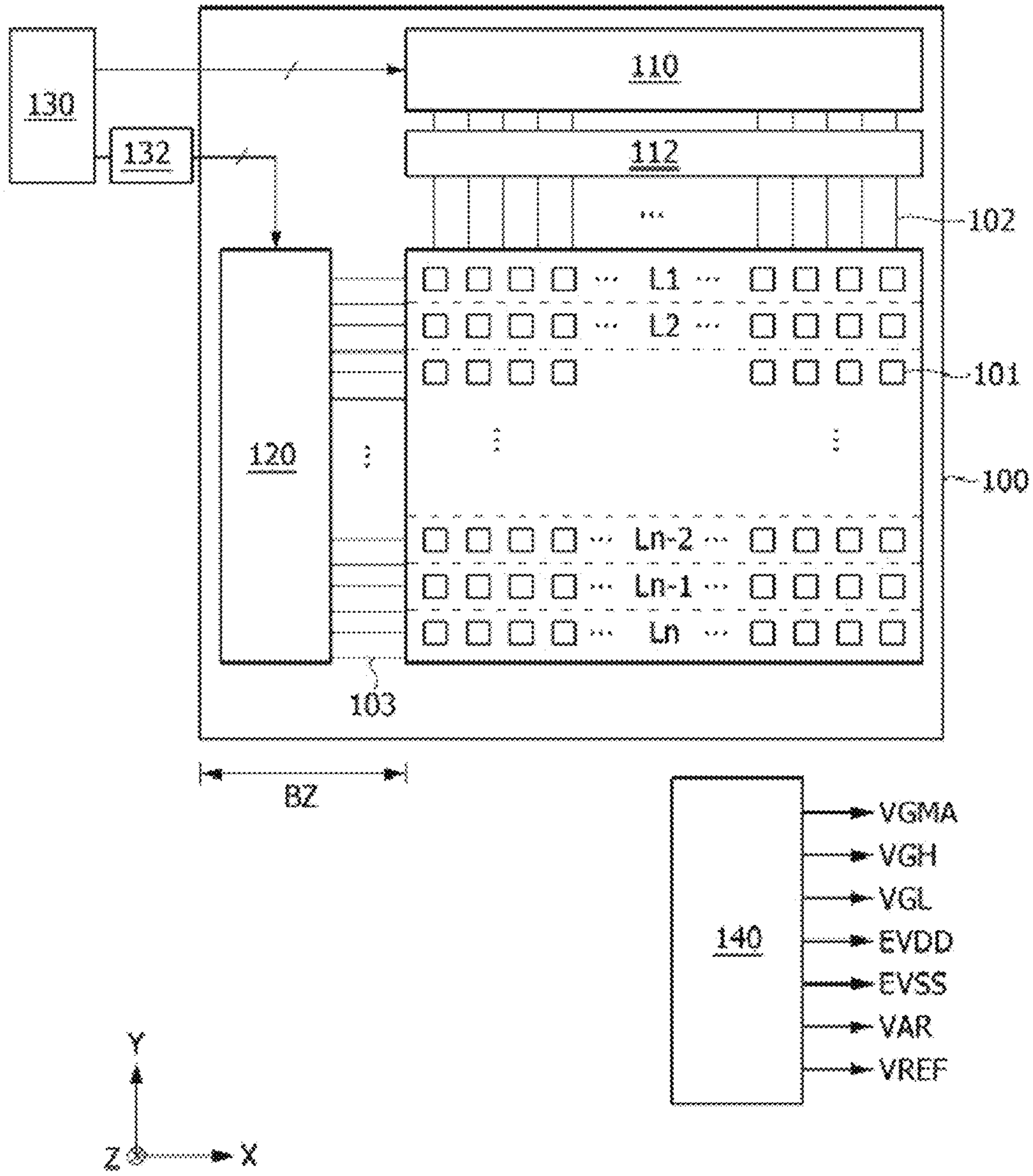
FIG. 30 is a block diagram illustrating a display device according to one embodiment of the present disclosure.
Figure 31:
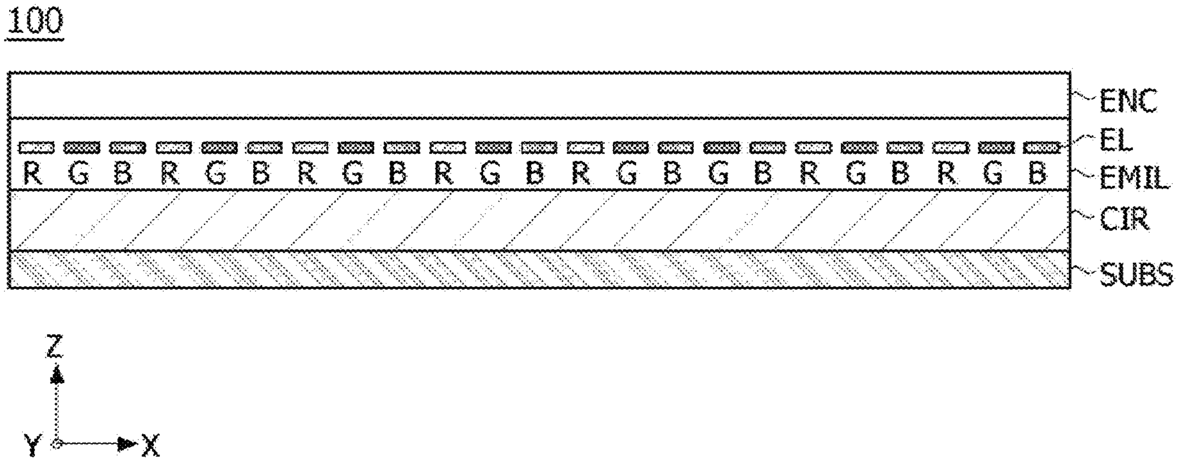
FIG. 31 is a cross-sectional view illustrating a cross-sectional structure of the display panel shown in FIG. 30.

FIG. 30 is a block diagram illustrating a display device according to one embodiment of the present disclosure. FIG. 31 is a cross-sectional view illustrating a cross-sectional structure of the display panel shown in FIG. 30.

Referring to FIGS. 30 and 31, the display device according to an embodiment of the present disclosure includes a display panel 100, a display panel driving circuit for writing pixel data to pixels of the display panel 100, and a power supply 140 for generating power necessary for driving the pixels and the display panel driving circuit.

The display panel 100 can be a panel having a rectangular structure with a length in the X-axis direction, a width in the Y-axis direction, and a thickness in the Z-axis direction. A display area of the display panel 100 includes a pixel array for displaying an input image thereon. The pixel array includes a plurality of data lines 102, a plurality of gate lines 103 intersected with the data lines 102, and pixels arranged in a matrix form. The display panel 100 can further include power lines commonly connected to the pixels. The power lines are connected to constant voltage nodes of the pixel circuits and supply a constant voltage necessary for driving the pixels 101 to the pixels 101.

Each of the pixels 101 can be divided into a red sub-pixel, a green sub-pixel, and a blue sub-pixel for color implementation. Each of the pixels can further include a white sub-pixel. Each of the sub-pixels can be implemented with any of the pixel circuits described above. Each of the pixel circuits is connected to the data lines, the gate lines, and the power lines.

The pixels can be arranged as real color pixels and pentile pixels. A pentile pixel can realize a higher resolution than the real color pixel by driving two sub-pixels having different colors as one pixel 101 through the use of a preset pixel rendering algorithm. The pixel rendering algorithm can compensate for insufficient color representation in each pixel with the color of light emitted from an adjacent pixel.

The pixel array includes a plurality of pixel lines L1 to Ln. Each of the pixel lines L1 to Ln includes one line of pixels arranged along a line direction (X-axis direction) in the pixel array of the display panel 100. Pixels arranged in one pixel line share the gate lines 103. Sub-pixels arranged in a column direction Y along the data line direction share the same data line 102. One horizontal period is a time obtained by dividing one frame period by the total number of pixel lines L1 to Ln.

The display panel 100 can be implemented with a non-transmissive display panel or a transmissive display panel. The transmissive display panel can be applied to a transparent display device in which an image is displayed on a screen and an actual object in the background is visible. The display panel 100 can be manufactured as a flexible display panel.

The cross-sectional structure of the display panel 100 can include a circuit layer CIR, a light emitting element layer EMIL, and an encapsulation layer ENC that are stacked on a substrate SUBS, as shown in FIGS. 26 and 27.

The circuit layer CIR can include a thin-film transistor (TFT) array including a pixel circuit connected to wirings such as a data line, a gate line, a power line, and the like, a de-multiplexer array 112, and a gate driver 120. The circuit layer CIR includes a plurality of metal layers insulated with insulating layers interposed therebetween, and a semiconductor material layer. All transistors formed in the circuit layer CIR can be implemented as an n-channel oxide TFT.

The light emitting element layer EMIL can include a light emitting element EL driven by the pixel circuit. The light emitting element EL can include a light emitting element of a red sub-pixel, a light emitting element of a green sub-pixel, and a light emitting element of a blue sub-pixel. The light emitting element layer EMIL can further include a light emitting element of white sub-pixel. The light emitting element layer EMIL in each of the sub-pixels can have a structure in which the light emitting element and a color filter are stacked. The light emitting elements EL in the light emitting element layer EMIL can be covered by multiple protective layers including an organic film and an inorganic film.

The encapsulation layer ENC covers the light emitting element layer EMIL to seal the circuit layer CIR and the light emitting element layer EMIL. The encapsulation layer ENC can also have a multi-insulating film structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement path of moisture and oxygen becomes longer than that of a single layer, so that penetration of moisture and oxygen affecting the light emitting element layer EMIL can be effectively blocked.

A touch sensor layer can be formed on the encapsulation layer ENC, and a polarizing plate or a color filter layer can be disposed thereon. The touch sensor layer can include capacitive touch sensors that sense a touch input based on a change in capacitance before and after the touch input. The touch sensor layer can include metal wiring patterns and insulating films forming the capacitance of the touch sensors. The insulating films can insulate a portion where the metal wiring patterns are intersected, and can planarize the surface of the touch sensor layer. The polarizing plate can improve visibility and contrast ratio by converting the polarization of external light reflected by metal of the touch sensor layer and the circuit layer. The polarizing plate can be implemented as a polarizer or a circular polarizer to which a linear polarizer and a phase retardation film are bonded. A cover glass can be adhered to the polarizing plate. The color filter layer can include red, green, and blue color filters. The color filter layer can further include a black matrix pattern. The color filter layer can replace the polarizing plate by absorbing a part of the wavelength of light reflected from the circuit layer and the touch sensor layer, and increase the color purity of an image reproduced in the pixel array.

The power supply 140 generates DC voltages (or constant voltages) necessary for driving the pixel array of the display panel 100 and the display panel driving circuit by using a DC-DC converter. The DC-DC converter can include a charge pump, a regulator, a buck converter, a boost converter, and the like. The power supply 140 can outputs constant voltages such as a gamma reference voltage VGMA, the gate-on voltage VGH, the gate-off voltage VGL, the pixel driving voltage EVDD, the pixel driving voltage EVDD, the cathode voltage EVSS, the reference voltage VREF, the anode reset voltage VAR and the like by adjusting the level of the DC input voltage applied from a host system. The gamma reference voltage VGMA is supplied to the data driver 110. The gate-on voltage VGH and the gate-off voltage VGL are supplied to a level shifter 132 and the gate driver 120. The constant voltages such as the pixel driving voltage EVDD, the cathode voltage EVSS, the reference voltage VREF, the anode reset voltage VAR, and the like are supplied to the pixels 101 via the power lines commonly connected to the pixels 101.

The display panel driving circuit writes pixel data of an input image to the pixels of the display panel 100 under the control of the timing controller 130.

The display panel driving circuit includes the data driver 110 and the gate driver 120. The display panel driving circuit can further include a de-multiplexer array 112 disposed between the data driver 110 and the data lines 102.

The de-multiplexer array 112 sequentially supplies the data voltages outputted from channels of the data driver 110 to the data lines 102 using a plurality of de-multiplexers DEMUX. A de-multiplexer can include a multiple of switch elements disposed on the display panel 100. When the de-multiplexer is disposed between the output terminals of the data driver 110 and the data lines 102, the number of channels of the data driver 110 can be reduced. The de-multiplexer array 112 can be omitted.

The display panel driving circuit can further include a touch sensor driver for driving touch sensors. The touch sensor driver is omitted from FIG. 25. The data driver 110 and the touch sensor driver can be integrated into one drive IC (Integrated Circuit). In mobile devices or wearable devices, the timing controller 130, the power supply 140, the data driver 110, and the like can be integrated into one drive IC.

The display panel driving circuit can operate in a low-speed driving mode under the control of the timing controller 130. The low-speed driving mode can be set to reduce power consumption of the display device when an input image does not changed during a predetermined number of frames as a result of analyzing the input image. In the low-speed driving mode, the power consumption in the display panel driving circuit and the display panel 100 can be reduced by lowering a frame frequency at which the pixel data is written to the pixels, for example, a refresh rate, when still images are inputted for a predetermined time or longer. The low-speed driving mode is not limited to a case where the still image is inputted. For example, when the display device operates in a standby mode or when a user command or an input image is not inputted to the display panel driving circuit for a predetermined time or longer, the display panel driving circuit can operate in the low-speed driving mode.

The data driver 110 receives pixel data of the input image received as a digital signal from the timing controller 130 and outputs a data voltage. The data driver 110 converts the pixel data of the input image into a gamma compensated voltage at each frame period in a normal driving mode using a digital-to-analogue converter (DAC) and outputs the data voltage VDATA. The data driver 110 converts the pixel data of the input image into the gamma compensated voltage to output the data voltage VDATA using the DAC only in a refresh frame in the low-speed driving mode, and stops its operation in the hold frame to not output the data voltage. In the low-speed driving mode, the pixels 101 charge a pixel data voltage in the refresh frame and maintain a previous data voltage in a hold frame.

The gamma reference voltage VGMA is divided by a voltage divider circuit into the gamma compensated voltage for each gray scale. The gamma compensated voltage for each gray scale is provided to the DAC in the data driver 110. The data voltage VDATA is outputted through an output buffer in each of the channels of the data driver 110.

The gate driver 120 can be implemented as a gate in panel (GIP) circuit formed in the circuit layer CIR on the display panel 100 together with the TFT array of the pixel array and wirings. The gate driver 120 can be disposed on a bezel area BZ, which is non-display area of the display panel 100, or can be distributedly disposed in a pixel array in which an input image is reproduced.

The gate driver 120 can be disposed in the bezel area BZ on both sides of the display panel 100 with the display area of the display panel interposed therebetween and can supply gate pulses from the both sides of the gate lines 103 in a double feeding method. The gate driver 120 sequentially outputs pulses of the gate signals to the gate lines 103 under the control of the timing controller 130. The gate driver 120 can sequentially supply the gate signals to the gate lines 103 by shifting the gate signals using a shift register.

The gate driver 120 can include one or more shift registers and one or more edge triggers. For example, the gate driver 120 can include, but is not limited to, a shift register that sequentially outputs the first gate signal SCAN1, a first edge trigger that sequentially outputs the second gate signal SCAN2, a second edge trigger that sequentially outputs the third gate signal SCAN3, a third edge trigger that sequentially outputs the fourth gate signal EM1, and a fourth edge trigger that sequentially outputs the fifth gate signal EM2.

The timing controller 130 receives the digital video data DATA of the input image and timing signals synchronized therewith from the host system. The timing signal can include a vertical synchronization signal Vsync, a horizontal synchronization signal Hsync, a clock CLK, and a data enable signal DE. Because a vertical period and a horizontal period can be known by counting the data enable signal DE, the vertical synchronization signal Vsync and the horizontal synchronization signal Hsync can be omitted. The data enable signal DE has a cycle of one horizontal period (1H).

The host system can be one of a television (TV) system, a tablet computer, a notebook computer, a navigation system, a personal computer (PC), a home theater system, a mobile device, a wearable device, and a vehicle system. The host system can scale an image signal from a video source to match the resolution of the display panel 100 and transmit it to the timing controller 130 together with the timing signal.

The timing controller 130 can multiply the input frame frequency by i (i is a natural number) in a normal driving mode, so that it can control the operation timing of the display panel driving circuit at a frame frequency of the input frame frequency×i Hz. The input frame frequency is 60 Hz in a national television standards committee (NTSC) system and 50 Hz in a phase-alternating line (PAL) system.

The host system or timing controller 130 can vary the frame frequency to match the movement or the content characteristics of the input image.

The timing controller 130 reduces a frequency of a frame rate at which the pixel data is written to the pixels in the low-speed driving mode, compared to the normal driving mode. For example, the frame frequency at which the pixel data is written to the pixels in the normal driving mode can be 60 Hz or higher, e.g., any one of 60 Hz, 120 Hz, 144 Hz, 240 Hz, and the frame frequency in the low-speed driving mode can be set to a lower frequency than that in the normal driving mode. The timing controller 130 can reduce the driving frequency for the display panel driving circuit by reducing the frame frequency to lower the refresh rate of the pixels in the low-speed driving mode.

The timing controller 130 generates a data timing control signal for controlling the operation timing of the data driver 110, a control signal for controlling the operation timing of the de-multiplexer array 112, and a gate timing control signal for controlling the operation timing of the gate driver 120, based on the timing signals Vsync, Hsync, DE received from the host system. The timing controller 130 synchronizes the data driver 110, the de-multiplexer array 112, the touch sensor driver, and the gate driver 120 by controlling the operation timings of the display panel driving circuit.

A gate timing control signal generated from the timing controller 130 can be input to the shift register and the edge trigger in the gate driver 120 through the level shifter 132. The level shifter 132 can receive the gate timing control signal and generate a start pulse and a shift clock to provide them to the shift register and the edge trigger in the gate driver 120.

The pixel circuits according to the embodiments of the present disclosure and the pixel circuit illustrated in FIG. 29 differ in a circuit structure and a waveform of the gate signal. It is possible to change the waveform of the gate signal by changing the clock input to the gate drivers with the same structure. Accordingly, the circuit design concept of the gate driver can be shared even for pixel circuits with different structures, and the components of a level shifter IC can be shared.

Figure 32:
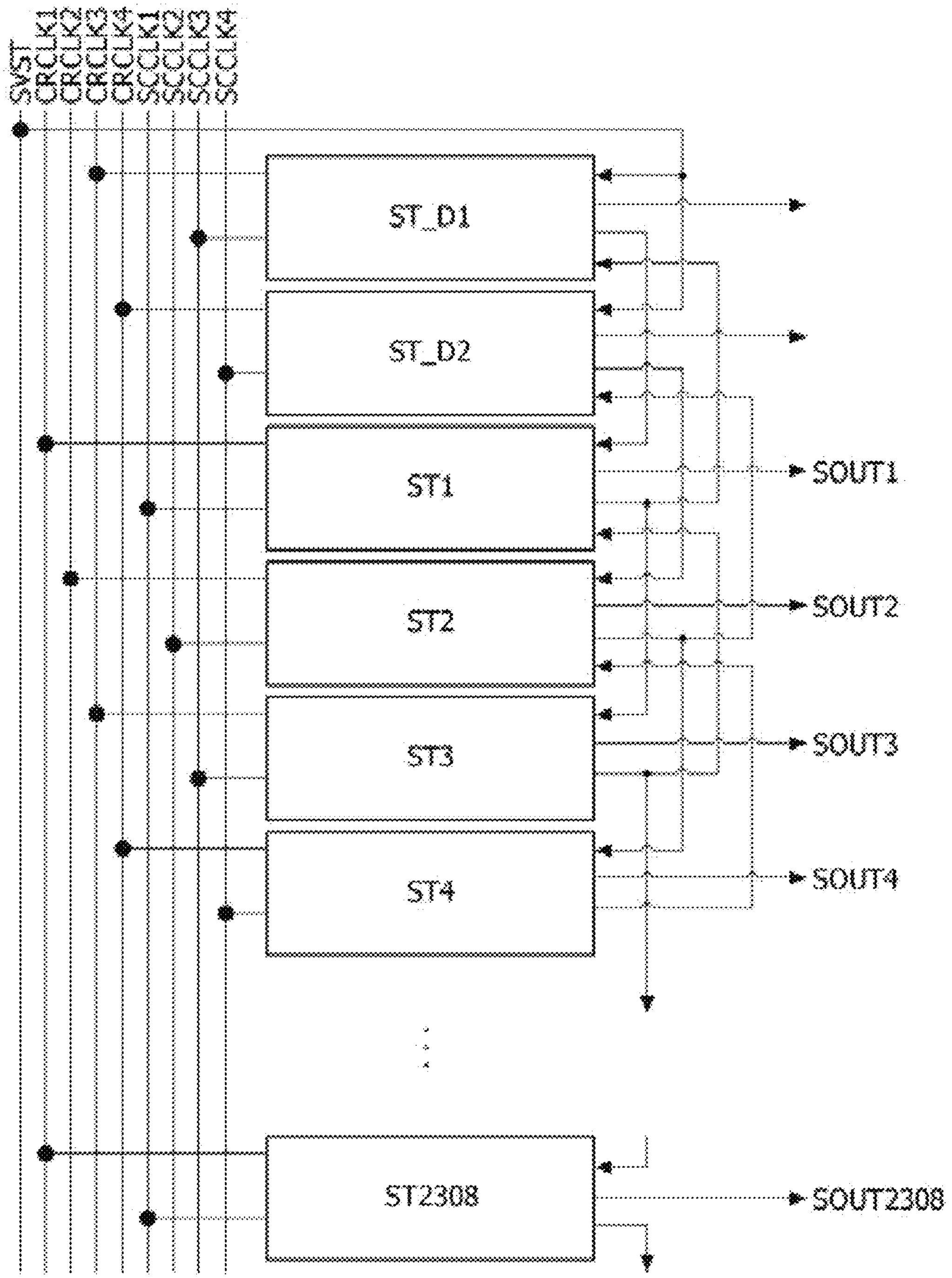
FIG. 32 is a diagram illustrating a connection structure of signal transmitters in a shift register.
Figure 33:
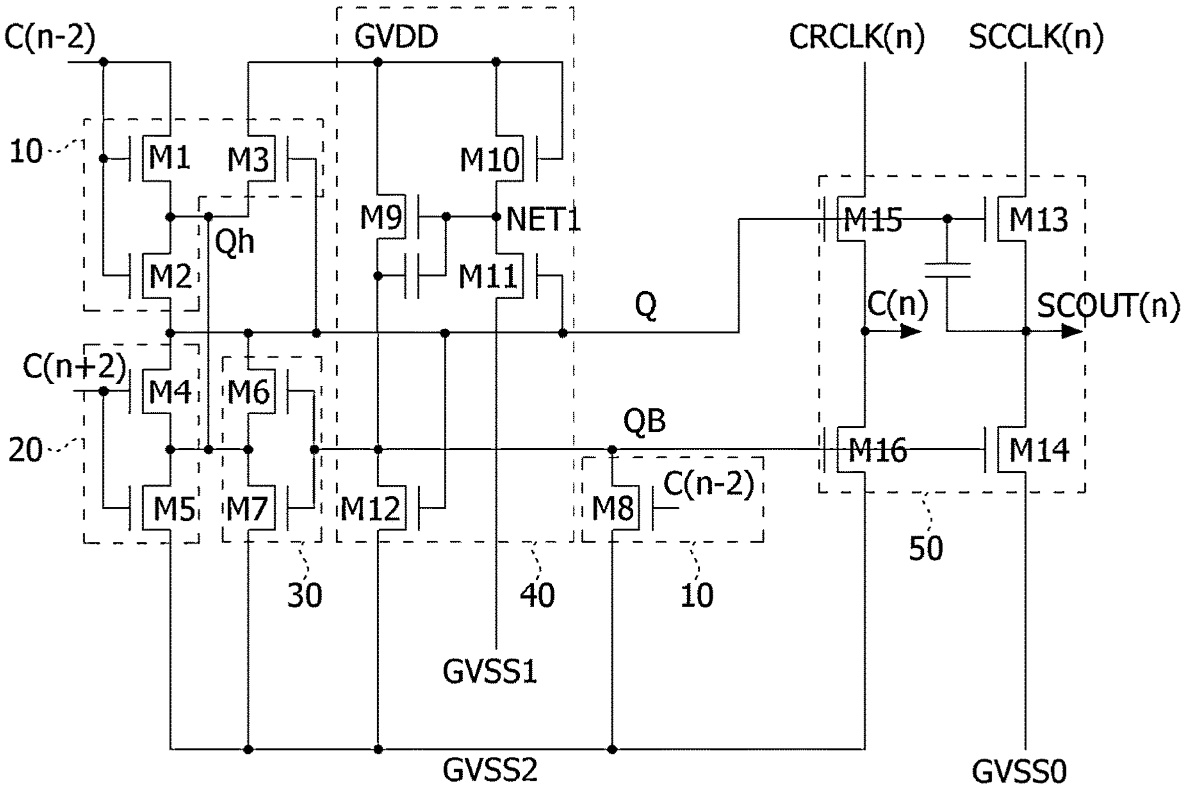
FIG. 33 is a circuit diagram illustrating an example of an (n)th signal transmitter in the shift register shown in FIG. 32.

The gate driver 120 can include the shift register and the edge trigger. As illustrated in FIGS. 32 and 33, the shift register supplies clocks CRCLK(n) and SCCLK(n) and gate-off voltages GVSS2 and GVSS0 to the output buffer circuit. In the shift register, the gate signal output through the output buffer is output as the clocks CRCLK(n) and SCCLK(n). While FIGS. 32 and 33 illustrate an example of the shift register, but the present disclosure is not limited thereto.

Figure 35:
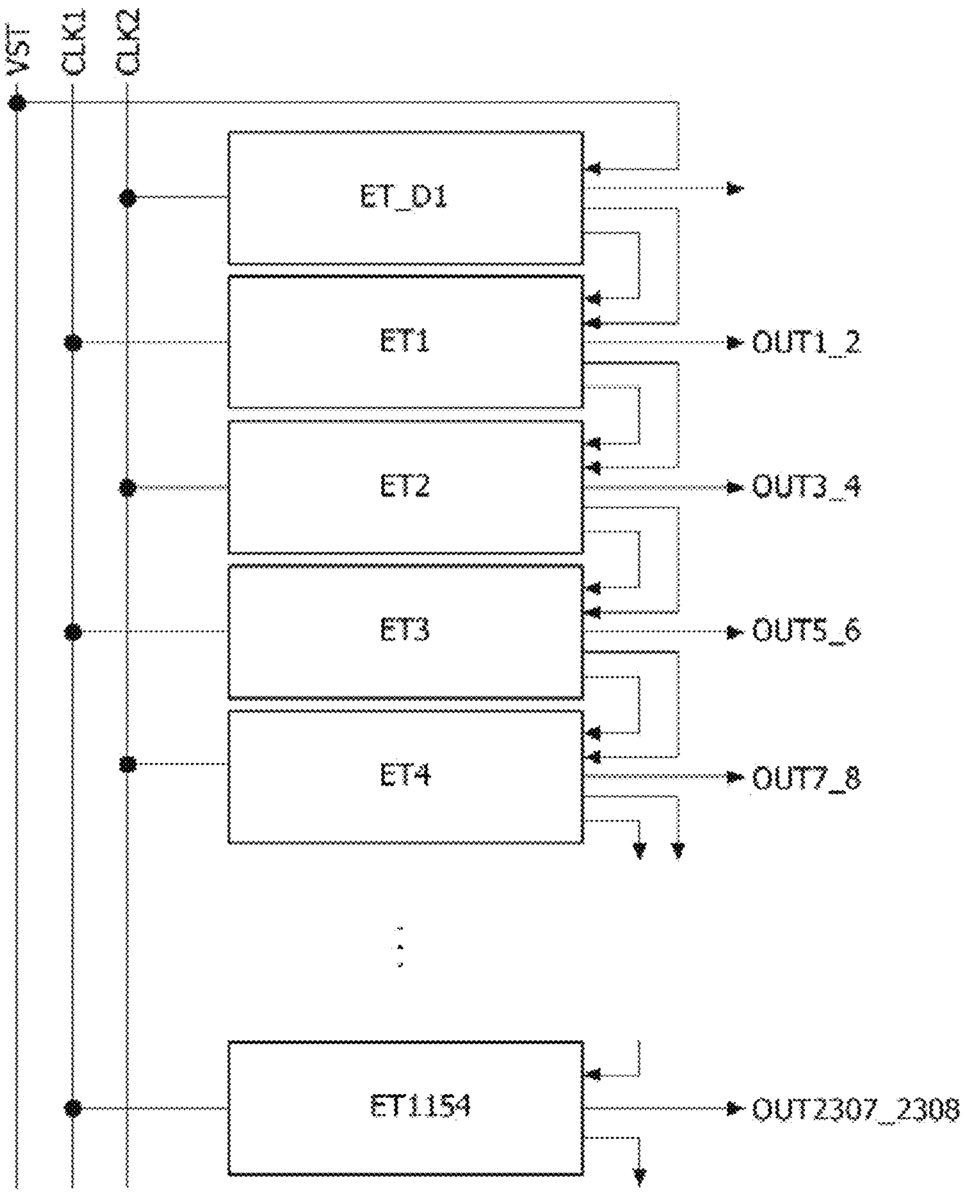
FIG. 35 is a diagram illustrating a connection structure of signal transmitters in an edge trigger.
Figure 36:
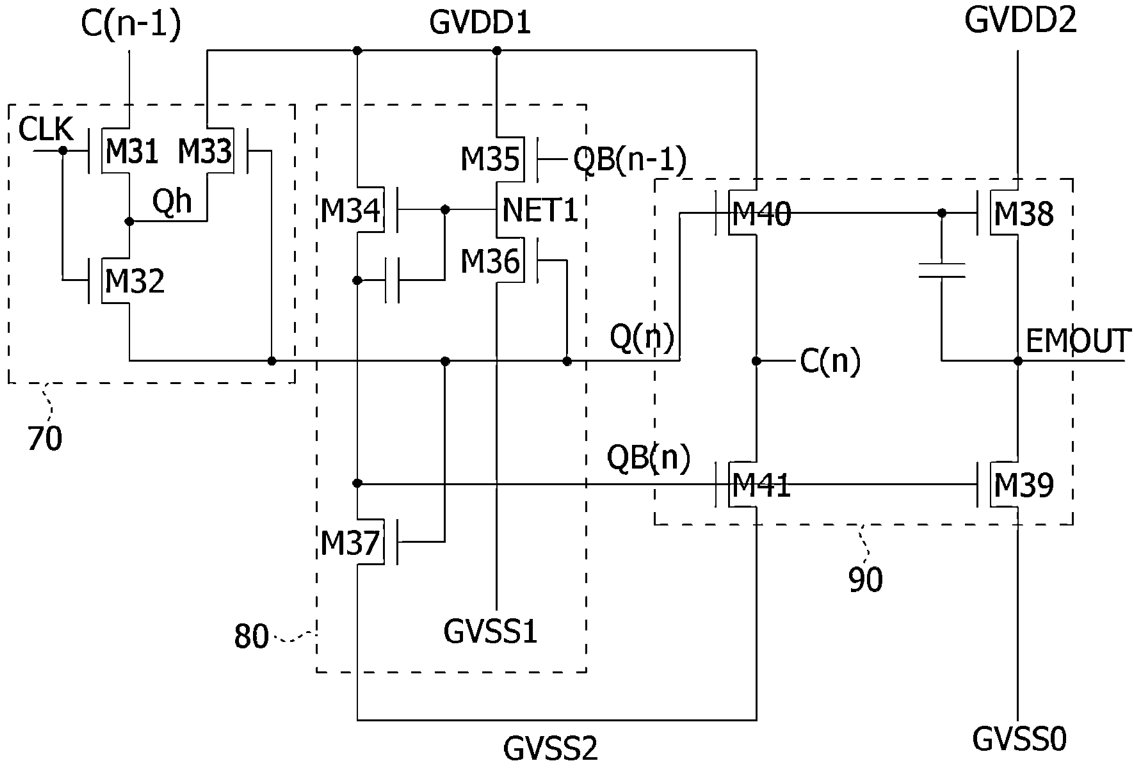
FIG. 36 is a circuit diagram illustrating one example of an (n)th signal transmitter in the edge trigger shown in FIG. 35.

The edge trigger as illustrated in FIGS. 35 and 36 supply a constant voltages set as the gate-on voltages GVDD1 and GVDD2 and a constant voltage set as the gate-off voltages GVSS2 and GVSS0. In the edge trigger, the gate signal output through the output buffer can be triggered at the edge of an input clock ECLKn. While FIGS. 35 and 36 illustrate an example of the edge trigger, the present disclosure is not limited thereto.

FIG. 32 is a diagram illustrating a connection structure of signal transmitters in the shift register. The shift register shown in FIG. 32 is illustrated, but is not limited to, as a single feeding circuit that generates first to (2308)th output signals. In case of a double feeding circuit, the single feeding circuit as illustrated in FIG. 32 is arranged in a left-right symmetrical structure and connected to both ends of the gate lines.

Referring to FIG. 32, the shift register includes a plurality of signal transmitters ST1 to ST2308 electrically connected through clock wires and carry signal wires. An (n)th signal transmitter generates an (n)th output signal. The (n)th output signal can be applied to gate lines connected to the pixels in an n(th) pixel line on the display panel 100. For example, a first output signal SOUT1 output from a first signal transmitter ST1 can be a gate signal applied to a first gate line connected to sub-pixels in a first pixel line L1. The (2308)th output signal SOUT2308 output from an (2308)th signal transmitter ST2308 can be a gate signal applied to gate lines connected to sub-pixels in (2308)th pixel line.

The shift register can further include dummy signal transmitters ST_D1 and ST_D2. In FIG. 32, carry signals output from the dummy signal transmitters ST_D1 and ST_D2 is input as a start signal to the first and second signal transmitters ST1 and ST2. No output signals from the dummy signal transmitters ST_D1 and ST_D2 are applied to the gate lines. A bottom dummy signal transmitter can be disposed under the (2308)th signal transmitter ST2308. The bottom dummy signal transmitter can transmit a reset pulse to the (2308)th signal transmitter ST2308.

The signal transmitters ST_D1, ST_D2, and ST1 to ST2308 include clock nodes to which the respective clocks CRCLK1 to CRCLK4 and SCCLK1 to SCCLK4 are input through the clock wires, SET nodes to which a start pulse SVST or a previous carry signal from a previous stage is input, and output nodes from which the respective output signals SOUT1 to SOUT2308 and the carry signal are output. The signal transmitters ST_D1, ST_D2, and ST1 to ST2308 can further include RST nodes to which the carry signal or the reset pulse from a subsequent stage is input.

The start pulse SVST is input to the SET node of the first dummy signal transmitter ST_D1. When the start pulse SVST is applied to the first dummy signal transmitter ST_DT1, the first dummy signal transmitter ST_DT1 starts to drive, and then the signal transmitters generate output sequentially.

FIG. 33 is a circuit diagram illustrating an example of an (n)th signal transmitter (where n is a natural number) in the shift register shown in FIG. 32.

Referring to FIG. 33, the (n)th signal transmitter includes an input part 10, a reset part 20, a stabilization part 30, an inverter 40, and an output buffer 50.

The (n)th signal transmitter includes power nodes to which constant voltages are applied, such as a GVDD node to which the gate-on voltage VGH is applied, and VSS nodes GVSS0, GVSS1, and GVSS2 to which the gate-off voltage VGL is applied. The gate-off voltage VGL having the same voltage level or the gate-off voltage VGL having different voltage levels can be applied to the VSS nodes GVSS0, GVSS1, and GVSS2. For example, even if the threshold voltages of transistors M13 to M16 of the buffer 50 are shifted to a negative voltage less than 0V, the voltage of the GVSS0 node can be set to a voltage higher than that of the GVSS2 node so that the transistors M13 to M16 can be turned on.

The input part 10 includes a first transistor M1, a second transistor M2, a third transistor M3, and an eighth transistor M8.

The first transistor M1 is turned on to transfer the voltage of the first input signal [C(n−2)] to a first buffer node Qh when the voltage of a first input signal [C(n−2)] is the gate-on voltage VGH. The first input signal can be a carrier pulse output from a previous signal transmitter, for example, an (n−2)th signal transmitter, but is not limited thereto. The first transistor M1 includes a gate electrode and a first electrode to which the first input signal [C(n−2)] is applied, and a second electrode connected to the first buffer node Qh.

The second transistor M2 is turned on to connect the first buffer node Qh to a first control node Q when the voltage of the first input signal [C(n−2)] is the gate-on voltage VGH. The second transistor M2 includes a gate electrode to which the first input signal [C(n−2)] is applied, a first electrode connected to the first buffer node Qh, and a second electrode connected to the first control node Q.

The first and second transistors M1 and M2 are connected in series in a two transistor series (TTS) structure. The transistors connected in the TTS structure have little leakage current. Meanwhile, the transistors M4 to M7 of the reset part 20 and the stabilization part 30 are also connected in the TTS structure.

The third transistor M3 is turned on to connect the GVDD node to the first buffer node Qh when the first control node Q is charged, thereby preventing the first control node Q from leaking current. The third transistor M3 includes a gate electrode connected to the first control node Q, a first electrode connected to the GVDD node, and a second electrode connected to the first buffer node Qh.

The eighth transistor M8 is turned on to connect a second control node QB to a GVSS2 when the voltage of the first input signal [C(n−2)] is the gate-on voltage VGH. The eighth transistor M8 includes a gate electrode to which the first input signal [C(n−2)] is applied, a first electrode connected to the second control node QB, and a second electrode connected to the GVSS2 node.

The reset part 20 includes fourth and fifth transistors M4 and M5.

The fourth transistor M4 is turned on to connect the first control node Q to the first buffer node Qh when the voltage of a second input signal [C(n+2)] is the gate-on voltage VGH. The second input signal [C(n+2)] can be a pulse of the carry signal output from a subsequent signal transmitter, for example, an (n+2)th signal transmitter, but is not limited thereto. The fourth transistor M4 includes a gate electrode to which the second input signal [C(n+2)] is applied, a first electrode connected to the first control node Q, and a second electrode connected to the first buffer node Qh.

The fifth transistor M5 is turned on to connect the first buffer node Qh to the GVSS2 node when the voltage of the second input signal [C(n+2)] is the gate-on voltage VGH. The fifth transistor M5 includes a gate electrode to which the second input signal [C(n+2)] is applied, a first electrode connected to the first buffer node Qh, and a second electrode connected to the GVSS2 node.

The stabilization part 30 includes sixth and seventh transistors M6 and M7.

The sixth transistor M6 is turned on to connect the first control node Q to the first buffer node Qh when the voltage of the second control node QB is the gate-on voltage VGH. The sixth transistor M6 includes a gate electrode connected to the second control node QB, a first electrode connected to the first control node Q, and a second electrode connected to the first buffer node Qh.

The seventh transistor M7 is turned on to connect the first buffer node Qh to the GVSS2 node when the voltage of the second control node QB is the gate-on voltage VGH. The seventh transistor M7 includes a gate electrode connected to the second control node QB, a first electrode connected to the first buffer node Qh, and a second electrode connected to the GVSS2 node.

The inverter 40 includes ninth to twelfth transistors M9 to M12.

When the ninth transistor M9 is turned on, the second control node QB can be charged. The ninth transistor M9 includes a gate electrode connected to a second buffer node NET1, a first electrode connected to the GVDD node, and a second electrode connected to the second control node QB. A capacitor is connected between the gate electrode and the second electrode of the ninth transistor M9. At the same time as the ninth transistor M9 is turned on, the voltage of the second buffer node NET1 is boosted to the voltage of the GVDD node through a capacitor coupling.

The tenth transistor M10 includes a gate electrode and a first electrode connected to the GVDD node, and a second electrode connected to the second buffer node NET1. The eleventh transistor M11 includes a gate electrode connected to the second control node Q, a first electrode connected to the first buffer NET1, and a second electrode connected to the GVSS1 node. The twelfth transistor M12 includes a gate electrode connected to the first control node Q, a first electrode connected to the second control node QB, and a second electrode connected to the GVSS2 node.

The output buffer 50 includes thirteenth to sixteenth transistors M13 to T16.

The thirteenth transistor M13 is a pull-up transistor that is turned on when the voltage of the first control node Q is boosted to a voltage higher than the gate-on voltage VGH so that the gate-on voltage of the clock [SCCLK(n)] is transferred to a first output node, thereby charging the first output node. When the first output node is charged, the voltage of a gate signal [SOUT(n)] rises to the gate-on voltage VGH. The thirteenth transistor M13 includes a gate electrode connected to the first control node Q, a first electrode connected to a first clock node to which a clock [SCCLK (N)] is applied, and a second electrode connected to the first output node. A capacitor is connected between the gate electrode and the first electrode of the thirteenth transistor M13. The capacitor boosts the voltage of the first control node Q to the gate-on voltage of the clock [SCCLK(n)] when the thirteenth transistor M13 is turned on.

The fourteenth transistor M14 is a pull-down transistor that is turned on to connect the first output node to the GVSS0 node to which the gate-off voltage is applied when a voltage of the second control node QB is the gate-on voltage VGH. When the first output node is discharged, the voltage of the gate signal is lowered to the gate-off voltage VGL. The fourteenth transistor M14 includes a gate electrode connected to the second control node QB, a first electrode connected to the first output node, and a second electrode connected to the GVSS0 node.

The fifteenth transistor M15 is a full-up transistor that is turned on when the voltage of the first control node Q is boosted to a voltage higher than the gate-on voltage and that is configured to transfer the gate-on voltage of the carry signal clock CRCLK(n) to a second output node. The fifteenth transistor M15 includes a gate electrode connected to the first control node Q, a first electrode connected to the first clock node to which the carry signal clock CRCLK(n) is applied, and a second electrode connected to the second output node.

The sixteenth transistor M16 is a pull-down transistor that is turned on when the voltage of the second control node QB is the gate-on voltage VGH and that is configured to connect the second output node to the GVSS2 node, thereby discharging the second output node. The sixteenth transistor M16 includes a gate electrode connected to the second control node QB, a first electrode connected to the first output node, and a second electrode connected to the GVSS2 node.

The shift register shown in FIGS. 32 and 33 can be utilized, but is not limited to, as a gate driving circuit that outputs the first gate signal SCAN1.

Figure 34:
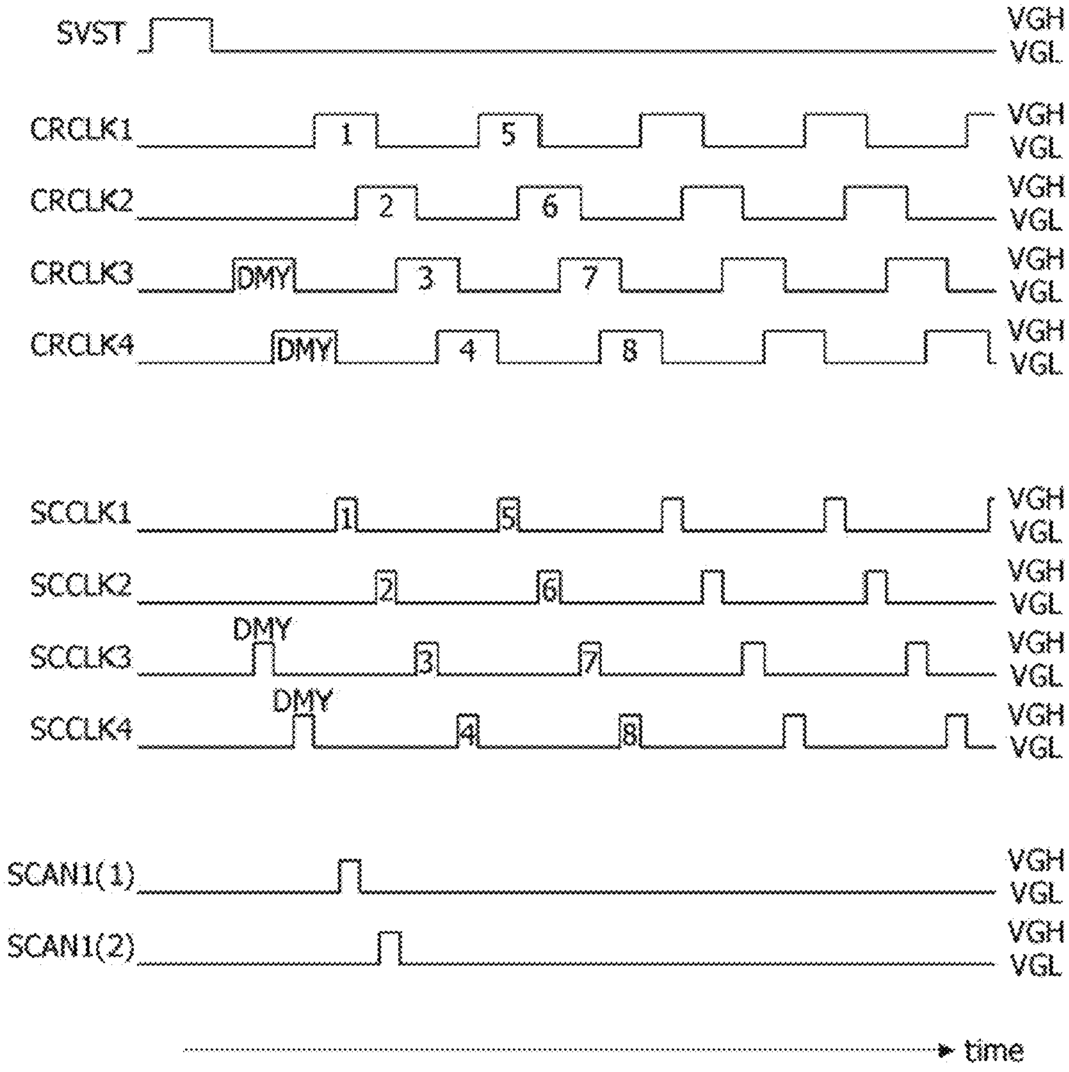
FIG. 34 is a waveform diagram illustrating an example of input/output signals to/from the signal transmitter in the shift register shown in FIGS. 32 and 33.

FIG. 34 is a waveform diagram illustrating an example of input/output signals to/from the signal transmitter in the shift register shown in FIGS. 32 and 33. In FIG. 34, "DMY" denotes pulses of the clock input to the dummy signal transmitter and the carry signal output from the dummy signal transmitter. Numbers written together in the pulses of clocks SCCLK1 to SCCLK4 and CRCLK1 to CRCLK4 indicate the order of the pulses to be shifted. The clock pulses with '1' and '2' are synchronized with the pulses of the first gate signal SCAN1 which is applied sequentially to the first gate lines for the first and second pixel lines. SCAN1(1) is the first gate signal applied to the first gate line for the first pixel line in synchronization with a clock pulse 1. SCAN1(2) is the first gate signal applied to the first gate line for the second pixel line in synchronization with a clock pulse 2.

FIG. 35 is a diagram illustrating a connection structure of signal transmitters in an edge trigger. The edge trigger illustrated in FIG. 35 illustrates an example of, but is not limited to, output signals EOUT1_2 to EOUT2307_2308 output from the first to (1154)th signal transmitters. In case of a double feeding circuit, the single feeding circuit as illustrated in FIG. 35 is arranged in a left-right symmetrical structure and connected to both ends of the gate lines.

Referring to FIG. 35, the edge trigger includes a plurality of signal transmitters ET1 to ET1154 electrically connected through clock wires and carry signal wires. An (n)th signal transmitter generates an output signal that is shared between the two pixel lines. For example, an output signal EOUT1_2 output from a first signal transmitter ET1 can be a gate signal applied to a gate line shared between first and second pixel lines. An output signals EOUT2307_2308 from an (1154)th signal transmitter ET1154 can be a gate signal applied to a gate line shared between an (2307)th and (2308)th pixel lines.

The edge trigger can further include a dummy signal transmitter ET_D1. The dummy signal transmitter ET_D1 provides the voltage of the second control node and the carry signal to the first signal transmitter ET1. No output signal from the dummy signal transmitter ET_D1 is applied to the gate line. A bottom dummy signal transmitter can be disposed under the (1154)th signal transmitter ET1154.

The signal transmitters ET_D1, and ET1 to ET1154 include clock nodes to which clocks CLK1 and CLK2 are input through the clock wires, SET nodes to which a start pulse VST or a previous carry signal from a previous stage is input, and output nodes from which output signals OUT1_2 to OUT2307_2308 and the carry signal are output. The signal transmitters ET_D1 and ET1 to ET1154 can further include RST nodes to which the carry signal or the reset pulse from a subsequent stage are input.

The start pulse VST is input to the SET node of the dummy signal transmitter ET_D1. When the start pulse VST is applied to the first dummy signal transmitter ET_DT1, the first dummy signal transmitter ET_DT1 starts to drive, and then the signal transmitters generate output sequentially.

FIG. 36 is a circuit diagram illustrating an example of an (n)th signal transmitter (where n is a natural number) in the edge trigger shown in FIG. 35.

Referring to FIG. 36, the (n)th signal transmitter includes an input part 70, an inverter 80, and an output buffer 90.

The (n)th signal transmitter include power nodes to which a constant voltage is applied, for example, VDD nodes GVDD1 and GVDD2 to which the gate-on voltage VGH is applied and VSS nodes GVSS0, GVSS1, and GVSS2 to which the gate-off voltage VGL is applied. The gate-off voltage VGL having the same voltage level or the gate-off voltage VGL having different voltage levels can be applied to the VSS nodes GVSS0, GVSS1, and GVSS2. For example, even if the threshold voltages of transistors M38 to M41 of the buffer 90 are shifted to a negative voltage less than 0V, the voltage of the GVSS0 node can be set to a voltage higher than that of the GVSS2 node so that the transistors M38 to M41 can be turned on. The VDD nodes GVDD1 and GVDD2 can be isolated to prevent the voltage of the output signal OUT from dropping or rising.

The input part 70 includes a first transistor M31, a second transistor M32, and a third transistor M33.

The first transistor M31 includes a gate electrode to which a first input signal [C(n−1)] is applied, a first electrode to which a clock CLK is applied, and a second electrode connected to a first buffer node Qh. The first input signal [C(n−1)] can be the start pulse or the carry pulse output from a previous signal transmitter. The second transistor M32 includes a gate electrode to which the clock CLK is applied, a first electrode connected to the first buffer node Qh, and a second electrode connected to a first control node Q(n). The first and second transistors M31 and M32 are connected in series to prevent leakage current in the first control node Q(n).

The third transistor M33 includes a gate electrode connected to the first control node Q(n), a first electrode connected to the GVDD1 node, and a second electrode connected to the first buffer node Qh.

The inverter 80 includes a fourth transistor M34, a fifth transistor M35, a sixth transistor M36, and a seventh transistor M37.

The fourth transistor M34 includes a gate electrode connected to a second buffer node NET1, a first electrode connected to the GVDD1 node, and a second electrode connected to a second control node QB(n). A capacitor is connected between the gate electrode and the second electrode of the fourth transistor M34. The fifth transistor M35 includes agate electrode connected to a second control voltage [QB(n−1)] of an (n−1)th signal transmitter, a first electrode connected to the GVDD1 node, and a second electrode connected to the second buffer node NET1. The sixth transistor M36 includes a gate electrode connected to the first control node Q(n), a first electrode connected to the second buffer node NET1, and a second electrode connected to the GVSS1 node. The seventh transistor M37 includes a gate electrode connected to the first control node Q(n), a first electrode connected to the second control node QB(n), and a second electrode connected to the GVSS2 node.

The output buffer 90 includes an eighth transistor M38, a ninth transistor M39, a tenth transistor M40, and an eleventh transistor M41.

The eighth transistor M38 includes a gate electrode connected to the first control node Q(n), a first electrode connected to the GVDD2 node, and a second electrode connected to a first output node. A capacitor is connected between the gate electrode of the eighth transistor M38 and the first output node. The eighth transistor M38 is a pull-up transistor that raises the gate signal output through the first output node. The ninth transistor M39 includes a gate electrode connected to the second control node QB, a first electrode connected to the first output node, and a second electrode connected to the GVSS0 node. The ninth transistor M39 is a pull-down transistor that discharges the first output node to the voltage of the GVSS0 node.

The tenth transistor M40 includes a gate electrode connected to the first control node Q(n), a first electrode connected to the GVDD1 node, and a second electrode connected to a second output node. The tenth transistor M40 is a pull-up transistor that raises the carry signal output through the second output node. The eleventh transistor M41 includes a gate electrode connected to the second control node QB(n), a first electrode connected to the second output node, and a second electrode connected to the GVSS2 node. The eleventh transistor M41 is a pull-down transistor that discharges the second output node to the voltage of the GVSS2 node.

The edge trigger illustrated in FIGS. 35 and 36 can be utilized as a gate driving circuit that outputs the second gate signal SCAN2, the third gate signal SCAN3, the fourth gate signal EM1, and the fifth gate signal EM2, but is not limited thereto.

Figure 37:
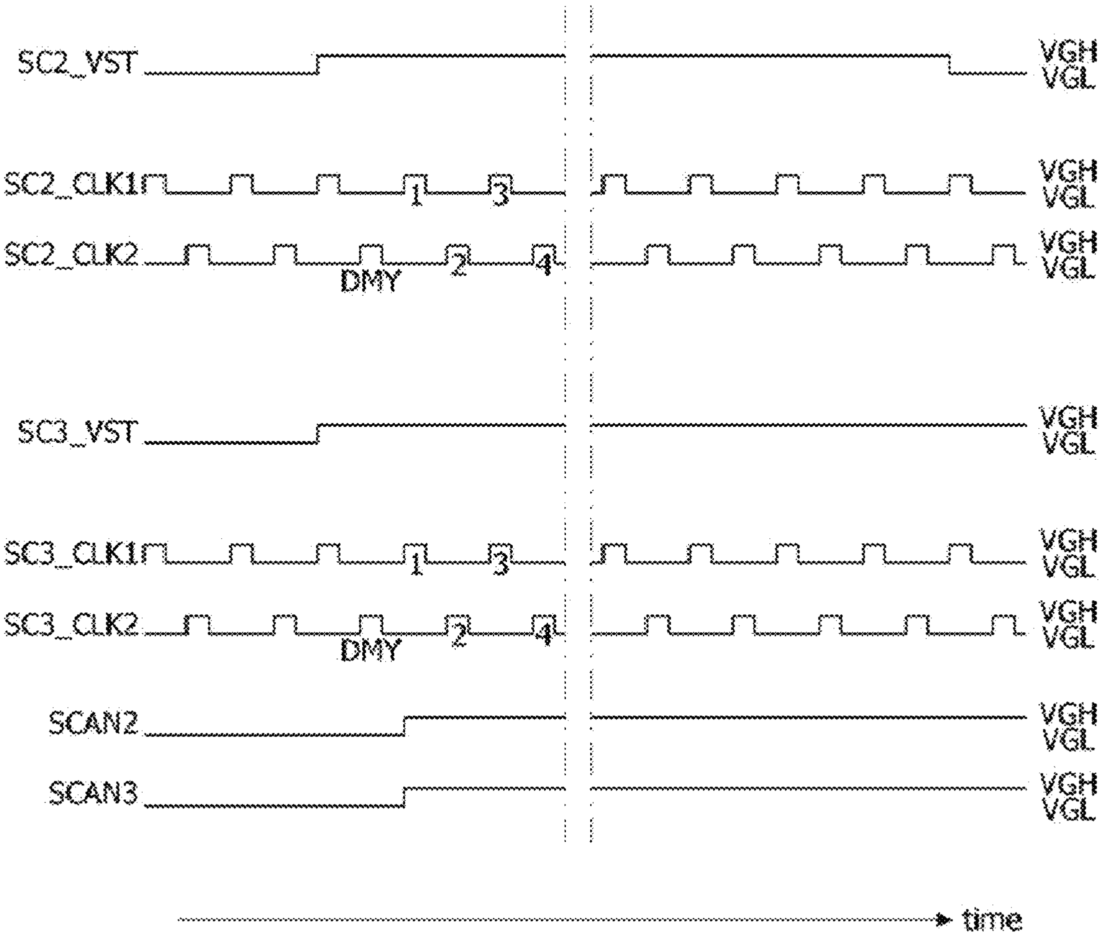
FIGS. 37 and 38 are waveform diagrams illustrating an example of input/output signals to/from the edge trigger shown in FIGS. 35 and 36.
Figure 38:
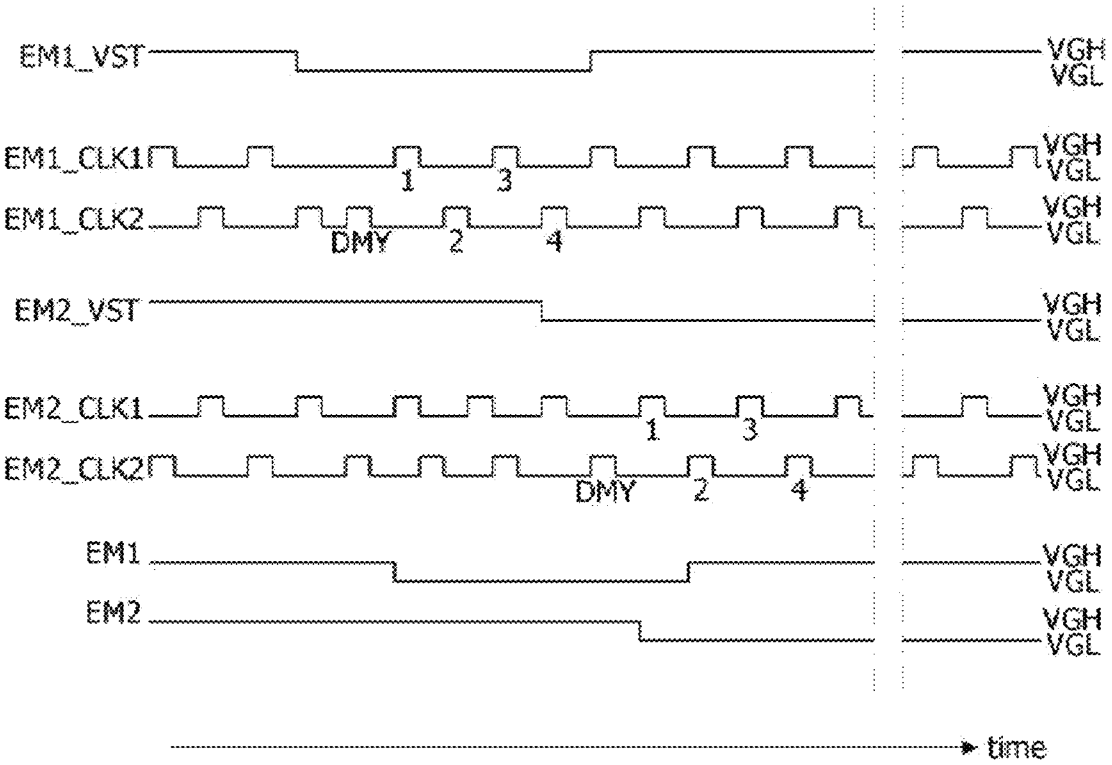

FIGS. 37 and 38 are waveform diagrams illustrating an example of input/output signals to/from the edge trigger shown in FIGS. 35 and 36. In FIGS. 37 and 38, "DMY" denotes a pulse of the clock input to the dummy signal transmitter. SC2_VST, SC2_CLK1, and SC2_CLK2 are the start pulse and the clocks input to the edge trigger that outputs the second gate signal SCAN2. SC3_VST, SC3_CLK1, and SC3_CLK2 are the start pulse and the clocks that are input to the edge trigger that outputs the third gate signal SCAN3. EM1_VST, EM1_CLK1, and EM1_CLK2 are the start pulse and the clocks input to the edge trigger that outputs the fourth gate signal EM1. EM2_VST, EM2_CLK1, and EM2_CLK2 are the start pulse and the clocks input to the edge trigger that outputs the second gate signal EM2.

The objects to be achieved by the present disclosure, the means for achieving the objects, and advantages and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A pixel circuit comprising:

a driving element including a first electrode connected to a first node, a gate electrode connected to a second node, and a second electrode connected to a third node;

a first capacitor connected between the second node and a fourth node;

a second capacitor connected between the third node and the fourth node;

a light emitting element including an anode electrode connected to a fifth node and a cathode electrode to which a cathode voltage is applied;

a first switch element configured to apply a data voltage to the second node; and a switch circuit configured to selectively apply a reference voltage to the second node and the fourth node, the switch circuit including at least two transistors connected in series between the reference voltage and one of the second node and the fourth node.

2. The pixel circuit of claim 1, wherein the switch circuit includes:

a second switch element configured to apply the reference voltage to a sixth node in response to a second gate signal;

a third switch element configured to electrically connect the sixth node to the fourth node in response to the second gate signal; and a fourth switch element configured to electrically connect the sixth node to the second node in response to a third gate signal, wherein the first switch element is turned on or off in response to a first gate signal.

3. The pixel circuit of claim 2, wherein a driving period of the pixel circuit includes a first period, a second period, a third period, a fourth period, and a fifth period, a voltage of the first gate signal is a gate-on voltage during the third period and a gate-off voltage during the first, second, fourth, and fifth periods, a voltage of the second gate signal is the gate-on voltage during the first, second, and third periods and the gate-off voltage during the fourth and fifth periods, a voltage of the third gate signal is the gate-on voltage during the first, second, and fourth periods and the gate-off voltage during the third and fifth periods, and each of the first switch element, the second switch element, the third switch element, and the fourth switch element is turned on in response to the gate-on voltage and is turned off in response to the gate-off voltage.

4. The pixel circuit of claim 2, wherein the first switch element includes a first electrode connected to a data line to which the data voltage is applied, a gate electrode to which the first gate signal is applied, and a second electrode connected to the second node, the second switch element includes a first electrode to which the reference voltage is applied, a gate electrode to which the second gate signal is applied, and a second electrode connected to the sixth node, the third switch element includes a first electrode connected to the sixth node, a gate electrode to which the second gate signal is applied, and a second electrode connected to the fourth node, and the fourth switch element includes a first electrode connected to the sixth node, a gate electrode to which the third gate signal is applied, and a second electrode connected to the second node.

5. The pixel circuit of claim 2, further comprising:

a fifth switch element configured to apply an anode reset voltage to the fifth node in response to the third gate signal;

a sixth switch element configured to apply a pixel driving voltage to the first node in response to a fourth gate signal; and a seventh switch element configured to electrically connect the third node to the fifth node in response to a fifth gate signal.

6. The pixel circuit of claim 5, wherein a driving period of the pixel circuit includes a first period, a second period, a third period, a fourth period, and a fifth period, a voltage of the fourth gate signal is a gate-on voltage during the second and fifth periods and a gate-off voltage during the first, third, and fourth periods, a voltage of the fifth gate signal is the gate-on voltage during the first, fourth, and fifth periods and the gate-off voltage during the second and third periods, and each of the first switch element, the second switch element, the third switch element, the fourth switch element, the fifth switch element, the sixth switch element, and the seventh switch element is turned on in response to the gate-on voltage and is turned off in response to the gate-off voltage.

7. The pixel circuit of claim 5, wherein the fifth switch element includes a first electrode connected to the fifth node, a gate electrode to which the third gate signal is applied, and a second electrode to which the anode reset voltage is applied, the sixth switch element includes a first electrode to which the pixel driving voltage is applied, a gate electrode to which the fourth gate signal is applied, and a second electrode connected to the first node, and the seventh switch element includes a first electrode connected to the third node, a gate electrode to which the fifth gate signal is applied, and a second electrode connected to the fifth node.

8. The pixel circuit of claim 1, wherein the switch circuit includes:

a second switch element configured to apply the reference voltage to a sixth node in response to a second gate signal;

a third switch element configured to apply the reference voltage to the fourth node in response to the second gate signal; and a fourth switch element configured to electrically connect the sixth node to the second node in response to the third gate signal.

9. The pixel circuit of claim 8, wherein a driving period of the pixel circuit includes a first period, a second period, a third period, a fourth period, and a fifth period, a voltage of the first gate signal is a gate-on voltage during the third period and a gate-off voltage during the first, second, fourth, and fifth periods, a voltage of the second gate signal is the gate-on voltage during the first, second, and third periods and the gate-off voltage during the fourth and fifth periods, a voltage of the third gate signal is the gate-on voltage during the first, second, and fourth periods and the gate-off voltage during the third and fifth periods, and each of the first switch element, the second switch element, the third switch element, and the fourth switch element is turned on in response to the gate-on voltage and is turned off in response to the gate-off voltage.

10. The pixel circuit of claim 8, wherein the first switch element includes a first electrode connected to a data line to which the data voltage is applied, a gate electrode to which the first gate signal is applied, and a second electrode connected to the second node, the second switch element includes a first electrode to which the reference voltage is applied, a gate electrode to which the second gate signal is applied, and a second electrode connected to the sixth node, the third switch element includes a first electrode to which the reference voltage is applied, a gate electrode to which the second gate signal is applied, and a second electrode connected to the fourth node, and the fourth switch element includes a first electrode connected to the sixth node, a gate electrode to which the third gate signal is applied, and a second electrode connected to the second node.

11. The pixel circuit of claim 8, further comprising:

a fifth switch element configured to apply an anode reset voltage to the fifth node in response to the third gate signal;

a sixth switch element configured to apply a pixel driving voltage to the first node in response to a fourth gate signal; and a seventh switch element configured to electrically connect the third node to the fifth node in response to a fifth gate signal.

12. The pixel circuit of claim 11, wherein a driving period of the pixel circuit includes a first period, a second period, a third period, a fourth period, and a fifth period, a voltage of the fourth gate signal is a gate-on voltage during the second and fifth periods and a gate-off voltage during the first, third, and fourth periods, a voltage of the fifth gate signal is the gate-on voltage during the first, fourth, and fifth periods and the gate-off voltage during the second and third periods, and each of the first switch element, the second switch element, the third switch element, the fourth switch element, the fifth switch element, the sixth switch element, and the seventh switch element is turned on in response to the gate-on voltage and is turned off in response to the gate-off voltage.

13. The pixel circuit of claim 11, wherein the fifth switch element includes a first electrode connected to the fifth node, a gate electrode to which the third gate signal is applied, and a second electrode to which the anode reset voltage is applied, the sixth switch element includes a first electrode to which the pixel driving voltage is applied, a gate electrode to which the fourth gate signal is applied, and a second electrode connected to the first node, and the seventh switch element includes a first electrode connected to the third node, a gate electrode to which the fifth gate signal is applied, and a second electrode connected to the fifth node.

14. The pixel circuit of claim 1, wherein the switch circuit includes:

a second switch element configured to apply the reference voltage to a sixth node in response to a third gate signal;

a third switch element configured to apply the reference voltage to the fourth node in response to a second gate signal; and a fourth switch element configured to electrically connect the sixth node to the second node in response to the second gate signal.

15. The pixel circuit of claim 14, wherein a driving period of the pixel circuit includes a first period, a second period, a third period, a fourth period, and a fifth period, a voltage of the first gate signal is a gate-on voltage during the third period and a gate-off voltage during the first, second, fourth, and fifth periods, a voltage of the second gate signal is the gate-on voltage during the first, second, and third periods and the gate-off voltage during the fourth and fifth periods, a voltage of the third gate signal is the gate-on voltage during the first, second, and fourth periods and the gate-off voltage during the third and fifth periods, and each of the first switch element, the second switch element, the third switch element, and the fourth switch element is turned on in response to the gate-on voltage and is turned off in response to the gate-off voltage.

16. The pixel circuit of claim 14, wherein the first switch element includes a first electrode connected to a data line to which the data voltage is applied, a gate electrode to which the first gate signal is applied, and a second electrode connected to the second node, the second switch element includes a first electrode to which the reference voltage is applied, a gate electrode to which the third gate signal is applied, and a second electrode connected to the sixth node, the third switch element includes a first electrode to which the reference voltage is applied, a gate electrode to which the second gate signal is applied, and a second electrode connected to the fourth node, and the fourth switch element includes a first electrode connected to the sixth node, a gate electrode to which the second gate signal is applied, and a second electrode connected to the second node.

17. The pixel circuit of claim 14, further comprising:

a fifth switch element configured to apply an anode reset voltage to the fifth node in response to the third gate signal;

a sixth switch element configured to apply a pixel driving voltage to the first node in response to a fourth gate signal; and a seventh switch element configured to electrically connect the third node to the fifth node in response to a fifth gate signal.

18. The pixel circuit of claim 17, wherein a driving period of the pixel circuit includes a first period, a second period, a third period, a fourth period, and a fifth period, a voltage of the fourth gate signal is a gate-on voltage during the second and fifth periods and a gate-off voltage during the first, third, and fourth periods, a voltage of the fifth gate signal is the gate-on voltage during the first, fourth, and fifth periods and the gate-off voltage during the second and third periods, and each of the first switch element, the second switch element, the third switch element, the fourth switch element, the fifth switch element, the sixth switch element, and the seventh switch element is turned on in response to the gate-on voltage and is turned off in response to the gate-off voltage.

19. The pixel circuit of claim 17, wherein the fifth switch element includes a first electrode connected to the fifth node, a gate electrode to which the third gate signal is applied, and a second electrode to which the anode reset voltage is applied, the sixth switch element includes a first electrode to which the pixel driving voltage is applied, a gate electrode to which the fourth gate signal is applied, and a second electrode connected to the first node, and the seventh switch element includes a first electrode connected to the third node, a gate electrode to which the fifth gate signal is applied, and a second electrode connected to the fifth node.

20. The pixel circuit of claim 1, wherein the switch circuit includes:

a second switch element configured to apply the reference voltage to the second node in response to a second gate signal;

a third switch element configured to apply the reference voltage to the fourth node in response to a first gate signal; and a fourth switch element configured to electrically connect the second node to the fourth node in response to the second gate signal, wherein the first switch element is turned on or off in response to the first gate signal.

21. The pixel circuit of claim 20, wherein a driving period of the pixel circuit includes a first period, a second period, a third period, a fourth period, and a fifth period, a voltage of the first gate signal is a gate-on voltage during the third period and a gate-off voltage during the first, second, fourth, and fifth periods, a voltage of the second gate signal is the gate-on voltage during the first and second periods and the gate-off voltage during the third, fourth, and fifth periods, a voltage of a third gate signal is the gate-on voltage during the first, second, third, and fourth periods and the gate-off voltage during the fifth period, and each of the first switch element, the second switch element, the third switch element, and the fourth switch element is turned on in response to the gate-on voltage and is turned off in response to the gate-off voltage.

22. The pixel circuit of claim 20, wherein the first switch element includes a first electrode connected to a data line to which the data voltage is applied, a gate electrode to which the first gate signal is applied, and a second electrode connected to the second node, the second switch element includes a first electrode to which the reference voltage is applied, a gate electrode to which the second gate signal is applied, and a second electrode connected to the second node, the third switch element includes a first electrode to which the reference voltage is applied, a gate electrode to which the first gate signal is applied, and a second electrode connected to the fourth node, and the fourth switch element includes a first electrode connected to the second node, a gate electrode to which the second gate signal is applied, and a second electrode connected to the fourth node.

23. The pixel circuit of claim 20, further comprising:

a fifth switch element configured to apply an anode reset voltage to the fifth node in response to a third gate signal;

a sixth switch element configured to apply a pixel driving voltage to a first sixth-node in response to a fourth gate signal; and a seventh switch element configured to electrically connect the third node to the fifth node in response to a fifth gate signal.

24. The pixel circuit of claim 23, wherein a driving period of the pixel circuit includes a first period, a second period, a third period, a fourth period, and a fifth period, a voltage of the fourth gate signal is a gate-on voltage during the second and fifth periods and a gate-off voltage during the first, third, and fourth periods, a voltage of the fifth gate signal is the gate-on voltage during the first, fourth, and fifth periods and the gate-off voltage during the second and third periods, and each of the first switch element, the second switch element, the third switch element, the fourth switch element, the fifth switch element, the sixth switch element, and the seventh switch element is turned on in response to the gate-on voltage and is turned off in response to the gate-off voltage.

25. The pixel circuit of claim 24, wherein the fifth switch element includes a first electrode connected to the fifth node, a gate electrode to which the third gate signal is applied, and a second electrode to which the anode reset voltage is applied, the sixth switch element includes a first electrode to which the pixel driving voltage is applied, a gate electrode to which the fourth gate signal is applied, and a second electrode connected to the first node, and the seventh switch element includes a first electrode connected to the third node, a gate electrode to which the fifth gate signal is applied, and a second electrode connected to the fifth node.

26. The pixel circuit of claim 1, wherein the at least two transistors connected in series include:

a second switch element that includes a gate electrode, a second electrode, and a third electrode; and a third switch element that includes a gate electrode, a second electrode, and a third electrode, the third electrode of the second switch element being directly connected to the second electrode of the third switch element at a connection node different from the second node and the fourth node.

27. The pixel circuit of claim 1, wherein the first switch element is turned on or off in response to the first gate signal, and each switch element of the switch circuit is turned on or off in response to signals other than the first gate signal.

28. A display device comprising:

a display panel including data lines, gate lines, power lines, and pixel circuits;

a data driver configured to output a data voltage of pixel data to the data lines; and a gate driver configured to sequentially supply a gate signal to the gate lines, wherein the pixel circuit includes:

a driving element including a first electrode connected to a first node, a gate electrode connected to a second node, and a second electrode connected to a third node;

a first capacitor connected between the second node and a fourth node;

a second capacitor connected between the third node and the fourth node;

a light-emitting element including an anode electrode connected to a fifth node and a cathode electrode to which a cathode voltage is applied, the light-emitting element configured to be driven by a current supplied through the driving element;

a first switch element configured to connect a data voltage to the second node in response to a first gate signal; and a switch circuit configured to selectively apply a reference voltage to the second node and the fourth node, the switch circuit including at least two transistors connected in series between the reference voltage and one of the second node and the fourth node.

* * * * *